US012301946B2

(12) United States Patent
Shim et al.

(10) Patent No.: US 12,301,946 B2
(45) Date of Patent: May 13, 2025

(54) MOBILE TERMINAL

(71) Applicant: LG ELECTRONICS INC., Seoul (KR)

(72) Inventors: Seokjin Shim, Seoul (KR); Kiyun Kim, Seoul (KR); Kaeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 18/102,452

(22) Filed: Jan. 27, 2023

(65) Prior Publication Data
US 2023/0247260 A1 Aug. 3, 2023

(30) Foreign Application Priority Data

Jan. 28, 2022 (KR) .......... 10-2022-0013580
Oct. 25, 2022 (KR) .......... 10-2022-0138147

(51) Int. Cl.
H04N 21/4788 (2011.01)
H04N 21/41 (2011.01)
H04N 21/482 (2011.01)

(52) U.S. Cl.
CPC ..... *H04N 21/4788* (2013.01); *H04N 21/4126* (2013.01); *H04N 21/4825* (2013.01)

(58) Field of Classification Search
CPC ........... H04N 21/4788; H04N 21/4126; H04N 21/4825
See application file for complete search history.

(56) References Cited

U.S. PATENT DOCUMENTS

| 8,700,714 | B1 | 4/2014 | Pan et al. | |
|---|---|---|---|---|
| 10,664,138 | B2 | 5/2020 | Carney et al. | |
| 2005/0262542 | A1* | 11/2005 | DeWeese | H04N 21/454 348/E7.071 |
| 2011/0202853 | A1 | 8/2011 | Mujkic | |
| 2012/0131441 | A1 | 5/2012 | Jitkoff et al. | |
| 2012/0144416 | A1 | 6/2012 | Wetzer et al. | |
| 2012/0284752 | A1 | 11/2012 | Jung | |
| 2013/0173710 | A1 | 7/2013 | Seo | |
| 2013/0218987 | A1 | 8/2013 | Chudge et al. | |
| 2014/0019958 | A1* | 1/2014 | Sherman | G06F 8/61 717/178 |

(Continued)

FOREIGN PATENT DOCUMENTS

KR   10-1667603 B1   10/2016

OTHER PUBLICATIONS

U.S. Appl. No. 18/102,421, filed Jan. 27, 2023.
U.S. Appl. No. 18/102,475, filed Jan. 27, 2023.

*Primary Examiner* — Nnenna N Ekpo
(74) *Attorney, Agent, or Firm* — Birch, Stewart, Kolasch & Birch, LLP

(57) ABSTRACT

A mobile terminal can include a display; a wireless transceiver configured to perform wireless communication with a server or an external terminal; and a controller configured to in response to receiving a broadcast chatting related message from the external terminal or the server, display the broadcast chatting related message, and in response to receiving a selection of the broadcast chatting related message in a state where a broadcast chatting application is not installed in the mobile terminal, display a preview image.

18 Claims, 53 Drawing Sheets

(56) References Cited

U.S. PATENT DOCUMENTS

| | | | |
|---|---|---|---|
| 2014/0068692 A1* | 3/2014 | Archibong | H04N 21/6334 725/116 |
| 2014/0082673 A1* | 3/2014 | Nishizawa | H04N 21/4622 725/52 |
| 2014/0195675 A1 | 7/2014 | Silver | |
| 2015/0271113 A1 | 9/2015 | Ahn | |

* cited by examiner

MOBILE TERMINAL

CROSS-REFERENCE TO RELATED APPLICATIONS

This application claims priority to Korean Patent Application No. 10-2022-0013580 filed in the Republic of Korea on Jan. 28, 2022, and Korean Patent Application No. 10-2022-0138147 filed in the Republic of Korea on Oct. 25, 2022, where the entirety of all these applications is hereby incorporated by reference into the present application.

BACKGROUND

1. Field

The present disclosure relates to a mobile terminal, and more specifically, to a mobile terminal capable of sharing a broadcast related chatting screen.

2. Description of the Related Art

A mobile terminal is a device capable of mobile communication and displaying an image.

Meanwhile, various images can be displayed through a mobile terminal, and in particular, a chatting screen related to a broadcast image can be displayed.

Korean Patent No. 10-1667603 (hereinafter referred to as a "Patent Document") discloses a chatting providing method, system, and chatting server for each broadcasting channel.

According to the Patent Document, when a chatting window is displayed on a TV, the TV does not connect to the URL, but connects to the URL using a user's mobile terminal and performs chatting.

However, according to the Patent Document, a method for sharing a broadcast related chatting screen through the mobile terminal is not disclosed, and thus, there is a disadvantage in that a broadcast related chatting screen cannot be shared.

SUMMARY OF THE DISCLOSURE

An object of present disclosure is to provide a mobile terminal capable of sharing a broadcast related chatting screen.

Meanwhile, another purpose of present disclosure is to provide a mobile terminal capable of inputting and displaying chatting conversation content related to a broadcast image.

According to an aspect of the present disclosure, there is provided a mobile terminal including: a display; a wireless transceiver configured to perform wireless communication with a server or an external terminal; and a controller configured to display a broadcast chatting related message in response to receiving a broadcast chatting related message from the external terminal, in which the controller is configured to display a web screen-based preview image in response to selection of the broadcast chatting related message in a state where a broadcast chatting application is not installed.

The controller can be configured to display link information for installing the broadcast chatting application in response to selection of the preview image.

In response to selection of the broadcast chatting related message in a state where the broadcast chatting application is installed, the controller can be configured to display a broadcast related chatting screen including an application-based preview image and a chatting input window.

The controller can be configured to display a keyboard display window and a text input window in response to selection of the chatting input window, and in response to input of a conversation content to the text input window, the controller can be configured to transmit the input conversation content to the server and display the conversation content on the chatting screen.

The controller can be configured to display a chatting application screen including a conversation content ranking icon and a schedule item in response to execution of the broadcast chatting application.

The controller can be configured to display a schedule list screen including a plurality of broadcast program items in response to selection of the schedule item in the chatting application screen, and in response to selection of any one of the plurality of program items, the controller can be configured to display a broadcast related chatting screen including a chatting input window related to the selected broadcast program.

The controller can be configured to display the plurality of broadcast program items in the schedule list screen to be arranged in of channel order or popularity order.

The controller can be configured to display a sharing viewing screen including a plurality of broadcast program items in response to selection of a sharing viewing item in the chatting application screen, and in response to selection of any one of the plurality of program items, the control can be configured to display a broadcast related chatting screen including a chatting input window related to the selected broadcasting program.

The controller can be configured to display a broadcast related chatting screen in response to installation of the broadcast chatting, and in response to selection of a preference item or recommendation item for a first chatting conversation content from among the chatting conversation contents in the broadcast related chatting screen, the controller can be configured to transmit preference or recommendation information for the first chatting conversation content to the server and display an increased number of preferences or recommendations for the first chatting conversation contents.

The controller can be configured to display a setting screen including a profile item and a badge item in response to selection of a setting item in the chatting application screen.

The controller can be configured to change the number of badge items based on updated or acquired points.

The controller can be configured to display a channel editing item and a region setting item on a setting screen in response to selection of a setting item in the chatting application screen, display a channel list screen including a terrestrial broadcasting item and a cable broadcasting item in response to selection of the channel editing item, and display a plurality of region items and broadcast channel information viewable in each region item are displayed in response to selection of the region setting item.

The controller can be configured to display a broadcast related chatting screen including a chatting input window in response to the execution of the broadcast chatting application, and transmit a broadcast chatting related message related to a corresponding broadcast to a predetermined terminal in response to selection of a sharing item in the broadcast related chatting screen.

The controller can be configured to display a keyboard display window and a text input window in response to selection of a chatting input window in the broadcast related chatting screen, and in response to input of a conversation content to the text input window, the controller can be configured to transmit the input conversation content to the server and display the input conversation content on the broadcast related chatting screen.

The controller can be configured to display a captured image of a broadcast image, a chatting item, and a sharing item together, based on a predetermined input.

In response to selection of the chatting, the controller can be configured to display a broadcast related chatting screen corresponding to the captured image and including a chatting input window.

The controller can be configured to transmit the captured image and a broadcast chatting related message related to the corresponding broadcast to a predetermined terminal, based on the selection of the sharing item.

According to another aspect of the present disclosure, there is provided a mobile terminal including: a display; a wireless transceiver configured to perform wireless communication with a server or an external terminal; and a controller configured to display a broadcast related chatting screen including a chatting input window, in response to execution of a broadcast chatting application, in response to selection of a sharing item in the broadcast related chatting screen, the controller is configured to transmit a broadcast chatting related message related to the corresponding broadcast to a predetermined terminal.

The controller can be configured to display a keyboard display window and a text input window in response to selection of a chatting input window in the broadcast related chatting screen, and in response to input of a conversation content to the text input window, the controller can be configured to transmit the input conversation content to the server and display the input conversation content on the broadcast related chatting screen.

According to an aspect of the present disclosure, there is provided the mobile terminal including: the display; the wireless transceiver configured to perform wireless communication with the server or the external terminal; and the controller configured to display the broadcast chatting related message in response to receiving the broadcast chatting related message from the external terminal, in which the controller is configured to display the web screen-based preview image in response to selection of the broadcast chatting related message in a state where the broadcast chatting application is not installed. Accordingly, the broadcast related chatting screen can be shared. Furthermore, it is possible to input and display the chatting conversation content related to the broadcast image.

The controller can be configured to display the link information for installing the broadcast chatting application in response to selection of the preview image. Therefore, it is possible to easily install the broadcast chatting application.

In response to selection of the broadcast chatting related message in a state where the broadcast chatting application is installed, the controller can be configured to display the broadcast related chatting screen including the application-based preview image and the chatting input window. Accordingly, the broadcast related chatting screen can be shared. Furthermore, it is possible to input and display the chatting conversation content related to the broadcast image.

The controller can be configured to display the keyboard display window and the text input window in response to selection of the chatting input window, and in response to input of the conversation content to the text input window, the controller can be configured to transmit the input conversation content to the server and display the conversation content on the chatting screen. Accordingly, the broadcast related chatting screen can be shared. Furthermore, it is possible to input and display the chatting conversation content related to the broadcast image.

The controller can be configured to display the chatting application screen including the conversation content ranking icon and the schedule item in response to the execution of the broadcast chatting application. Therefore, it is possible to display the broadcast related chatting screen through the chatting application screen.

The controller can be configured to display the schedule list screen including the plurality of broadcast program items in response to selection of the schedule item in the chatting application screen, and in response to selection of any one of the plurality of program items, the controller can be configured to display the broadcast related chatting screen including the chatting input window related to the selected broadcast program. Therefore, it is possible to display the broadcast related chatting screen through the chatting application screen and the schedule list screen.

The controller can be configured to display the plurality of broadcast program items in the schedule list screen to be arranged in of channel order or popularity order. Therefore, it is possible to arrange and display the plurality of broadcast program items.

The controller can be configured to display the sharing viewing screen including the plurality of broadcast program items in response to selection of the sharing viewing item in the chatting application screen, and in response to selection of any one of the plurality of program items, the control can be configured to display the broadcast related chatting screen including the chatting input window related to the selected broadcasting program. Therefore, it is possible to display the broadcast related chatting screen through the sharing viewing screen.

The controller can be configured to display the broadcast related chatting screen in response to installation of the broadcast chatting, and in response to selection of the preference item or recommendation item for the first chatting conversation content from among the chatting conversation contents in the broadcast related chatting screen, the controller can be configured to transmit the preference or recommendation information for the first chatting conversation content to the server and display the increased number of preferences or recommendations for the first chatting conversation contents. Therefore, it is possible to provide the increased number of preferences or recommendations for the first chatting conversation content.

The controller can be configured to display the setting screen including the profile item and the badge item in response to selection of the setting item in the chatting application screen. Accordingly, it is possible to provide the setting screen including the profile item and the badge item.

The controller can be configured to change the number of badge items based on the updated or acquired points. Therefore, it is possible to provide various number of the badge items.

The controller can be configured to display the channel editing item and the region setting item on the setting screen in response to selection of the setting item in the chatting application screen, display the channel list screen including the terrestrial broadcasting item and the cable broadcasting item in response to selection of the channel editing item, and display the plurality of region items and the broadcast channel information viewable in each region item in response to selection of the region setting item. Accordingly, it is possible to provide the channel list screen or the region list screen.

The controller can be configured to display the broadcast related chatting screen including the chatting input window in response to the execution of the broadcast chatting application, and transmit the broadcast chatting related message related to the corresponding broadcast to the predetermined terminal in response to selection of the sharing item in the broadcast related chatting screen. Therefore, it is possible to input and display the chatting conversation content related to the broadcast image through the broadcast related chatting screen.

The controller can be configured to display the keyboard display window and the text input window in response to selection of the chatting input window in the broadcast related chatting screen, and in response to input of a conversation content the text input window, the controller can be configured to transmit the input conversation content to the server and display the input conversation content on the broadcast related chatting screen. Therefore, it is possible to input and display the chatting conversation content related to the broadcast image through the broadcast related chatting screen.

The controller can be configured to display the captured image of the broadcast image, the chatting item, and the sharing item together, based on a predetermined input. Accordingly, the captured image can be shared.

In response to selection of the chatting item, the controller can be configured to display the broadcast related chatting screen corresponding to the captured image and including the chatting input window. Therefore, the captured image-based broadcast related chatting screen can be shared. Furthermore, it is possible to input and display the chatting conversation content related to the broadcast image.

The controller can be configured to transmit the captured image and the broadcast chatting related message related to the corresponding broadcast to a predetermined terminal, based on the selection of the sharing item. Therefore, it is possible to input and display the chatting conversation content related to the broadcast image while sharing the captured image.

According to another aspect of the present disclosure, there is provided there is provided the mobile terminal including: the display; the wireless transceiver configured to perform wireless communication with the server or the external terminal; and the controller configured to display the broadcast related chatting screen including the chatting input window, in response to execution of the broadcast chatting application, in response to selection of the sharing item in the broadcast related chatting screen, the controller is configured to transmit the broadcast chatting related message related to the corresponding broadcast to the predetermined terminal. Accordingly, the broadcast related chatting screen can be shared. Furthermore, it is possible to input and display the charting conversion content related to the broadcast image.

The controller can be configured to display the keyboard display window and the text input window in response to selection of the chatting input window in the broadcast related chatting screen, and in response to input of the conversation content to the text input window, the controller can be configured to transmit the input conversation content to the server and display the input conversation content on the broadcast related chatting screen. Accordingly, it is possible to input and display the charting conversion content related to the broadcast image.

BRIEF DESCRIPTION OF THE DRAWINGS

The above and other aspects, features, and advantages of the present disclosure will become apparent from the detailed description of the following aspects in conjunction with the accompanying drawings, described below.

DETAILED DESCRIPTION OF THE EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" can be used interchangeably.

Figure 1:
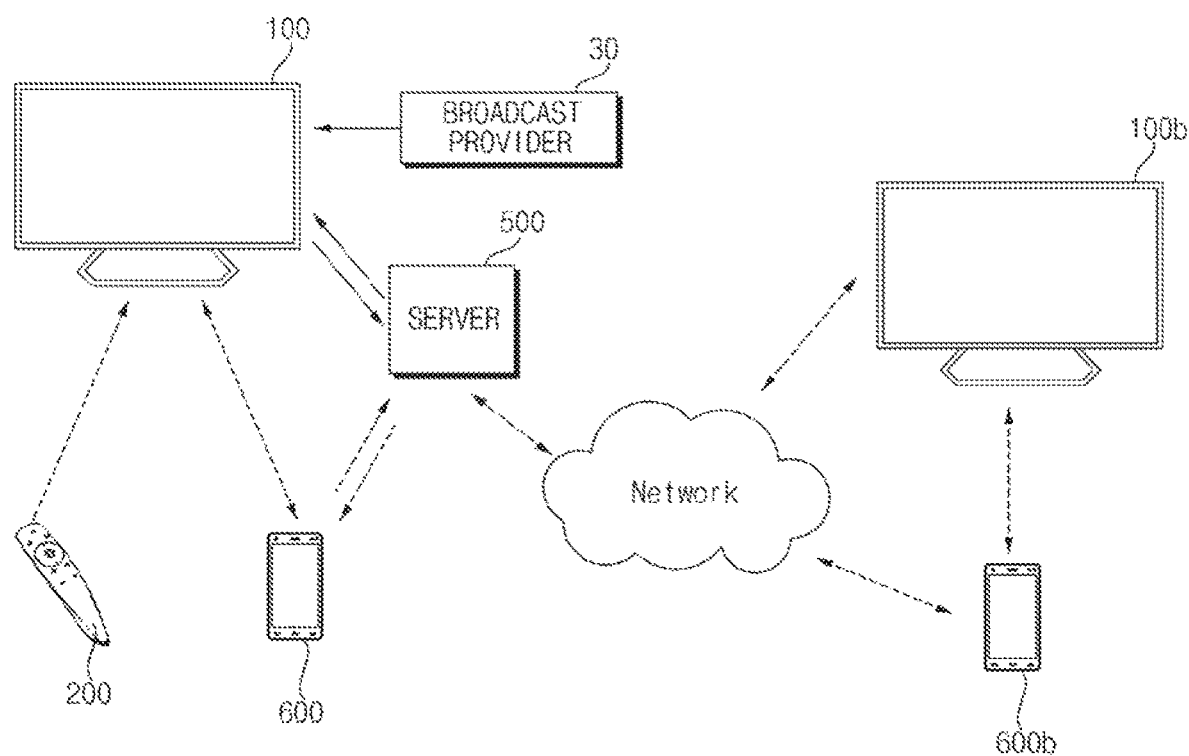
FIG. 1 is a diagram illustrating an image display system according to an embodiment of the present disclosure.

FIG. 1 is a diagram illustrating an image display system according to one embodiment of the present disclosure.

Referring to the drawing, an image display system 10 according one embodiment of the present disclosure can include an image display apparatus 100, a mobile terminal 600, a server 500, and a broadcast provider 30.

In addition, the image display system 10 can further include another image display apparatus 100*b* and another mobile terminal 600*b* that can access a network.

The image display apparatus 100 according to one embodiment of the present disclosure receives a broadcast signal from the broadcast provider 30, receives a chatting conversation content from the server 500, synchronizes a broadcast image corresponding to the broadcast signal and the chatting conversation content, displays the chatting conversation content so that the chanting conversation convent is overlaid on the broadcast image, and displays the conversation content and transmits the conversation content to the server 500 when the conversation content is input based on the signal from the remote controller 200.

Accordingly, the image display apparatus accesses the server 500, and can input and display the conversation content while displaying the broadcast image corresponding to the selected channel among a plurality of broadcast channels and the chatting conversation content together. For example, the broadcast image can be a broadcast program, a TV show, a news program, a movie, a streaming application and the like.

Meanwhile, when the mobile terminal 600 according to one embodiment of present disclosure receives a broadcast chatting related message from the external terminal 600b, the mobile terminal 600 displays the broadcast chatting related message, and in response to selection of the broadcast chatting related message in a state where a broadcast chatting application is not installed, the mobile terminal 600 is configured to display a web screen-based preview image. Accordingly, a broadcast related chatting screen can be shared. Furthermore, it is possible to input and display the chatting conversation content related to the broadcast image.

When the mobile terminal 600 according to one embodiment of present disclosure receives the broadcast chatting related message from the external terminal 600b, the mobile terminal 600 displays the broadcast chatting related message, and the broadcast chatting related message is selected in a state where the broadcast chatting application is installed, the mobile terminal 600 can display a broadcast related chatting screen including an application-based preview image and a chatting input window. Accordingly, the broadcast related chatting screen can be shared.

Meanwhile, the mobile terminal 600 according to one embodiment of the present disclosure accesses the server 500 based on first ID information, receives and displays a first chatting conversation content corresponding to a first broadcast image selected from the server 500, and when the first conversation content is input, the mobile terminal 600 displays the first conversation content and transmits the first conversation content to the server 500.

Meanwhile, the image display apparatus 100 according to one embodiment of the present disclosure accesses the server 500 based on second ID information different from the first ID information, receives the first chatting conversation content corresponding to the first broadcast image selected from the server 500, synchronizes the first broadcast image with the first chatting conversation content, and overlays and displays the first chatting conversation content on the first broadcast image. When a second conversation content is input based on the signal from the remote controller 200, the mobile terminal 600 displays the second conversation content and transmits the second conversation content to the server 500.

Another image display apparatus 100b according to one embodiment of the present disclosure accesses the server 500 based on third ID information and receives the first chatting conversation content corresponding to the first broadcast image selected from the server 500. Moreover, the image display apparatus 100b synchronizes the first broadcast image with the first chatting conversation content, overlays and displays the first chatting conversation content on the first broadcast image, and displays a third conversation content and transmits the third conversation content to the server 500 when the third conversation content is input based on the signal from the remote controller 200.

Meanwhile, another mobile terminal 600b according to one embodiment of the present disclosure accesses the server 500 based on fourth ID information different from the third ID information, receives and displays the first chatting conversation content corresponding to the first broadcast image selected from the server 500, and displays a fourth conversation content and transmits the fourth conversation content to the server 500 when the fourth conversation content is input.

In this way, the chatting conversation content corresponding to the same broadcast image can be shared by accessing the server 500 based on different ID information through each image display apparatus and mobile terminal according to one embodiment of the present disclosure.

In particular, each of the mobile terminals 600 and 600b according to one embodiment of the present disclosure can access the server 500 based on different ID information to share the chatting conversation content corresponding to the same broadcast image.

Meanwhile, the image display apparatus 100b different from the image display apparatus 100 of FIG. 1 can be a TV, a monitor, a tablet PC, or a vehicle display device.

Meanwhile, the mobile terminal 600b different from the mobile terminal 600 of FIG. 1 can be a smart phone, a tablet PC, or a display device for a vehicle.

Figure 2:
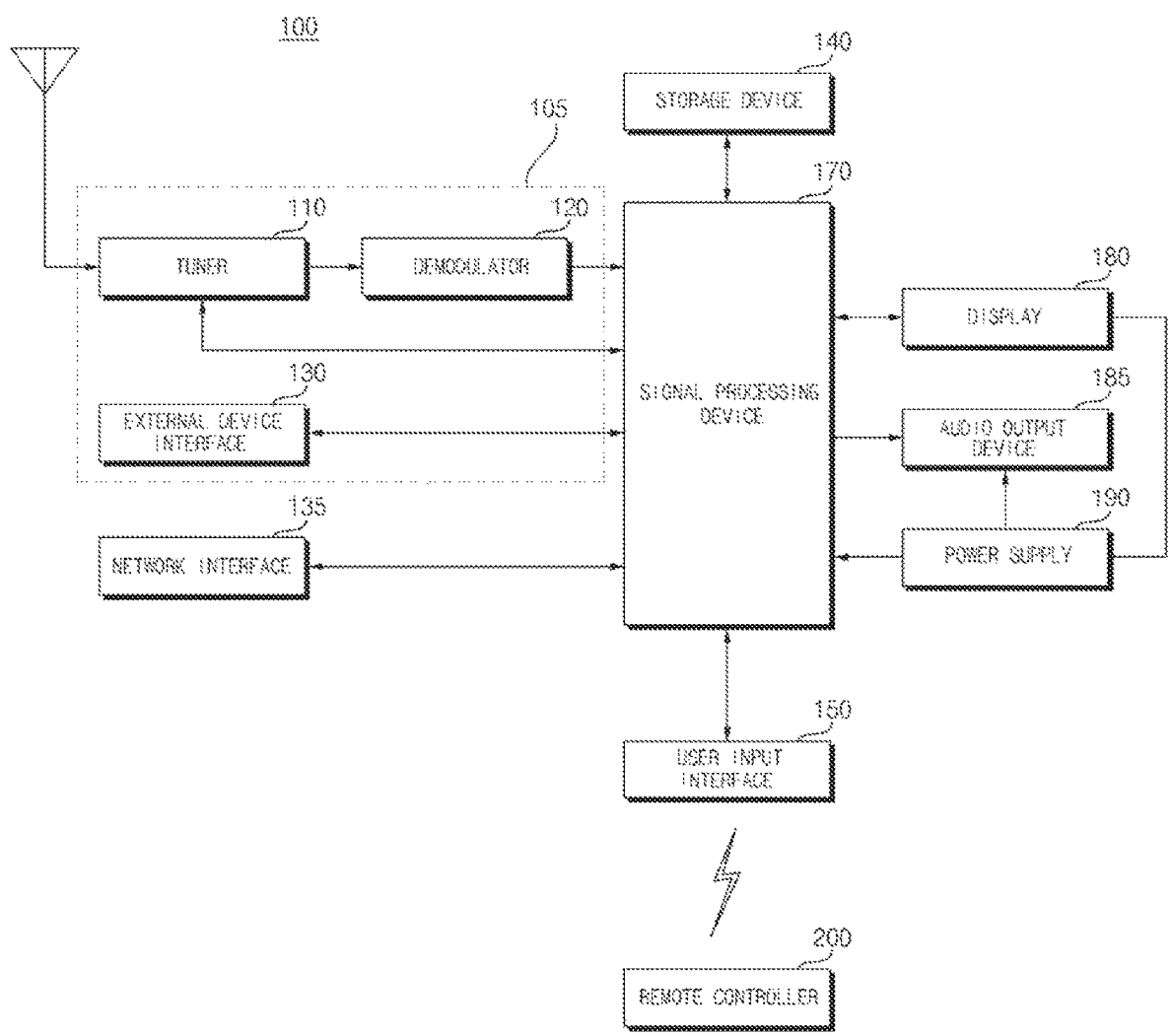
FIG. 2 is an internal block diagram illustrating an image display apparatus of FIG. 1 according to an embodiment of the present disclosure.

FIG. 2 is an internal block diagram illustrating the image display apparatus of FIG. 1.

Referring to FIG. 2, the image display apparatus 100 according to one embodiment of the present disclosure can include an image receiver 105, an external device interface 130, a network interface 135, a storage device 140, a user input interface 150, a sensor device, a signal processing device 170, a display 180, and an audio output device 185.

The image receiver 105 can receive an input image. For example, the image receiver 105 can receive a broadcast image, an HDMI image, or an external input image such as a streamed image.

The image receiver 105 can include a tuner 110, a demodulator 120, and an external device interface 130.

Unlike the drawing, the image receiver 105 can include the tuner 110, the demodulator 120, the external device interface 130, and a network interface 135.

The tuner 110 selects a channel selected by a user from among radio frequency (RF) broadcast signals received through an antenna or an RF broadcast signal corresponding to all pre-stored channels. In addition, the tuner 110 converts the selected RF broadcast signal into a middle-frequency signal, a baseband image, or a voice signal.

To receive broadcast signals of a plurality of channels, a plurality of tuners 110 can be provided. Alternatively, a single tuner to receive a plurality of channels simultaneously can be provided.

The demodulator 120 receives and demodulates a digital IF (DIF) signal converted by the tuner 110.

After performing demodulation and channel decoding, the demodulator 120 can output a stream signal (TS). Herein, the stream signal can be a signal obtained by multiplexing an image signal, voice signal or data signal.

The stream signal output from the demodulator 120 can be input to the signal processing device 170. After performing demultiplexing and image/voice signal processing, the signal processing device 170 outputs an image to the display 180 and voice to the audio output device 185.

The external device interface 130 can transmit or receive data to or from a connected external device, for example, a set-top box 50.

To this end, the external device interface 130 can include an audio/video (A/V) input/output device, a wireless transceiver, and the like.

The external device interface 130 can be connected to external devices such as a digital versatile disc (DVD) player, a BLU-RAY player, a gaming device, a camera, a camcorder, a computer (laptop), and a set-top box in a wired/wireless manner, and perform input/output operations with external devices.

The A/V input/output device in the external device interface 130 can receive the image and voice signal of the external device. Meanwhile, the wireless transceiver in the external device interface 130 can perform short-range wireless communication with other electronic devices.

The external device interface 130 can exchange data with a neighboring mobile terminal 600 via the wireless transceiver. In particular, in the mirroring mode, the external device interface 130 can receive device information, information about an executed application and an application image from the mobile terminal 600.

The network interface 135 provides an interface for connecting the image display apparatus to a wired/wireless network including the Internet. For example, the network interface 135 can receive content or data provided by the Internet or a content provider or network operator through a network.

The network interface 135 can include a wireless transceiver.

The storage device 140 can store programs for processing and control of signals in the signal processing device 170, and also store a signal-processed image, voice signal or data signal.

The storage device 140 can function to temporarily store an image signal, a voice signal, or a data signal input through the external device interface 130. In addition, the storage device 140 can store information about a predetermined broadcast channel through the channel memorization function such as a channel map.

While it is illustrated in FIG. 2 that the storage device 140 is provided separately from the signal processing device 170, embodiments of the present disclosure are not limited thereto. The storage device 140 can be included in the signal processing device 170.

The user input interface 150 can transmit a signal input by the user to the signal processing device 170 or transmit a signal from the signal processing device 170 to the user.

For example, the user input interface 150 can transmit/receive user input signals such as power on/off, channel selection, and screen setting to/from the remote controller 200, deliver user input signals input through local keys such as a power key, a channel key, a volume key, or a setting key, deliver user input signals input through a sensor device to sense user gestures to the signal processing device 170, or transmit a signal from the signal processing device 170 to the sensor device.

The signal processing device 170 can demultiplex streams input through the tuner 110, demodulator 120, network interface 135, or external device interface 130, or process demultiplexed signals. Thereby, the signal processing device 170 can generate an output signal for outputting an image or voice.

For example, the signal processing device 170 can receive a broadcast signal or HDMI signal received from the image receiver 105, perform signal processing based on the received broadcast signal or HDMI signal, and output the signal-processed image signal.

An image signal image-processed by the signal processing device 170 can be input to the display 180 and an image corresponding to the image signal can be displayed. In addition, the image signal which is image-processed by the signal processing device 170 can be input to an external output device through the external device interface 130.

A voice signal processed by the signal processing device 170 can be output to the audio output device 185 in the form of sound. In addition, the voice signal processed by the signal processing device 170 can be input to an external output device through the external device interface 130.

Also, the signal processing device 170 can include a demultiplexer, an image processor, and the like. That is, the signal processing device 170 can perform various signal processing, and thus can be implemented in the form of a System On Chip (SOC). This will be described later with reference to FIG. 3.

Additionally, the signal processing device 170 can control overall operation of the image display apparatus 100. For example, the signal processing device 170 can control the tuner 110 to tune to an RF broadcast corresponding to a channel selected by the user or a pre-stored channel.

The signal processing device 170 can control the image display apparatus 100 according to a user command input through the user input interface 150 or an internal program.

The signal processing device 170 can control the display 180 to display an image. Herein, the image displayed on the display 180 can be a still image, a moving image, a 2D image, or a 3D image.

The signal processing device 170 can be configured to display the predetermined object in an image displayed on the display 180. For example, the object can be at least one of an accessed web page (a newspaper, a magazine, or the like), electronic program guide (EPG), various menus, a widget, an icon, a still image, a moving image, and text.

The signal processing device 170 can recognize the location of the user based on an image captured by a capture device. For example, the signal processing device 170 can recognize a distance (a z-axis coordinate) between the user and the image display apparatus 100. Additionally, the signal processing device 170 can recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130.

The display 180 can be configured as a touch screen and used as an input device in addition to an output device.

The audio output device 185 receives a voice signal processed by the signal processing device 170 and outputs voice.

The capture device captures the user. The capture device can be implemented with one camera, but is not limited thereto, and can be implemented with a plurality of cameras. Image information captured by the capture device can be input to the signal processing device 170.

The signal processing device 170 can sense user gestures based on an image captured by the capture device, a sensed signal from the sensor device, or a combination thereof.

The signal processing device 170 can be implemented in the form of a System On Chip (SOC).

The power supply 190 supplies corresponding power throughout the image display apparatus 100. In particular, the power supply 190 can supply power to the signal processing device 170 implemented in the form of a System On Chip (SOC), the display 180 for displaying images, an audio output device 185 for outputting audio, or the like.

Specifically, the power supply 190 can include a converter to convert alternating current (AC) power into direct current (DC) power and a DC-DC converter to change the level of the DC power.

The remote controller 200 transmits user input to the user input interface 150. To this end, the remote controller 200 can employ BLUETOOTH, radio frequency (RF) communication, infrared (IR) communication, ultra-wideband (UWB), or ZIGBEE. In addition, the remote controller 200 can receive an image signal, a voice signal, or a data signal output from the user input interface 150, and display the signals on the remote controller 200 or voice-output.

The image display apparatus 100 can be a fixed or mobile digital broadcast receiver capable of receiving digital broadcast services.

The block diagram of the image display apparatus 100 illustrated in FIG. 2 is a block diagram for one embodiment of the present disclosure. Constituents of the block diagram can be integrated, added or omitted according to the specifications of the image display apparatus 100 which is implemented in reality. That is, two or more constituents can be combined into one constituent, or one constituent can be subdivided into two or more constituents, when necessary. In addition, the function performed in each block is simply illustrative, and it should be noted that specific operations or devices of the blocks do not limit the scope of the present disclosure.

Figure 3:
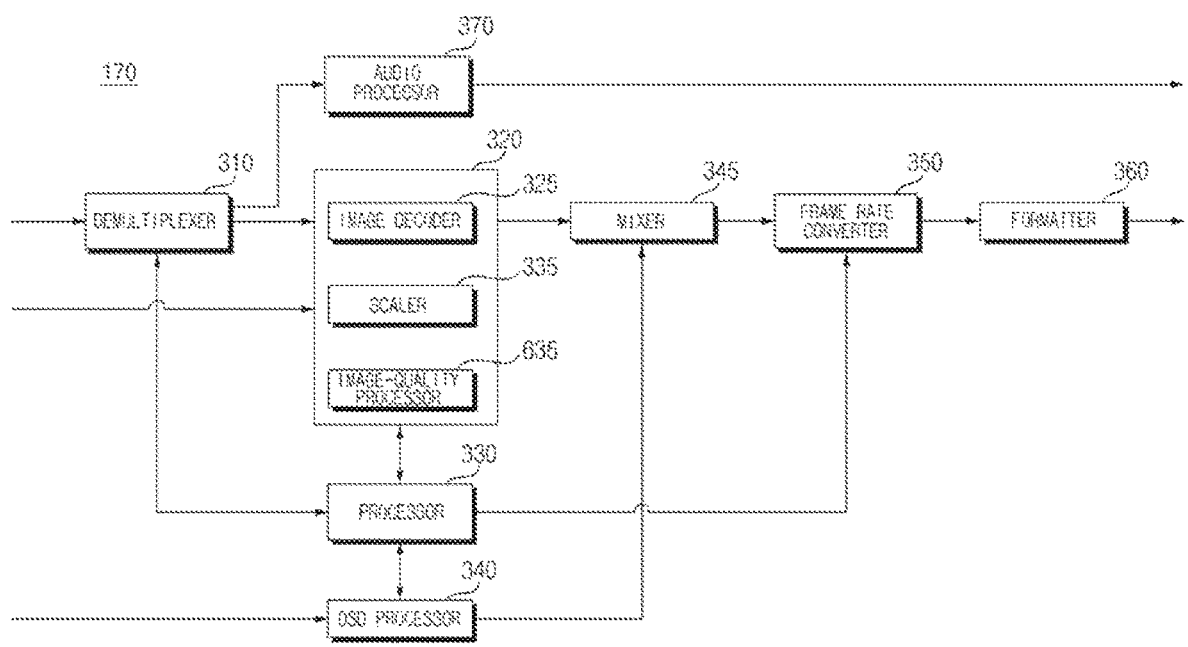
FIG. 3 is an internal block diagram illustrating a signal processing device of FIG. 2 according to an embodiment of the present disclosure.

FIG. 3 is an internal block diagram illustrating the signal processing device of FIG. 2.

Referring to the drawings, the signal processing device 170 according to one embodiment of the present disclosure can include a demultiplexer 310, an image processor 320, a processor 330, and an audio processor 370. In addition, the signal processing device 170 can further include a data processor.

The demultiplexer 310 demultiplexes an input stream. For example, when an MPEG-2 TS is input, the demultiplexer 310 can demultiplex the MPEG-2 TS to separate the MPEG-2 TS into an image signal, a voice signal and a data signal. Herein, the stream signal input to the demultiplexer 310 can be a stream signal output from the tuner 110, the demodulator 120 or the external device interface 130.

The image processor 320 can perform signal processing on an input image. For example, the image processor 320 can perform image processing of an image signal demultiplexed by the demultiplexer 310.

To this end, the image processor 320 includes an image decoder 325, a scaler 335, an image-quality processor 635, an image encoder, an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 can include decoders of various standards. For example, the image decoder 325 can include an MPEG-2 decoder, an H.264 decoder, a 3D image decoder for color images and depth images, and a decoder for multi-viewpoint images.

The scaler 335 can scale an input image signal that has been image decoded by the image decoder 325 or the like.

For example, the scaler 335 can perform up-scaling when the size or resolution of the input image signal is small, and down-scaling when the size or resolution of the input image signal is large.

The image-quality processor 635 can perform image quality processing on an input image signal that has been image decoded in the image decoder 325 or the like.

For example, the image-quality processor 635 can perform noise removal processing of the input image signal, expand the resolution of gray levels of an input image signal, improve image resolution, performs high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 can generate a signal for display of various kinds of information in the form of images or text on the screen of the display 180 based on a user input signal. The generated OSD signal can include various data including the user interface screen window of the image display apparatus 100, various menu screen windows, widgets, and icons. The generated OSD signal can also include a 2D object or a 3D object.

The OSD processor 340 can generate a pointer which can be displayed on the display, based on a pointing signal input from the remote controller 200. In particular, the pointer can be generated by a pointing signal processing device, and the OSD processor 340 can include the pointing signal generator. Of course, it is possible to provide the pointing signal processing device separately from the OSD processor 340.

The frame rate converter (FRC) 350 can convert the frame rate of an input image. The FRC 350 can output frames without performing separate frame rate conversion.

The formatter 360 can change the format of an input image signal into an image signal for display on a display and output the changed image signal.

In particular, the formatter 360 can change the format of the image signal to correspond to the display panel.

Meanwhile, the formatter 360 can change the format of an image signal. For example, the format of the 3D image signal can be changed to any one format of various 3D formats such as a Side by Side format, a Top/Down format, a Frame Sequential format, an Interlaced format, a Checker Box format.

The processor 330 can control overall operations within the image display apparatus 100 or signal processing device 170.

For example, the processor 330 can control the tuner 110 to select (tuning) an RF broadcast corresponding to a channel selected by a user or a pre-stored channel.

The processor 330 can control the image display apparatus 100 according to a user command input through the user input interface 150 or an internal program.

The processor 330 can perform data transfer control with the network interface 135 or the external device interface 130.

The processor 330 can control operations of the demultiplexer 310 and the image processor 320 within the signal processing device 170.

An audio processor 370 in the signal processing device 170 can voice-process a demultiplexed voice signal. To this end, the audio processor 370 can include various decoders.

The audio processor 370 in the signal processing device 170 can perform processing such as adjustment of bass, treble, and volume.

The data processor in the signal processing device 170 can perform data processing on a demultiplexed data signal. For example, when the demultiplexed data signal is a coded data signal, the data processor can decode the data signal. The coded data signal can be electronic program guide information including broadcast information such as a start time and end time of a broadcast program broadcast on each channel.

The block diagram of the signal processing device 170 illustrated in FIG. 3 is a block diagram for one embodiment of the present disclosure. Constituents of the block diagram can be integrated, added, or omitted according to the specifications of the signal processing device 170 which is implemented in reality.

In particular, the frame rate converter 350 and the formatter 360 can be separately provided in addition to the image processor 320.

Figure 4A:
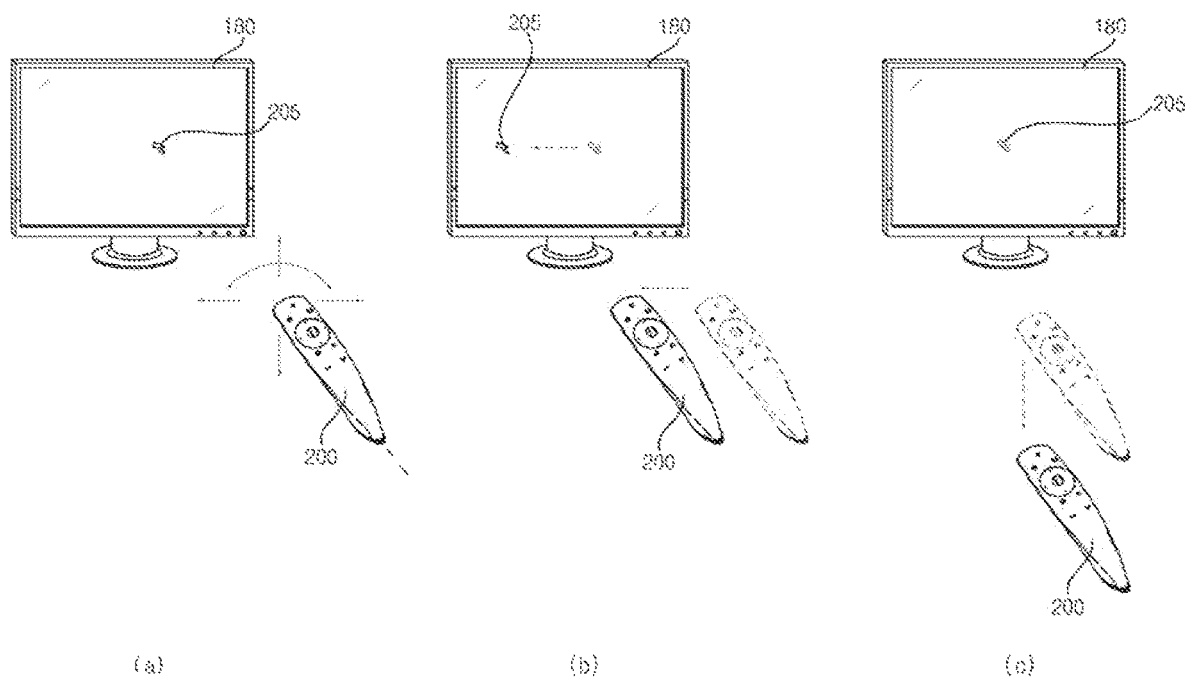
FIG. 4A, including parts (a)-(c), illustrates a method for controlling a remote controller of FIG. 2 according to an embodiment of the present disclosure.

FIG. 4A illustrates a method for controlling the remote controller of FIG. 2.

As illustrated in FIG. 4A(a), a pointer 205 corresponding to the remote controller 200 can be displayed on the display 180.

The user can move the remote controller 200 up and down, left and right (FIG. 4A(b)), or back and forth (FIG. 4A(c)) or rotate the same. The pointer 205 displayed on the display 180 of the image display apparatus corresponds to movement of the remote controller 200. As illustrated in the drawings, since the pointer 205 moves according to movement of the remote controller 200 in the 3D space, the remote controller 200 can be referred to as a spatial remote control or a 3D pointing device.

FIG. 4A(b) illustrates a case where the pointer 205 displayed on the display 180 of the image display apparatus moves to the left when the user moves the remote controller 200 to the left.

Information about movement of the remote controller 200 sensed through a sensor of the remote controller 200 is transmitted to the image display apparatus. The image display apparatus can calculate coordinates of the pointer 205 based on the information about the movement of the remote controller 200. The image display apparatus can display the pointer 205 such that the pointer 205 corresponds to the calculated coordinates.

FIG. 4A(c) illustrates a case where the user moves the signal processing device 170 away from display 180 in a state where the user presses down a specific button in the remote controller 200. In this case, a selected area on the display 180 corresponding to the pointer 205 can be zoomed in and displayed with the size thereof increased. On the other hand, when the user moves the remote controller 200 closer to the display 180, the selected area in the display 180 corresponding to the pointer 205 can be zoomed out and displayed with the size thereof reduced. Alternatively, the selected area can be zoomed out when the remote controller 200 moves away from the display 180, and can be zoomed in when the remote controller 200 moves closer to the display 180.

Vertical and lateral movement of the remote controller 200 may not be recognized while the specific button in the remote controller 200 is pressed down. That is, when the remote controller 200 approaches or moves away from the display 180, vertical and lateral movements thereof may not be recognized, but back-and-forth movement thereof can be recognized. When the specific button in the remote controller 200 is not pressed down, the pointer 205 only moves according to vertical and lateral movements of the remote controller 200.

The speed and direction of movement of the pointer 205 can correspond to the speed and direction of movement of the remote controller 200.

Figure 4B:
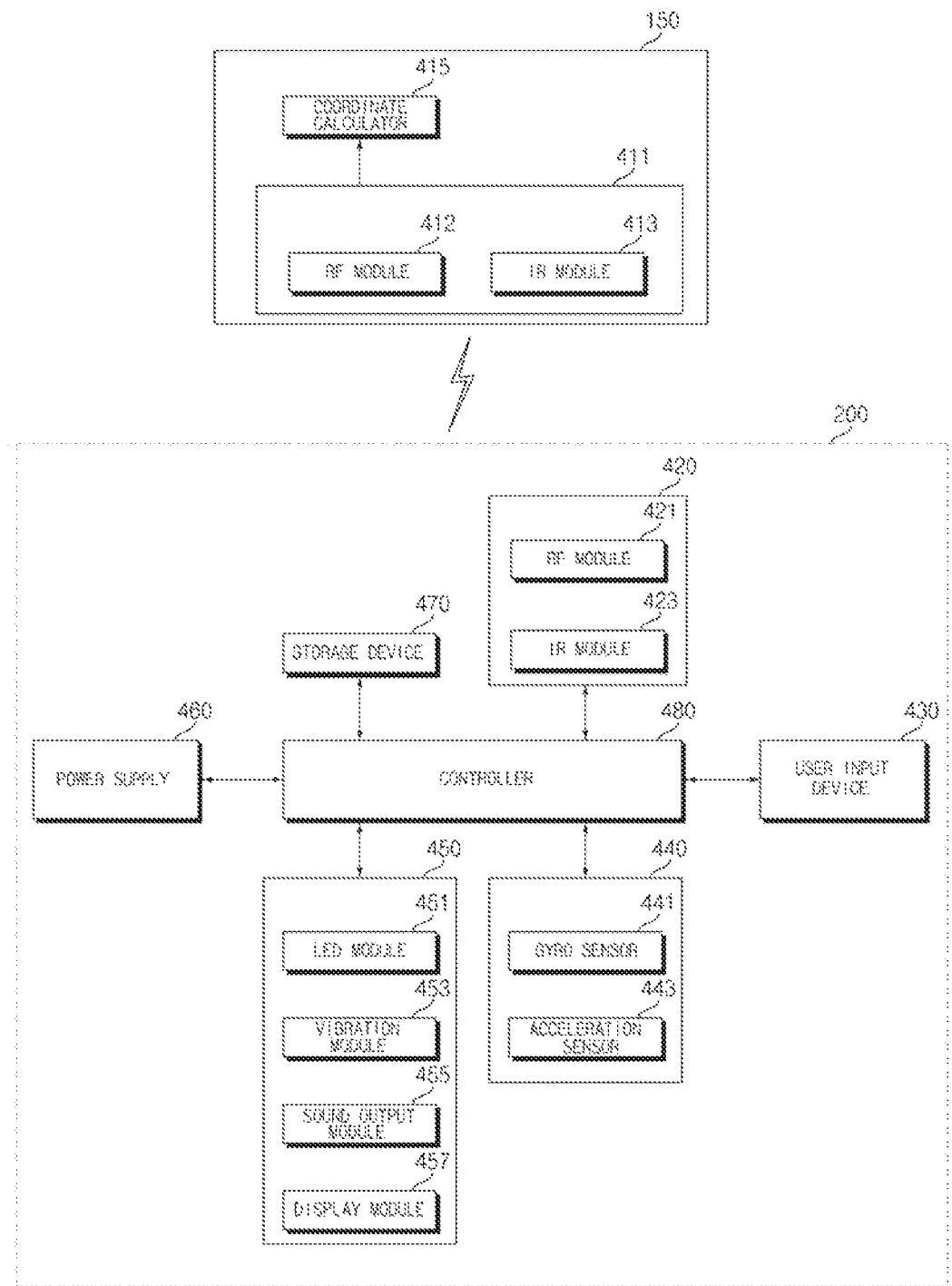
FIG. 4B is an internal block diagram illustrating the remote controller of FIG. 2 according to an embodiment of the present disclosure.

FIG. 4B is an internal block diagram illustrating the remote controller of FIG. 2.

Referring to FIG. 4B, the remote controller 200 can include a wireless transceiver 425, a user input device 430, a sensor device 440, an output device 450, a power supply 460, a storage device 470, and a controller 480.

The wireless transceiver 425 transmits and receives signals to and from one of the image display apparatuses according to embodiments of the present disclosure described above. Hereinafter, one image display apparatus 100 according to one embodiment of the present disclosure will be described.

In this embodiment, the remote controller 200 can include an RF module 421 capable of transmitting and receiving signals to and from the image display apparatus 100 according to an RF communication standard. The remote controller 200 can further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 can receive a signal from the image display apparatus 100 via the RF module 421. When necessary, the remote controller 200 can transmit commands related to power on/off, channel change, and volume change to the image display apparatus 100 via the IR module 423.

The user input device 430 can include a keypad, a button, a touchpad, or a touchscreen. The user can input a command related to the image display apparatus 100 with the remote controller 200 by manipulating the user input device 435. When the user input device 435 includes a hard key button, the user can input a command related to the image display apparatus 100 with the remote controller 200 by pressing the hard key button. When the user input device 435 includes a touchscreen, the user can input a command related to the image display apparatus 100 with the remote controller 200 by touching a soft key on the touchscreen. The user input device 430 can include various kinds of input means such as a scroll key and a jog key which are manipulatable by the user, but it should be noted that this embodiment does not limit the scope of the present disclosure.

The sensor device 440 can include a gyro sensor 441 or an acceleration sensor 443. The gyro sensor 441 can sense information about movement of the remote controller 200.

For example, the gyro sensor 441 can sense information about movement of the remote controller 200 with respect to the X, Y and Z axes. The acceleration sensor 443 can sense information about the movement speed of the remote controller 200. The sensor device 440 can further include a distance measurement sensor to sense a distance to the display 180.

The output device 450 can output an image signal or voice signal corresponding to manipulation of the user input device 435 or a signal transmitted from the image display apparatus 100. The user can recognize, via the output device 450, whether the user input device 435 is manipulated or the image display apparatus 100 is controlled.

For example, the output device 450 can include an LED module 451 to be turned on when the user input device 35 is operated or signals are transmitted to and received from the image display apparatus 100 via the wireless transceiver 425, a vibration module 453 to generate vibration, a sound output module 455 to output sound, or a display module 457 to output an image.

The power supply 460 supplies power to the remote controller 200. When the remote controller 200 does not move for a predetermined time, the power supply 460 can stop supplying power to save power. The power supply 460 can resume supply of power when the predetermined key provided to the remote controller 200 is manipulated.

The storage device 470 can store various kinds of programs and application data necessary for control or operation of the remote controller 200. When the remote controller 200 wirelessly transmits and receives signals to and from the image display apparatus 100 via the RF module 421, the remote controller 200 and the image display apparatus 100 can transmit and receive signals in a predetermined frequency band. The controller 480 of the remote controller 200 can store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 can transmit, via the wireless transceiver 425, a signal corresponding to manipulation of a predetermined key in the user input device 435 or a signal corresponding to movement of the remote controller 200 sensed by the sensor device 440 to the image display apparatus 100.

The user input interface 150 of the image display apparatus 100 can include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 can wirelessly transmit and receive signals to and from the remote controller 200 via an RF module 412. In addition, the user input interface 150 can receive, via an IR module 413, a signal transmitted from the remote controller 200 according to an IR communication standard.

The coordinate calculator 415 can calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 can determine information about an operation of the remote controller 200 or manipulation of a key from the signal transmitted from the remote controller 200, and control the image display apparatus 100 according to the information.

As another example, the remote controller 200 can calculate coordinates of the pointer corresponding to movement thereof and output the same to the user input interface 150 of the image display apparatus 100. In this case, the user input interface 150 of the image display apparatus 100 can transmit, to the signal processing device 170, information about the received coordinates of the pointer without separately correcting hand tremor or the error.

As another example, in contrast with the example of the drawing, the coordinate calculator 415 can be provided in the signal processing device 170 rather than in the user input interface 150.

Figure 5:
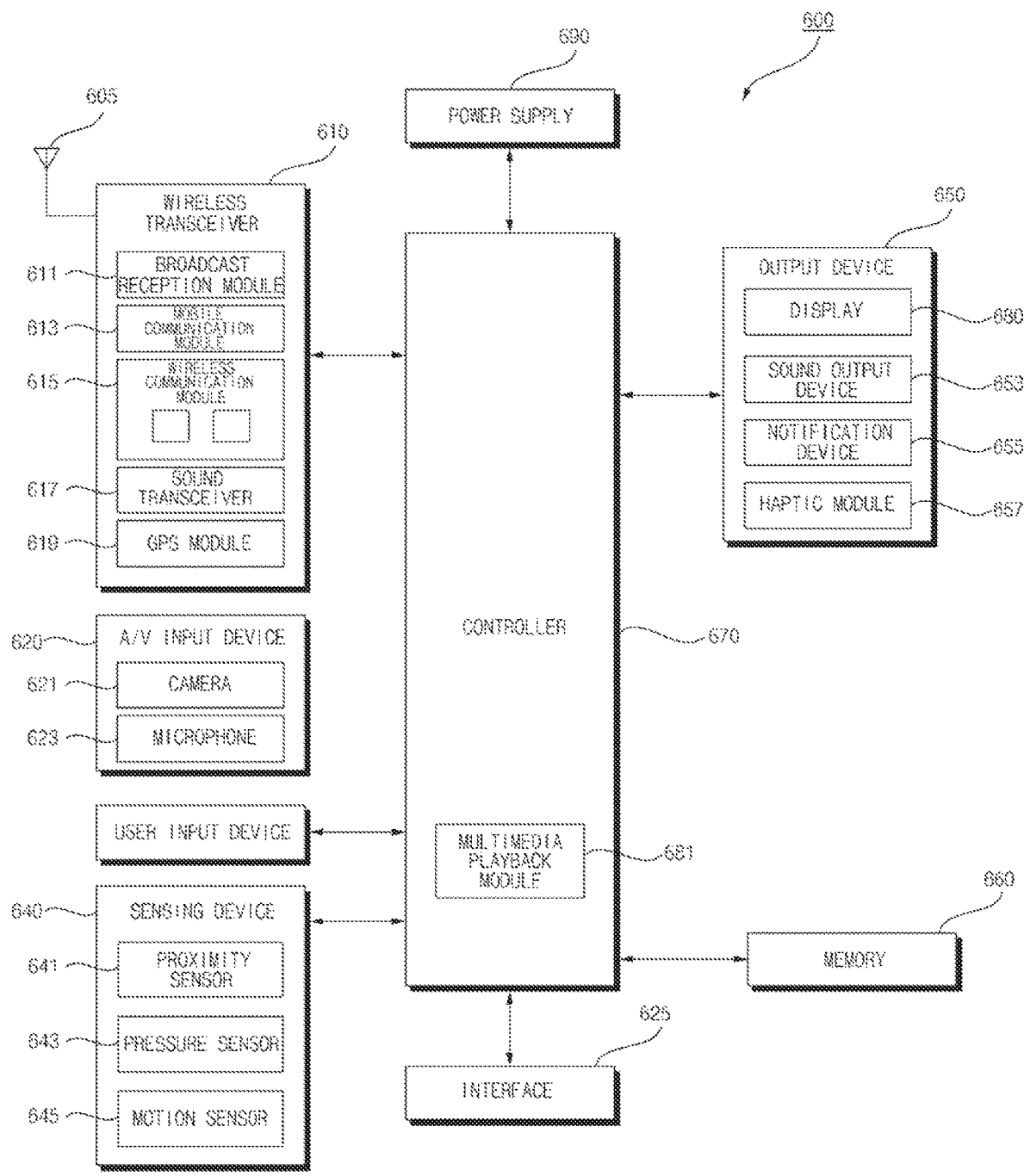
FIG. 5 is an internal block diagram illustrating a mobile terminal of FIG. 1 according to an embodiment of the present disclosure.

FIG. 5 is an internal block diagram illustrating the mobile terminal of FIG. 1.

Referring to FIG. 5, the mobile terminal 600 can include a wireless transceiver 610, an audio/video (A/V) input device 620, a user input device 630, a sensing device 640, and an output device 650, a memory 660, an interface 625, a controller 670 and a power supply 690.

The wireless transceiver 610 can include a broadcast reception module 611, a mobile communication module 613, a wireless communication module 615, a sound transceiver 617, and a GPS module 619.

The broadcast reception module 611 can receive at least one of a broadcast signal or broadcast-related information from an external broadcast management server over a broadcast channel. Herein, the broadcast channel can include a satellite channel and a terrestrial channel.

The broadcast signal and/or broadcast-related information received through the broadcaster reception module 611 can be stored in the memory 660.

The mobile communication module 613 transmits and receives a radio signal to and from at least one of a base station, an external terminal or a server over a mobile communication network. Herein, the radio signal can include a voice call signal, a video call signal, or various kinds of data according to transmission and reception of a text/multimedia message.

The wireless communication module 615, which refers to a module for wireless communication access, can be installed inside or outside the mobile terminal 600. For example, the wireless communication module 615 can perform Wi-Fi-based wireless communication or Wi-Fi Direct-based wireless communication.

The sound transceiver 617 can perform sound communication. In the sound communication mode, the sound transceiver 617 can add data of predetermined information to audio data which is to be output and output sound. In addition, in the sound communication mode, the sound transceiver 617 can extract data of predetermined information from received sound.

Applicable short-range communication technologies can include BLUETOOTH, radio frequency identification (RFID), Infrared Data Association (IrDA), Ultra-Wideband (UWB), and ZIGBEE.

The GPS module 619 can receive location information from a plurality of GPS satellites.

The A/V input device 620 is used for input of an audio signal or a video signal and can include a camera 621 and a microphone 623.

The user input device 630 generates key input data input by the user to control operation of a terminal of the user. To this end, the user input device 630 can include a keypad, a dome switch, and a touchpad (resistive touchpad/capacitive touchpad). In particular, the touchpad can form a layered architecture together with the display 680, thereby realizing a touchscreen.

The sensing device 640 can generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing device 640 can include a proximity sensor 641, a pressure sensor 643 and a motion sensor 645. The motion sensor 645 can employ an acceleration sensor, a gyro sensor, a gravity sensor and the like to sense movement or the location of the mobile terminal. In particular, the gyro sensor, which is used to measure an angular speed, can sense orientation (angle) of the mobile terminal with respect to a reference direction.

The output device 650 can include a display 680, an audio output device 653, a notification device 655, and a haptic module 657.

The display 680 outputs and displays information processed by the mobile terminal 600.

As described above, when the display 680 forms a layered architecture with the touchpad to implement a touchscreen, the display 680 can be used not only as an output device but also as an input device for input of information according to user touch.

The audio output device 653 outputs audio data received from the wireless transceiver 610 or stored in the memory 660. The audio output device 653 can include a speaker and a buzzer.

The notification device 655 outputs a signal for reporting occurrence of an event in the mobile terminal 600. For example, the notification device 655 can output a signal in the form of vibration.

The haptic module 657 generates various haptic effects which can be felt by the user. A typical example of the haptic effects generated by the haptic module 657 is vibration.

The memory 660 can store a program for processing and control of the controller 670, and functions to temporarily store input data or output data (e.g., a phonebook, a message, a still image, a moving image, or the like).

The interface 625 serves as an interface for all devices connected to the mobile terminal 600. The interface 625 can serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 can perform control or processing related to voice communication, data communication, video communication, and the like. The controller 670 can also include a multimedia playback module 681 to reproduce multimedia. The multimedia playback module 681 can be provided in the controller 670 as hardware or can be configured separately from the controller 670.

The power supply 690 supplies power necessary for operations of the respective constituents according to control of the controller 670 when external power or internal power is applied thereto.

The block diagram of the mobile terminal 600 illustrated in FIG. 5 is simply illustrative. The respective constituents of the block diagram can be integrated, added or omitted according to the specifications of the mobile terminal 600. That is, two or more constituents can be combined into one constituent, or one constituent can be subdivided into two or more constituents, when necessary. In addition, the function performed in each block is simply illustrative, and it should be noted that specified operations or devices of the blocks do not limit the scope of the present disclosure.

Figure 6:
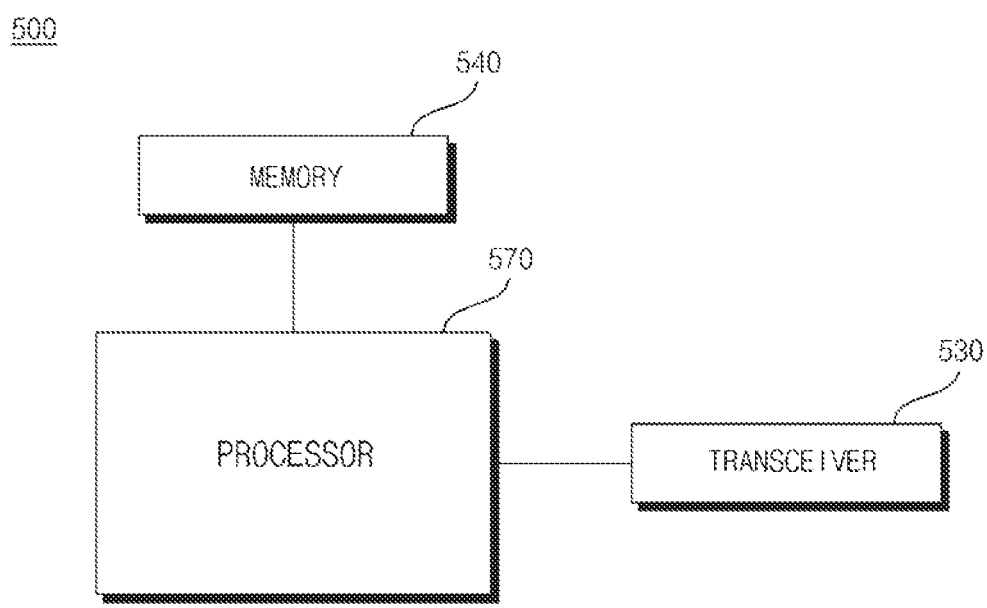
FIG. 6 is an internal block diagram of a server of FIG. 1 according to an embodiment of the present disclosure.

FIG. 6 is an internal block diagram of the server of FIG. 1.

Referring to FIG. 6, the server 500 includes a transceiver 530 exchanging data with the external image display apparatus 100 and the mobile terminal 600, a memory 540 storing various data, and a processor 570 processing data.

The processor 570 in the server 500 can be configured to arrange and transmit the collected chatting conversation contents to the outside in response to a request for chatting conversation content for a specific broadcast image from the image display apparatus 100 or the mobile terminal 600.

In particular, the processor 570 in the server 500 can be configured to perform grouping by region based on location information received from the image display apparatus 100 or the mobile terminal 600, collect chatting conversation contents for a broadcast image based on a specific region, and transmit the collected chatting conversation contents to the image display apparatus 100 or the mobile terminal 600.

Alternatively, the processor 570 in the server 500 can be configured to perform grouping by viewing age, grouping by viewing gender, or grouping by viewing propensity based on viewer information received from the image display apparatus 100 or the mobile terminal 600, collect chatting conversation contents for a broadcast image based on a specific region, and transmit the collected chatting conversation contents to the image display apparatus 100 or the mobile terminal 600.

When the conversation content information according to the conversation content input is received from the image display apparatus 100 or the mobile terminal 600, the processor 570 in the server 500 can be configured to update the conversation content information and provide the updated chatting conversation content to the image display apparatus 100, the mobile terminal 600, or the like.

Figure 7:
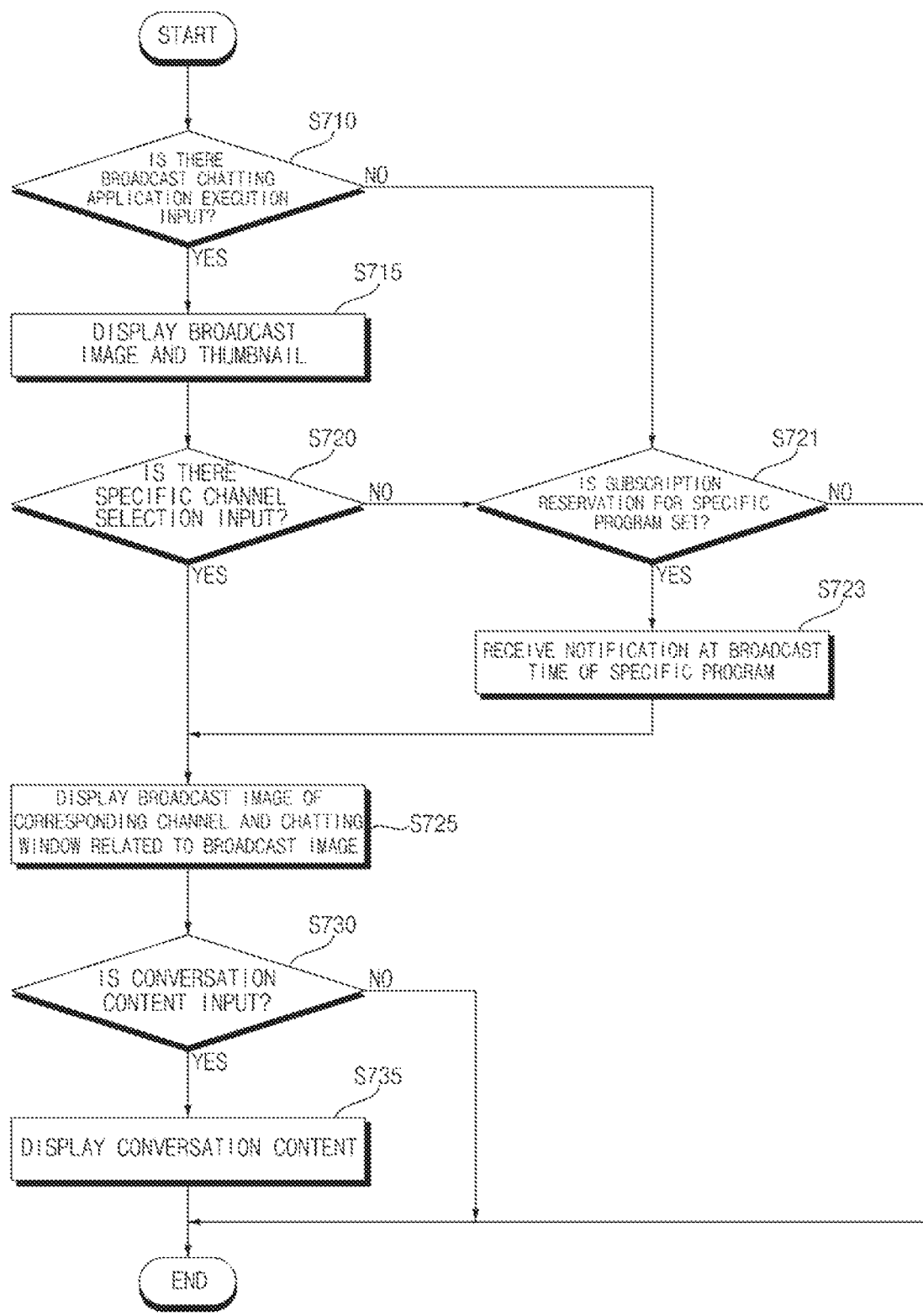
FIG. 7 is a flowchart illustrating an example of a method of operating a mobile terminal according to an embodiment of present disclosure.

FIG. 7 is a flowchart illustrating an example of an operating method of a mobile terminal according to one embodiment of present disclosure, and FIGS. 8A to 16D are views referenced for description of the operating method of FIG. 7.

Referring to the drawings, the controller 670 in the mobile terminal 600 determines whether there is a broadcast chatting application execution input based on the input signal (S710), and when it is determined that there is a broadcast chatting application execution input, the controller 670 executes the broadcast chatting application (S715).

Figure 8A:
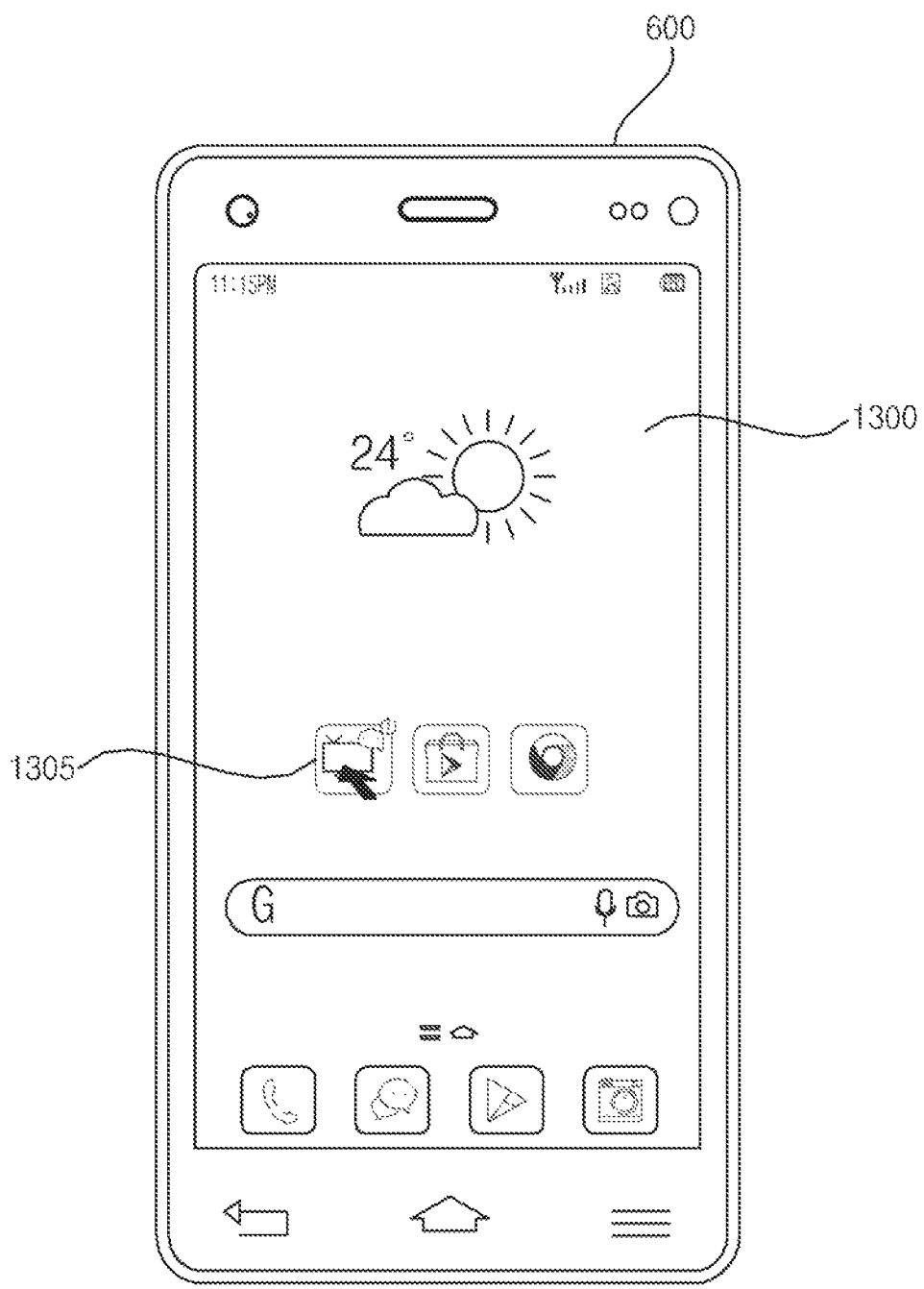
FIGS. 8A to 16D are diagrams referenced for description of the operation method of FIG. 7 according to embodiments of the present disclosure.

For example, the controller 670 in the mobile terminal 600 can be configured to display a screen 1300 including a plurality of application items, as illustrated in FIG. 8A.

FIG. 8A illustrates the screen 1300 that includes the plurality of application items.

Meanwhile, the controller 670 in the mobile terminal 600 can be configured to execute the broadcast chatting application when a broadcast chatting application item 1305 is selected from among the plurality of application items in the screen 1300 including a plurality of application items.

Figure 8B:
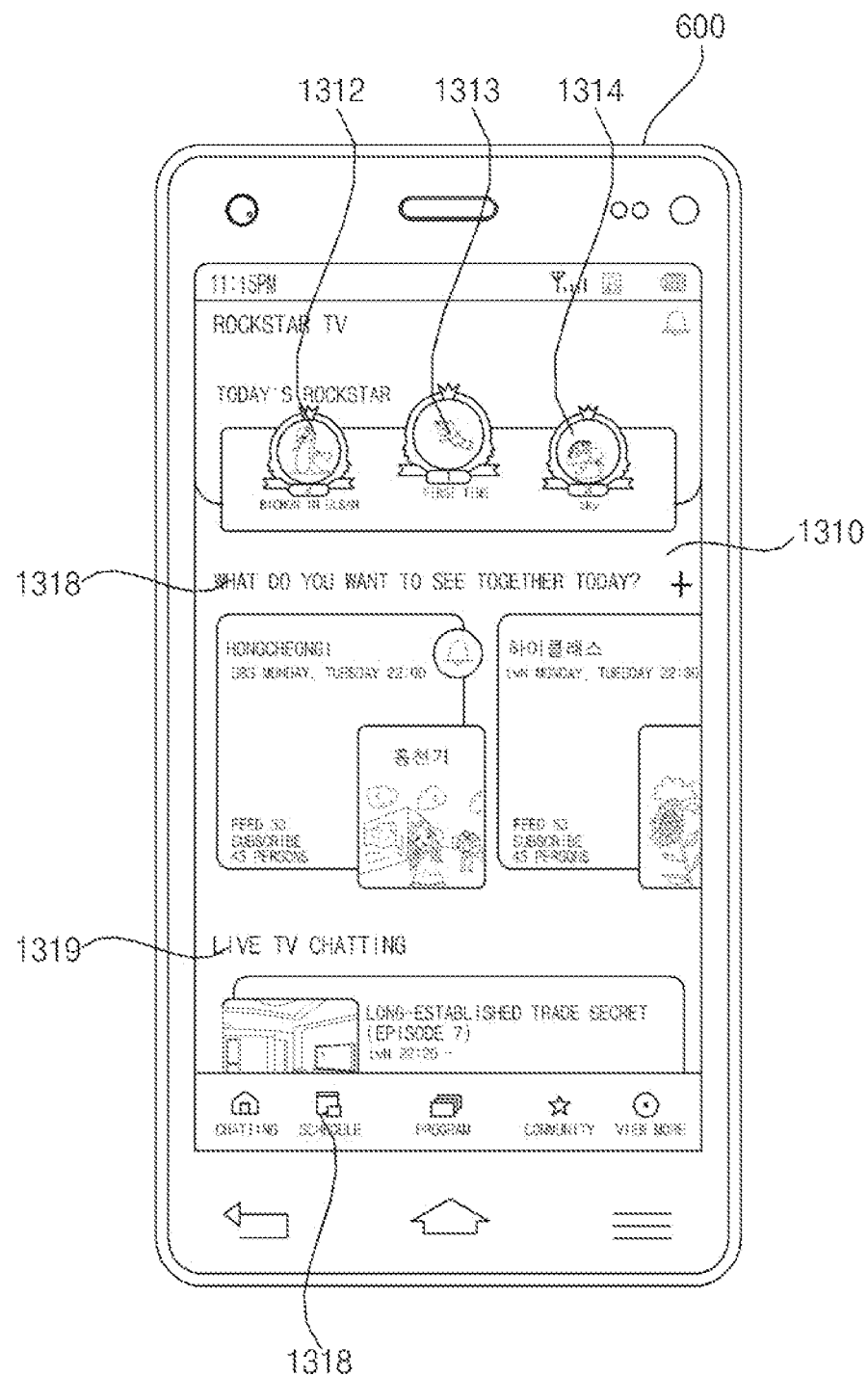

FIG. 8B illustrates that the broadcast chatting application is executed and a broadcast chatting application screen 1310 is displayed according to selection of the broadcast chatting application item 1305.

In a state where the broadcast chatting application screen 1310 is displayed, the controller 670 in the mobile terminal 600 determines whether there is a specific broadcast program selection input of a specific channel (S720), and when it is determined that there is the specific broadcast program selection input of the specific channel, the controller 670 can be configured to display the chatting window related to the broadcast image or the broadcast related chatting screen (S725).

When there is no specific channel selection input, the controller 670 in the mobile terminal 600 determines whether a broadcast program subscription reservation for the specific channel is set (S721), and when the broadcast program subscription reservation is set, the controller 670 receives notification at the broadcast time of the corresponding broadcast program (S723) and can be configured to display a chatting window related to the corresponding broadcast program or the broadcast related chatting screen.

Meanwhile, when the conversation content is input based on the input signal in a state where the chatting window or the broadcast related chatting screen is displayed, the controller 670 in the mobile terminal 600 can be configured to transmit the input conversation content to the server 500 and display the input conversation content in the chatting window or the broadcast related chatting screen (S735).

Accordingly, it is possible to input and display the chatting conversation content related to the broadcast image.

Meanwhile, based on the execution of the broadcast chatting application 1305, as illustrated in FIG. 8B, the controller 670 can be configured to display the chatting application screen 1310 including conversation content ranking icons 1312, 1313, and 1314 and a schedule item 1318.

For example, the controller 670 in the mobile terminal 600 can be configured to access the server 500 through the wireless transceiver 610 based on the execution of the broadcast chatting application 1305, receive the chatting application screen 1310 including the content ranking icons 1312, 1313, and 1314 and the schedule item 1318 from the server 500, and display the chatting application screen 1310. In this way, the broadcast related chatting screen can be displayed through the chatting application screen.

The conversation content ranking icons 1312, 1313, and 1314 can be ranking icons according to the number of preferences or recommendations for the chatting conversation content. Accordingly, it is possible to conveniently provide the most popular chatting conversation content.

Figure 8C:
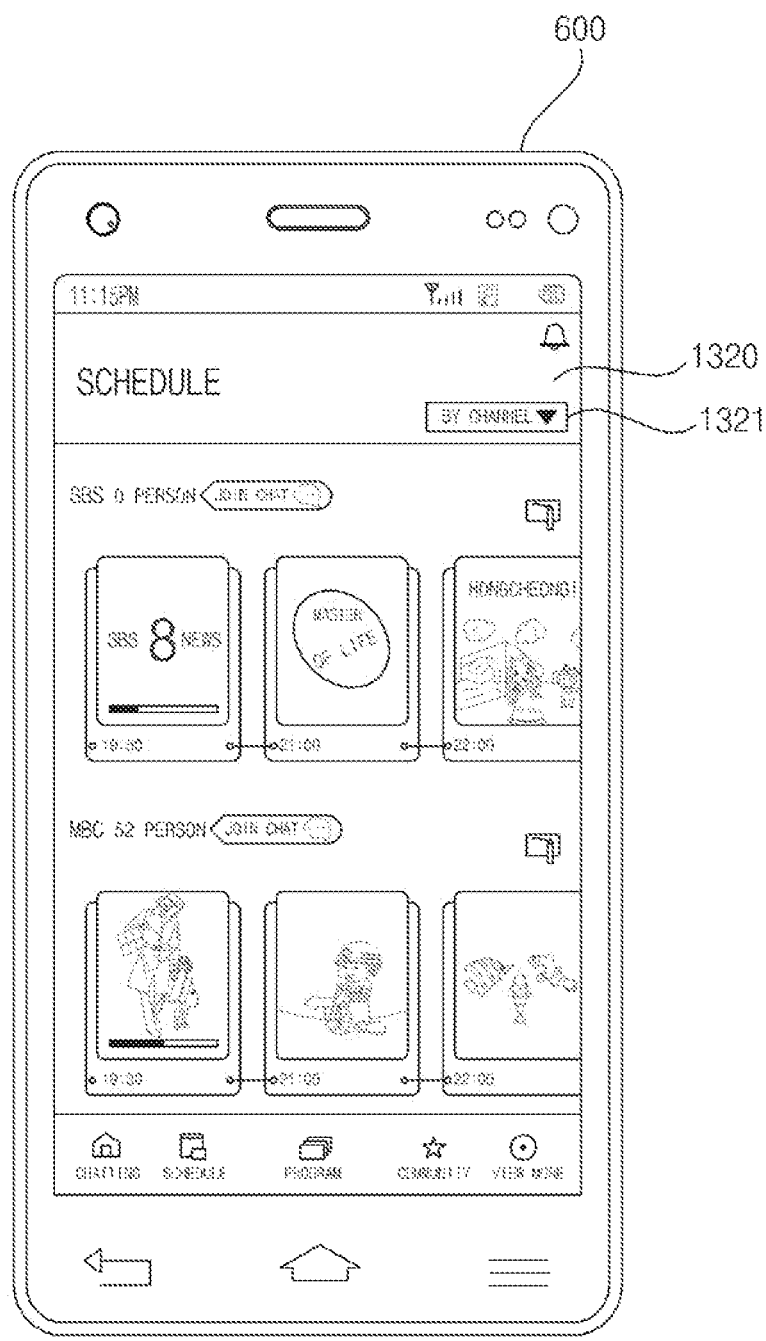

Meanwhile, when the schedule item 1318 in the chatting application screen 1310 of FIG. 8B is selected, as illustrated in FIG. 8C, the controller 670 can be configured to receive a schedule list screen 1320 including a plurality of broadcast program items from the server 500 and display the schedule list screen 1320. Moreover, when any one program item among a plurality of program items is selected, as illustrated in FIG. 9D, the controller 670 can be configured to receive a broadcast related chatting screen 1340 including a broadcast program related chatting input window 1347 selected from the server 500 and display the broadcast related chatting screen 1340. In this way, the broadcast related chatting screen can be displayed through the chatting application screen and the schedule list screen 1320.

Figure 9A:
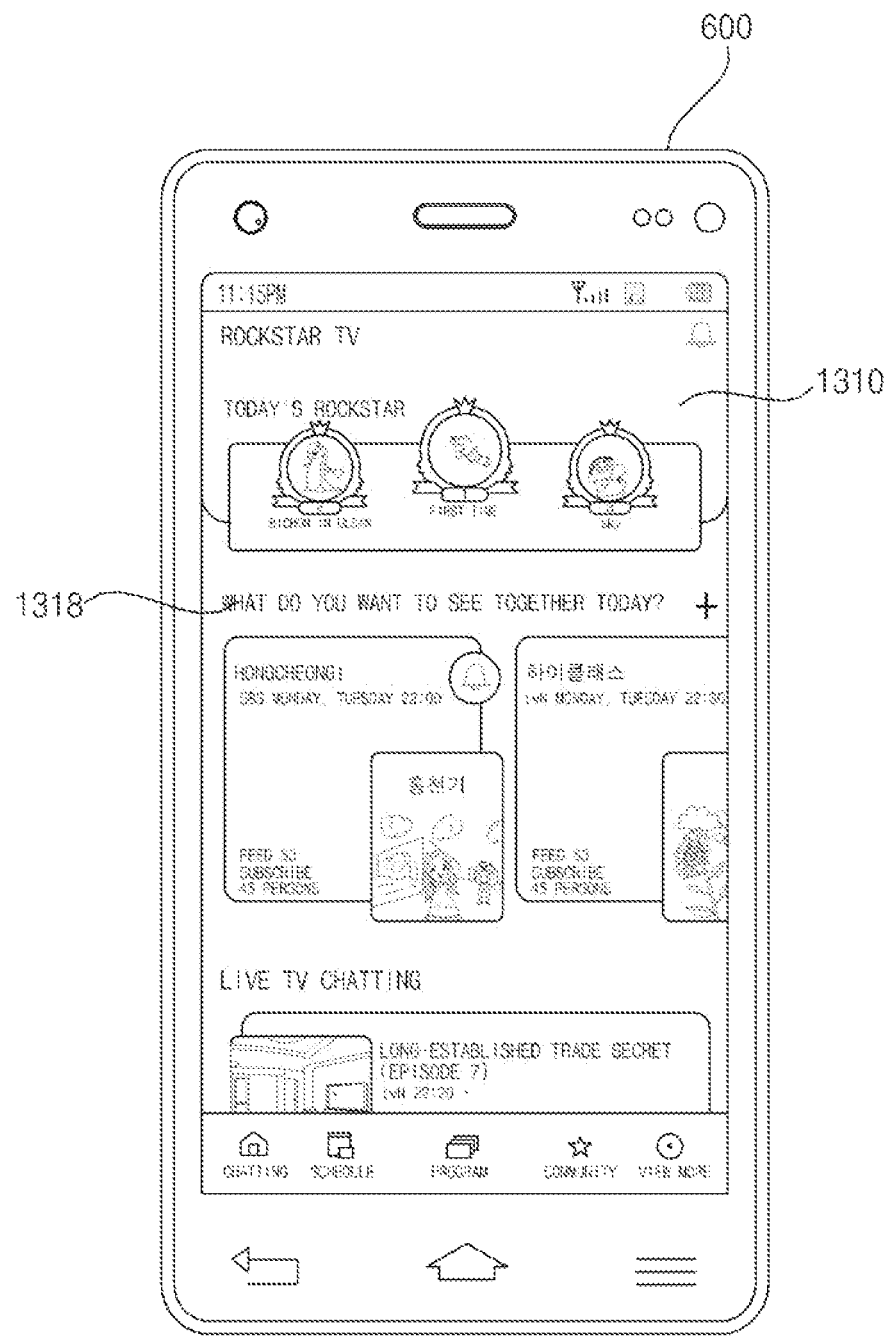
Figure 9B:
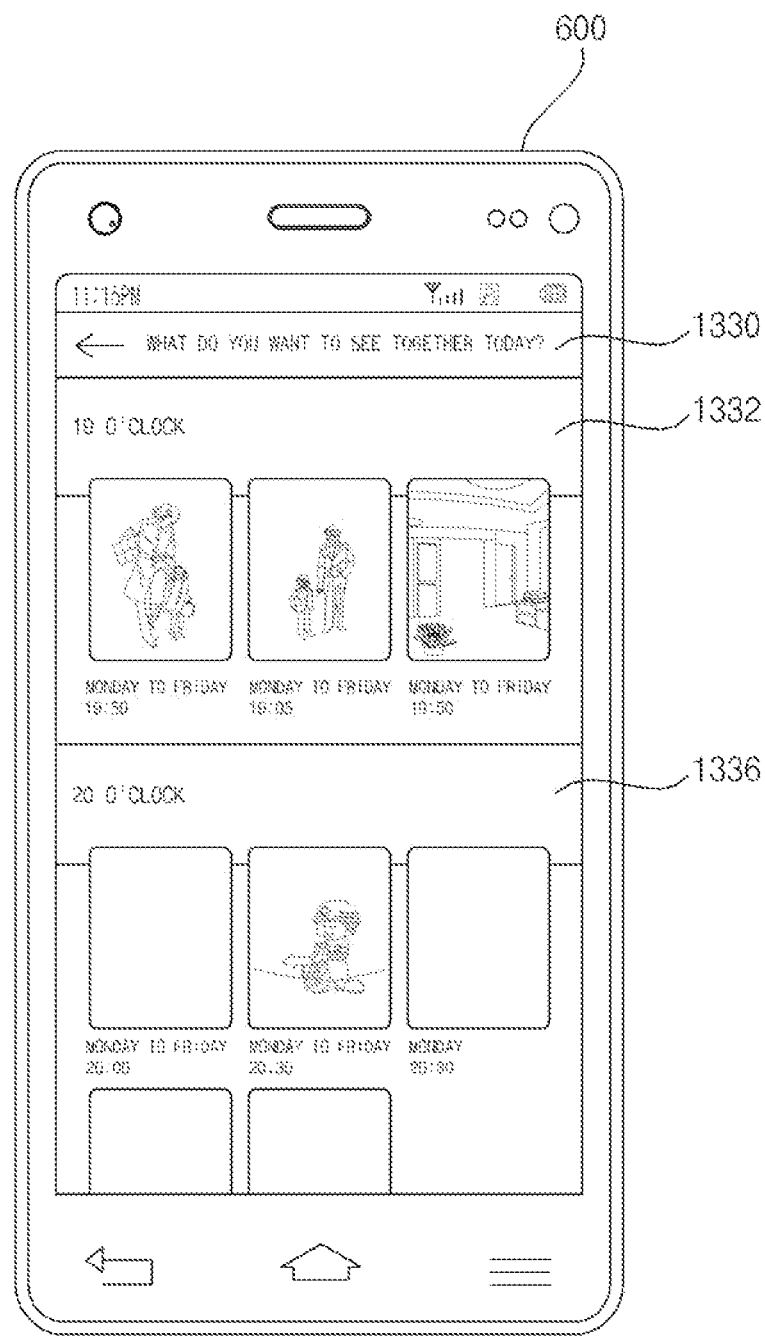

As illustrated in FIG. 9A, when the sharing viewing item 1318 in the chatting application screen 1310 is selected, the controller 670 of the mobile terminal 600 can be configured to receive the sharing viewing screen 1330 including the plurality of broadcast program items from the server 500 and display the sharing viewing screen 1330, as illustrated in FIG. 9B.

The controller 670 of the mobile terminal 600 can be configured to distinguish and display a program item 1332 of a first time zone and a program item 1336 of a second time zone within the sharing viewing screen 1330 in the order of time, as illustrated in FIG. 9B. Accordingly, it is possible to distinguish and provide program items for each time zone.

Figure 9C:
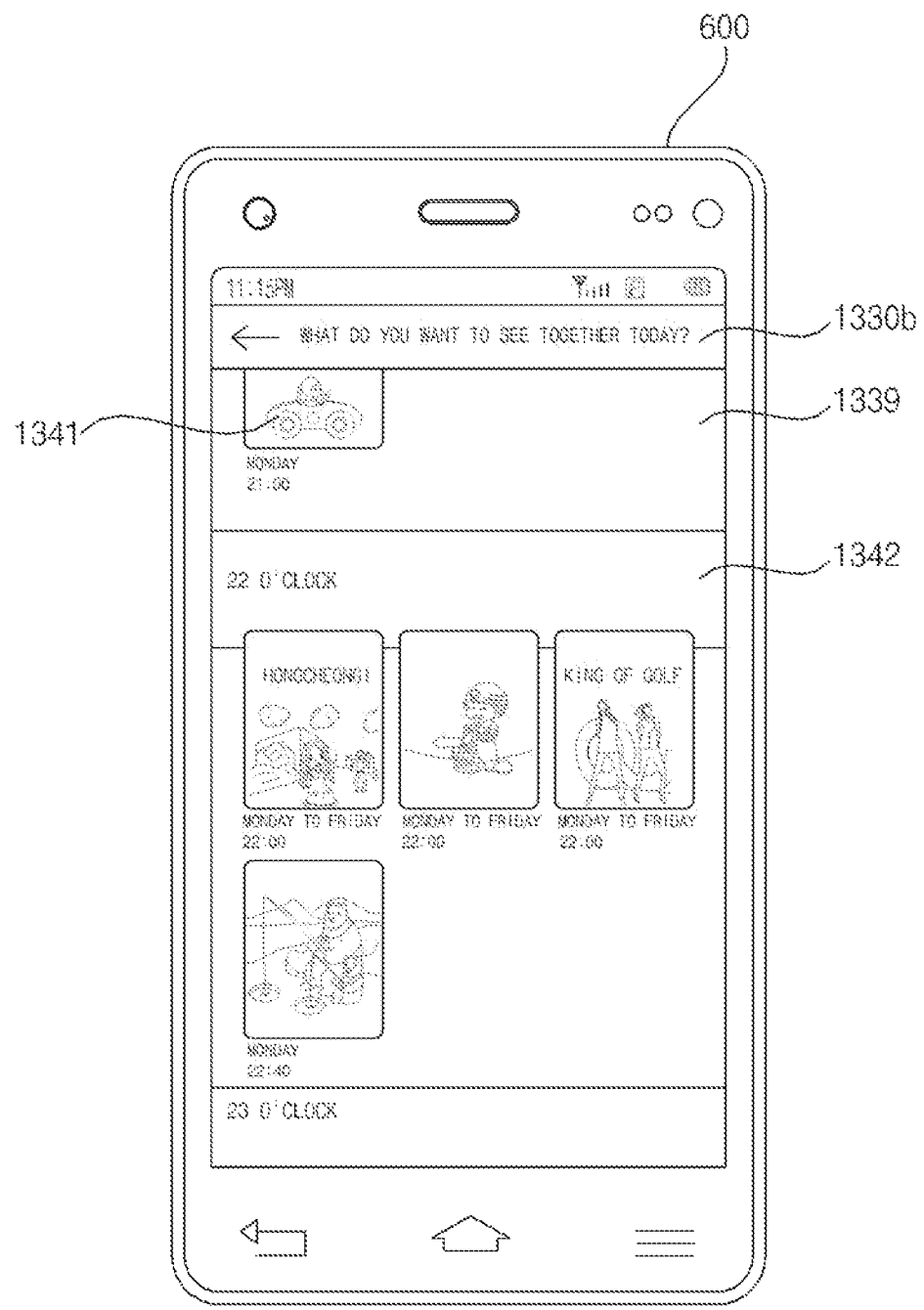
Figure 9D:
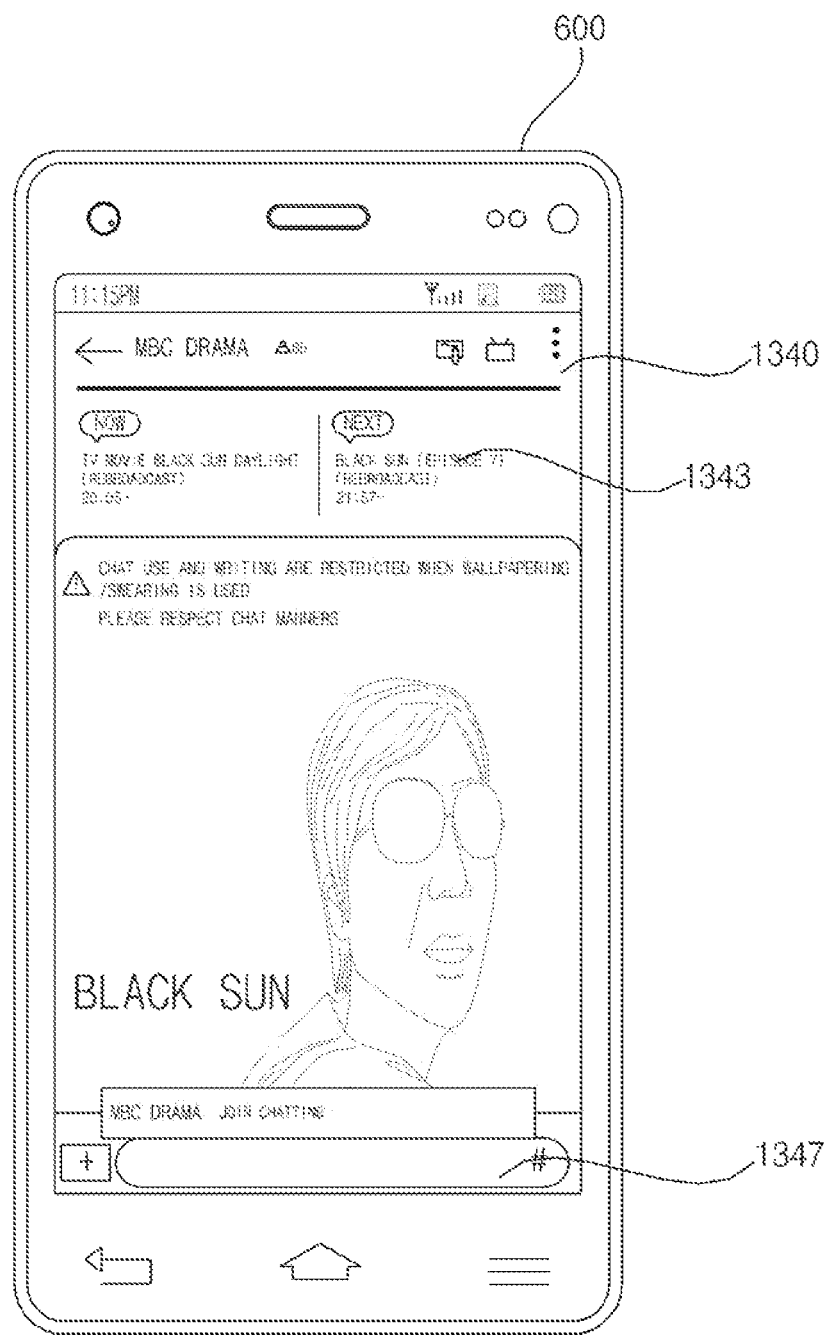

Meanwhile, the controller 670 of the mobile terminal 600 can be configured to display an additional screen 1330b of the sharing viewing screen 1330, as illustrated in FIG. 9C, when there is a scroll input in the display of the sharing viewing screen 1330 is displayed.

For example, when there is an upward scroll input or a downward scroll input in the display of the sharing viewing screen 1330, as illustrated in FIG. 9C, the controller 670 of the mobile terminal 600 can be configured to display an additional screen 1330b in which a program item 1339 of a third time zone and a program item 1342 of a fourth time zone are distinguished. Accordingly, it is possible to provide search for program items by time zone.

Meanwhile, when any one program item 1341 of the sharing viewing screen 1330 of FIG. 9B or the additional screen 1330b of FIG. 9C is selected, as illustrated in FIG. 9D, the controller 670 of the mobile terminal 600 can be configured to receive the broadcast related chatting screen 1340 including the broadcast program related chatting input window 1347 from the server 500 and display the broadcast related chatting screen 1340.

The controller 670 of the mobile terminal 600 can be configured to arrange and display the plurality of broadcast program items in the schedule list screen 1320 based on channel order or popularity order. This will be described with reference to FIGS. 10A to 10D.

FIGS. 10A to 10D illustrate that the plurality of broadcast program items in the schedule list screen 1320 are arranged and displayed in channel order or popularity order.

Figure 10A:
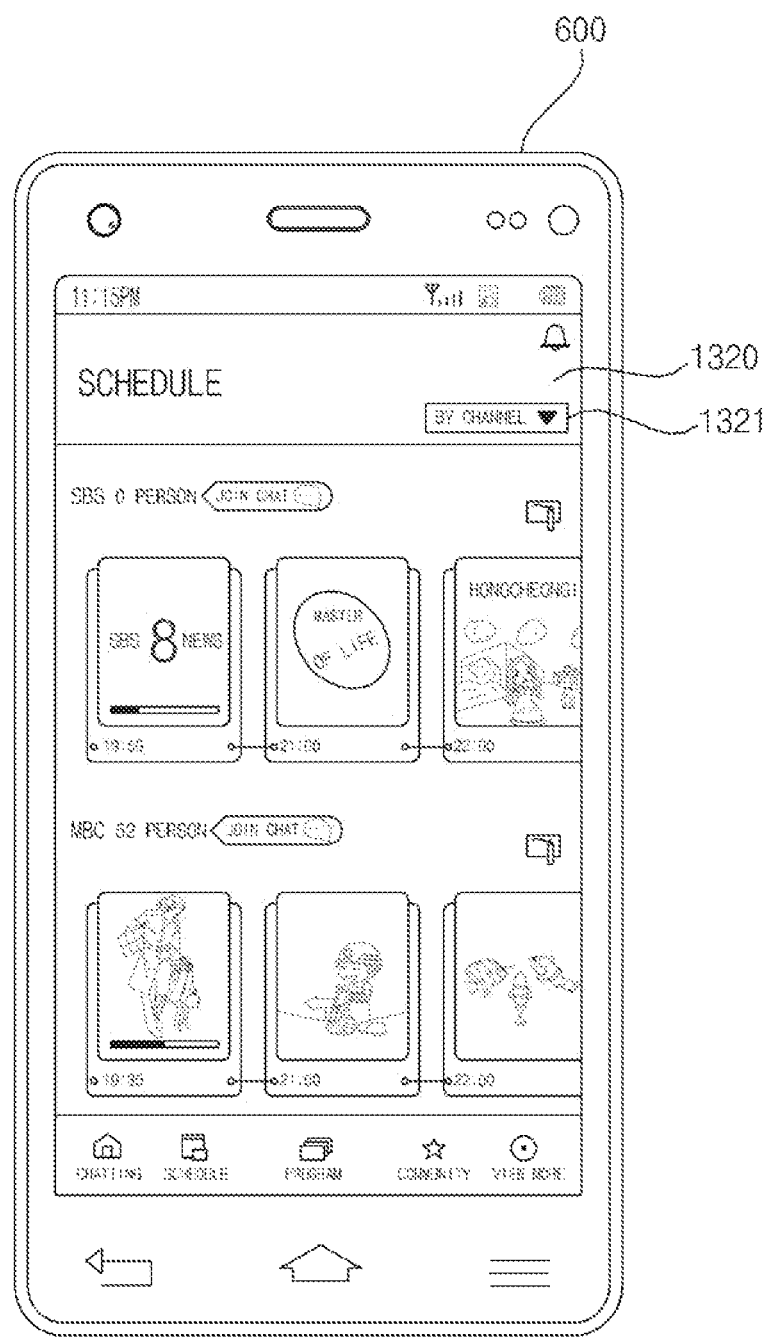

First, FIG. 10A illustrates that the plurality of broadcast program items in the schedule list screen 1320 are arranged and displayed in channel order.

As illustrated in FIG. 10A, the controller 670 of the mobile terminal 600 can be configured to distinguish and display a program item for each time of the first channel and a program item for each time of the second channel within the chatting application screen 1310 based on a channel order item 1321. Accordingly, it is possible to distinguish and provide program items for each channel.

Meanwhile, FIG. 10A illustrates that a chatting participation item is added and displayed to the program item for each channel.

When the chatting participation item is selected, the controller 670 of the mobile terminal 600 can be configured to display the broadcast related chatting screen corresponding to the corresponding broadcast.

Figure 10B:
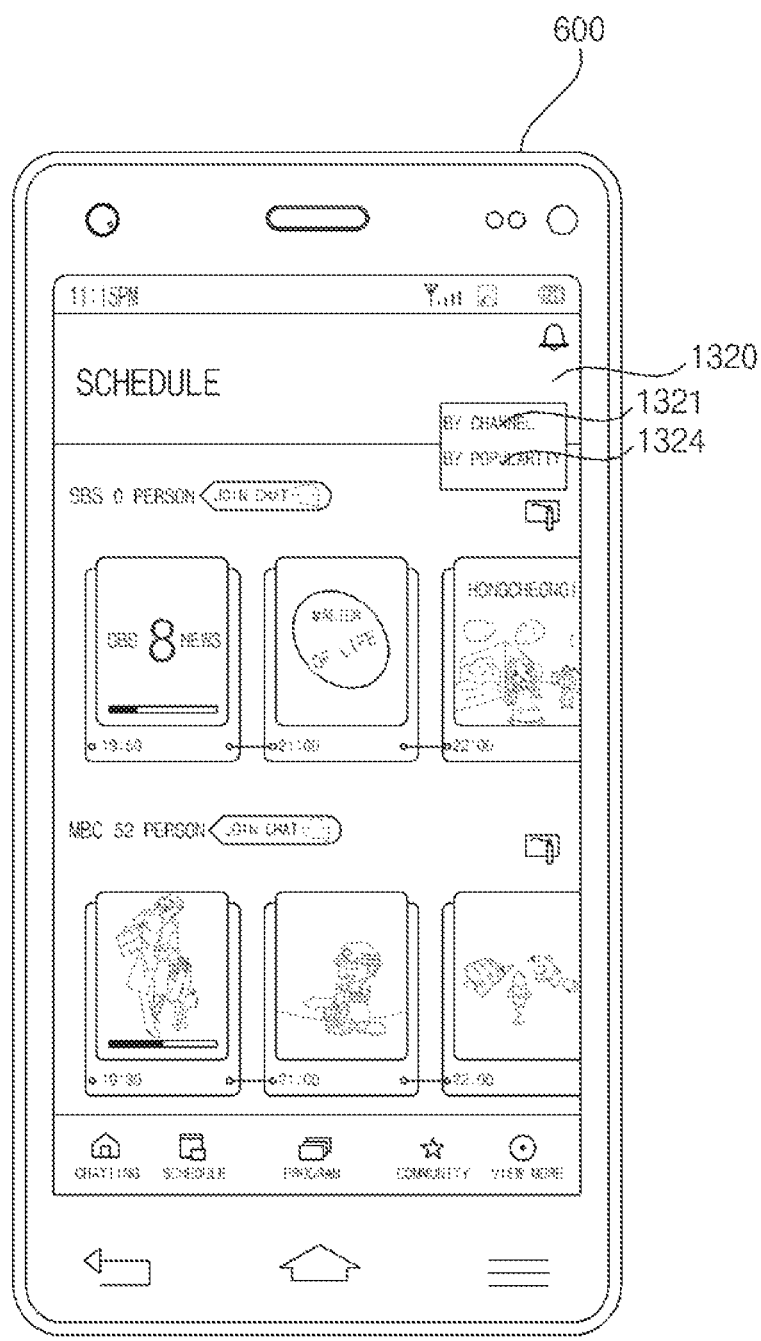

When the channel order item 1321 is focused or selected, as illustrated in FIG. 10B, the controller 670 of the mobile terminal 600 can be configured to display a pop-up menu in which the channel order item 1321 and a popularity order item 1324 are popped.

Figure 10C:
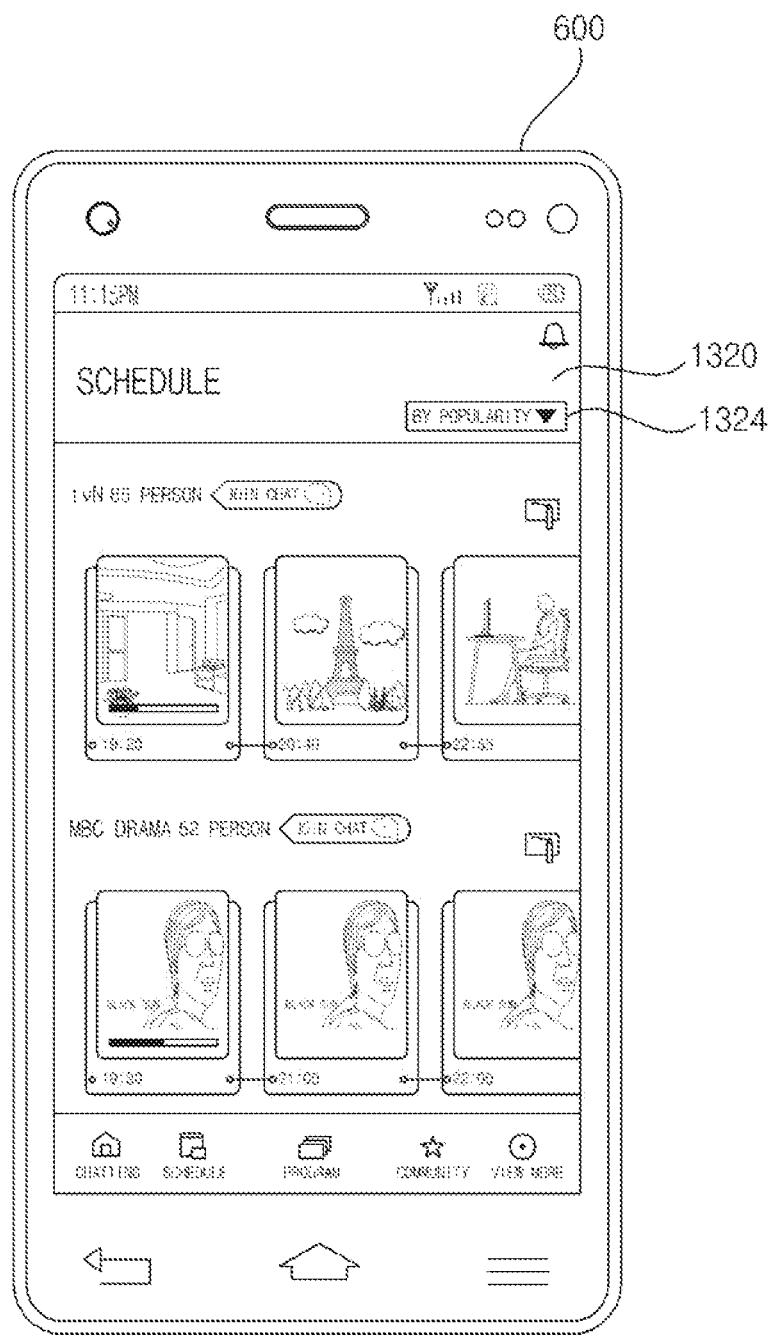

When the popularity order item 1324 in the pop-up menu is selected, as illustrated in FIG. 10C, the controller 670 of the mobile terminal 600 can be configured to arrange and display the plurality of broadcast program items in the schedule list screen 1320 based on popularity order. In this way, it is possible to arrange and display the plurality of broadcast program items.

In the drawing, it is exemplified that the schedule list screen 1320 including a program item in a first popularity order and a program item in a second popularity order is displayed.

FIG. 10C illustrates that the chatting participation item is added and displayed to a program item for each popularity.

When the chatting participation item is selected, the controller 670 of the mobile terminal 600 can be configured to display the broadcast related chatting screen corresponding to the corresponding broadcast.

Figure 10D:
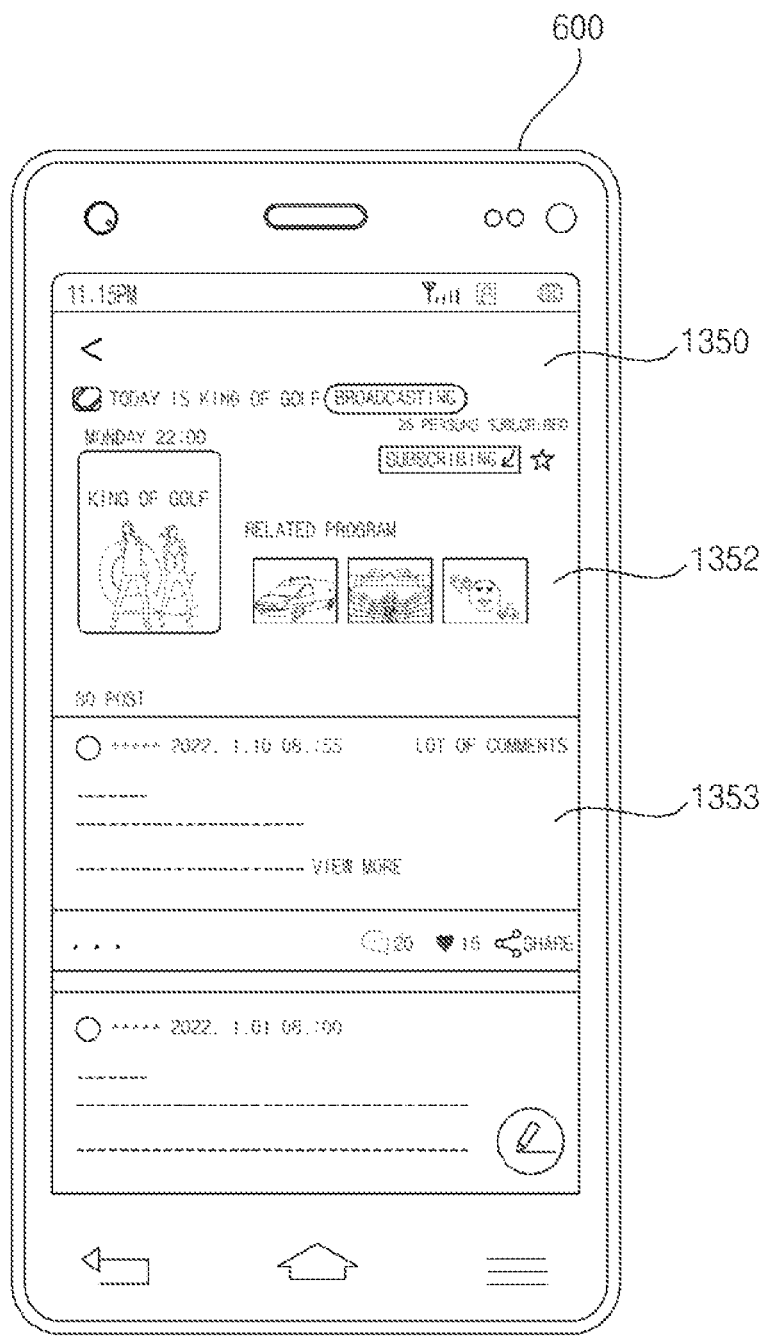

FIG. 10D illustrates an additional screen 1350 in which the schedule list screen 1320 arranged based on popularity order in FIG. 10C is scrolled and displayed.

Referring to the drawing, when there is the scroll input in the display of the schedule list screen 1320 of FIG. 10C, as illustrated in FIG. 10D, the controller 670 of the mobile terminal 600 can be configured to display an additional screen 1350b of the schedule list screen 1320.

For example, when there is the upward scroll input or the downward scroll input in the display of the schedule list screen 1320, as illustrated in FIG. 10D, the controller 670 of the mobile terminal 600 can be configured to display the additional screen 1350 in which a third popularity order program item 1352 and a fourth popularity order program item 1353 are distinguished. Accordingly, it is possible to provide search for program items by popularity order.

Figure 11A:
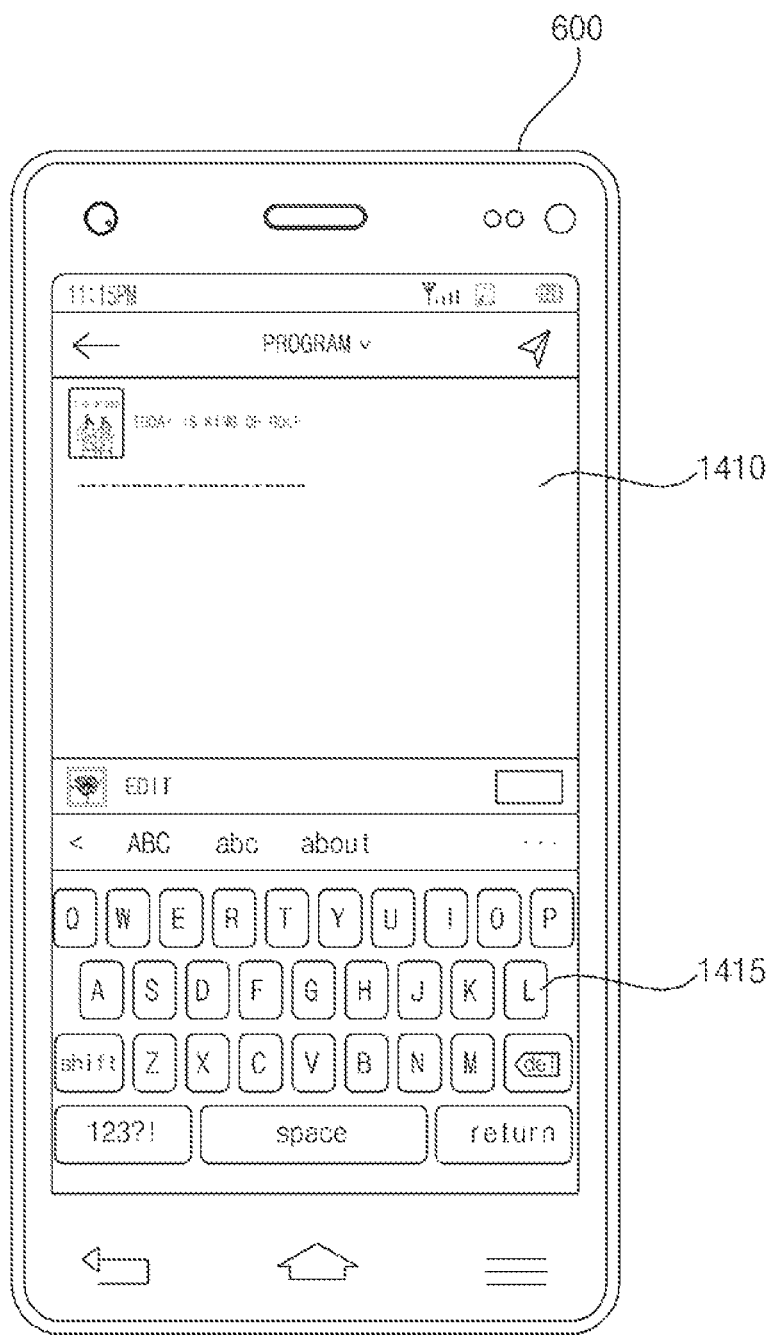

When the chatting input window 1347 displayed in FIG. 9D is selected, the controller 670 of the mobile terminal 600 can be configured to display a keyboard display window 1415 and a text input window 1410, as illustrated in FIG. 11A. Moreover, when the conversation content is input to the text input window 1410, the controller 670 can be configured to transmit the input conversation content to the server 500 and display the input conversation content on the broadcast related chatting screen. Accordingly, the broadcast related chatting screen can be shared. Furthermore, it is possible to input and display the chatting conversation content related to the broadcast image.

FIG. 11A illustrates that the keyboard display window 1415 and the text input window 1410 for chatting input for a specific broadcast program are displayed.

The controller 670 of the mobile terminal 600 can be configured to display the broadcast related chatting screen 1420 including the input conversation content after the input of the conversation content is completed.

Figure 11B:
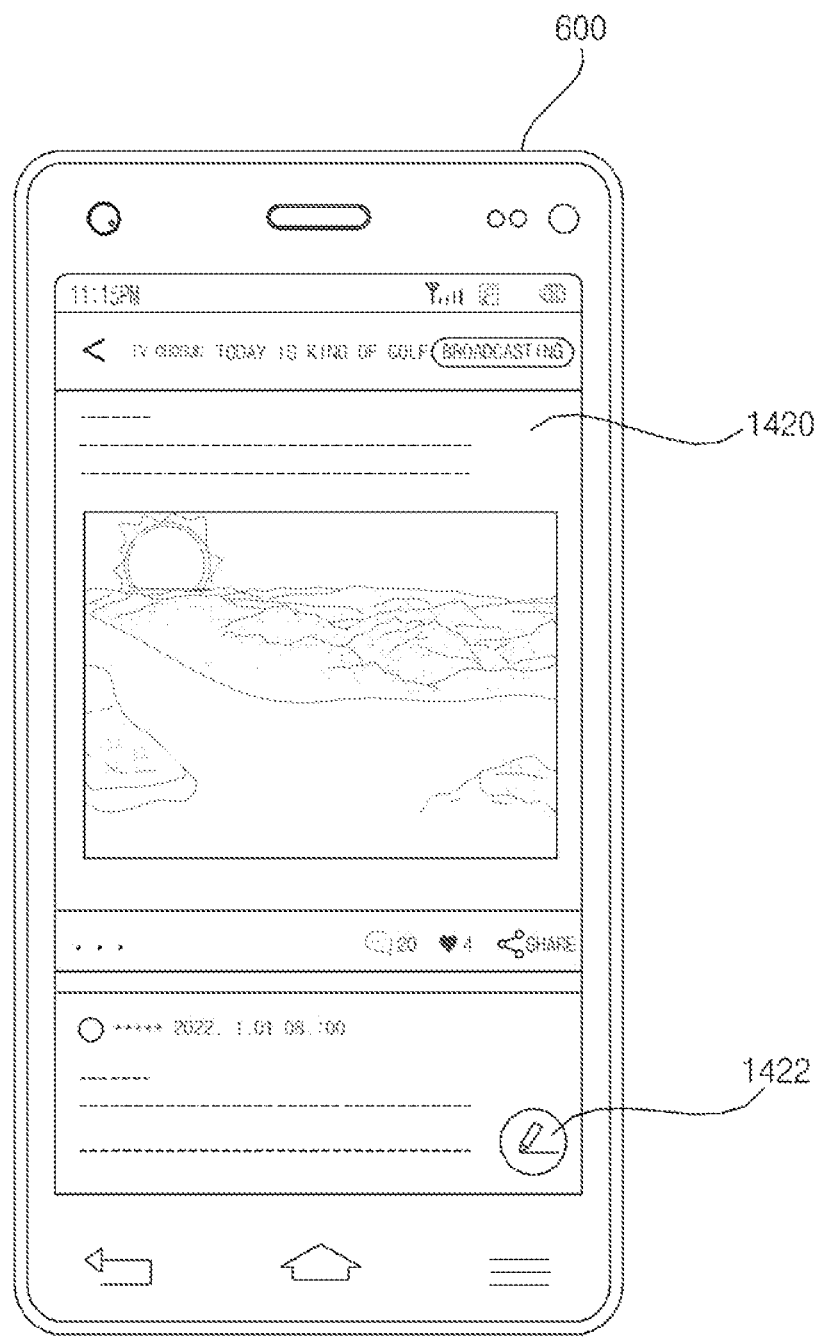

FIG. 11B illustrates an example of the broadcast related chatting screen 1420.

When the conversation content is input from a terminal other than the mobile terminal 600 or another image display apparatus, the controller 670 of the mobile terminal 600 can be configured to display conversation content input from the outside in the broadcast related chatting screen 1420.

The controller 670 of the mobile terminal 600 can be configured to edit directly input conversation content, or perform a preference or recommendation for the conversation content input from the outside by using an edit item 1422 in the broadcast related chatting screen 1420.

Figure 11C:
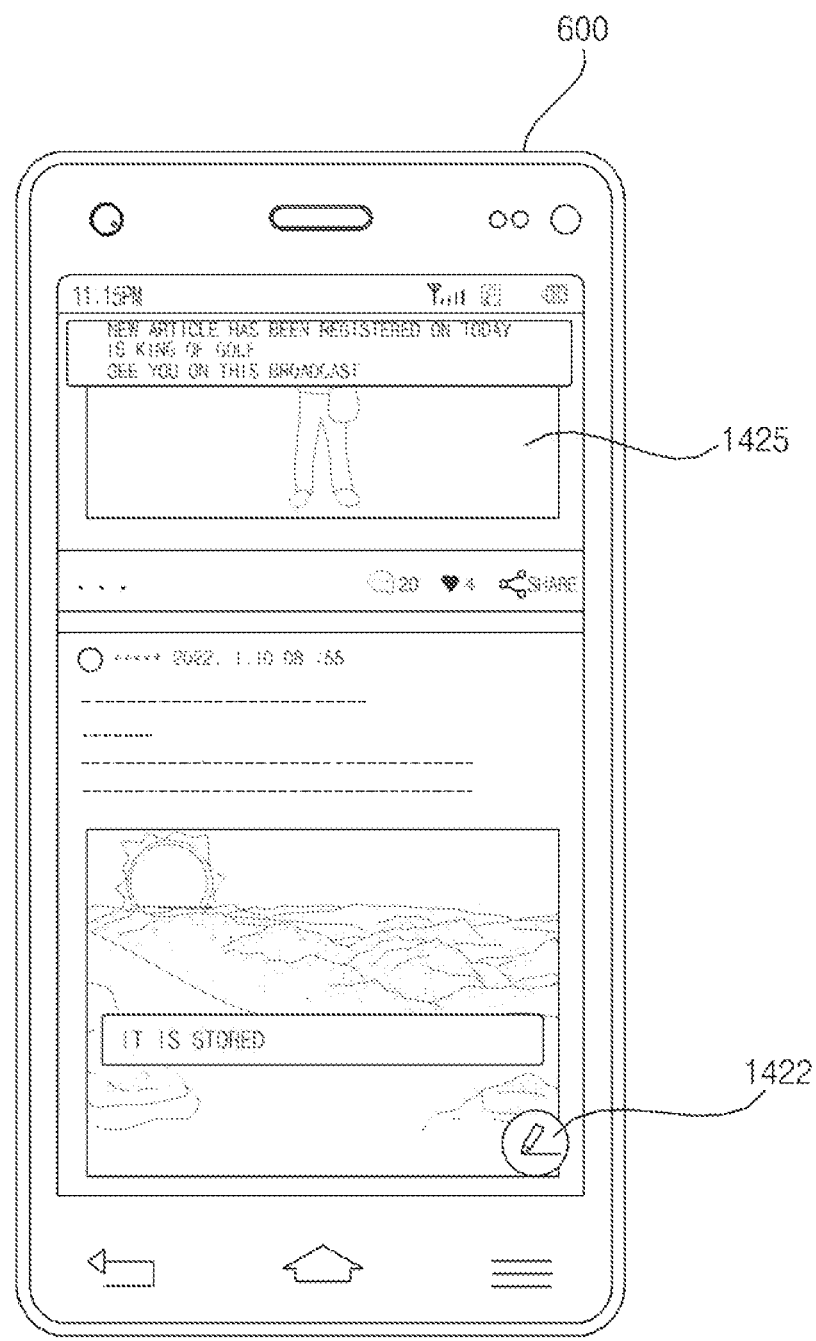

FIG. 11C illustrates an additional screen 1425 of the broadcast related chatting screen 1420.

When there is the upward scroll input or the downward scroll input in the display of the broadcast related chatting screen 1420, as illustrated in FIG. 11C, the controller 670 of the mobile terminal 600 can be configured to display the additional screen 1425 including an additional conversation content. Accordingly, it is possible to provide search for the conversation content.

Figure 11D:
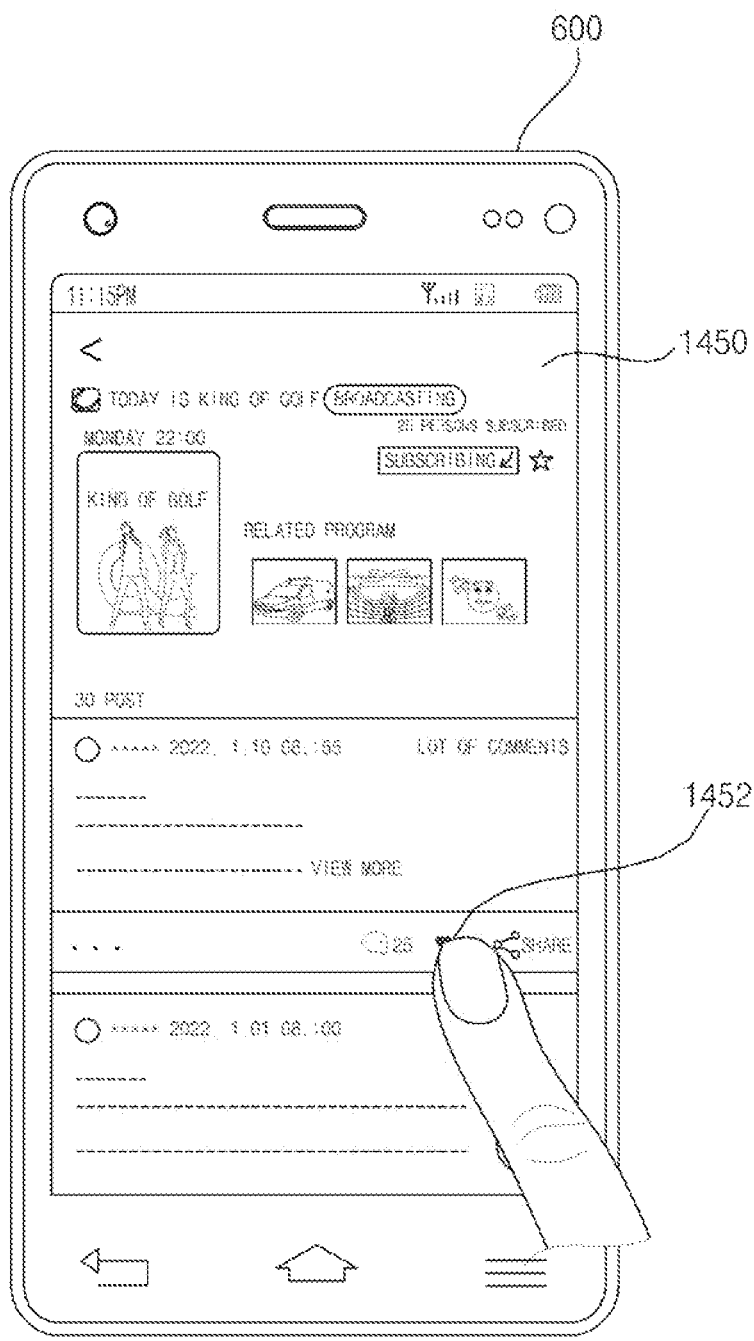

When the edit item 1322 is selected in the additional screen 1425, as illustrated in FIG. 11D, the controller 670 of the mobile terminal 600 can be configured to display a recommendation item or preference item 1452 for the input conversation content.

When the preference item or recommendation item for the first chatting conversation content among the chatting conversation contents is selected in the display of the broadcast related chatting screen 1420 or the additional screen 1425 by scrolling, the controller 670 of the mobile terminal 600 can be configured to transmit preference or recommendation information for the first chatting conversation content to the server 500, and display an increased number of preferences or recommendations for the first chatting conversation content. Accordingly, it is possible to provide the increased number of preferences or recommendations for the first chatting conversation content.

Figure 11E:
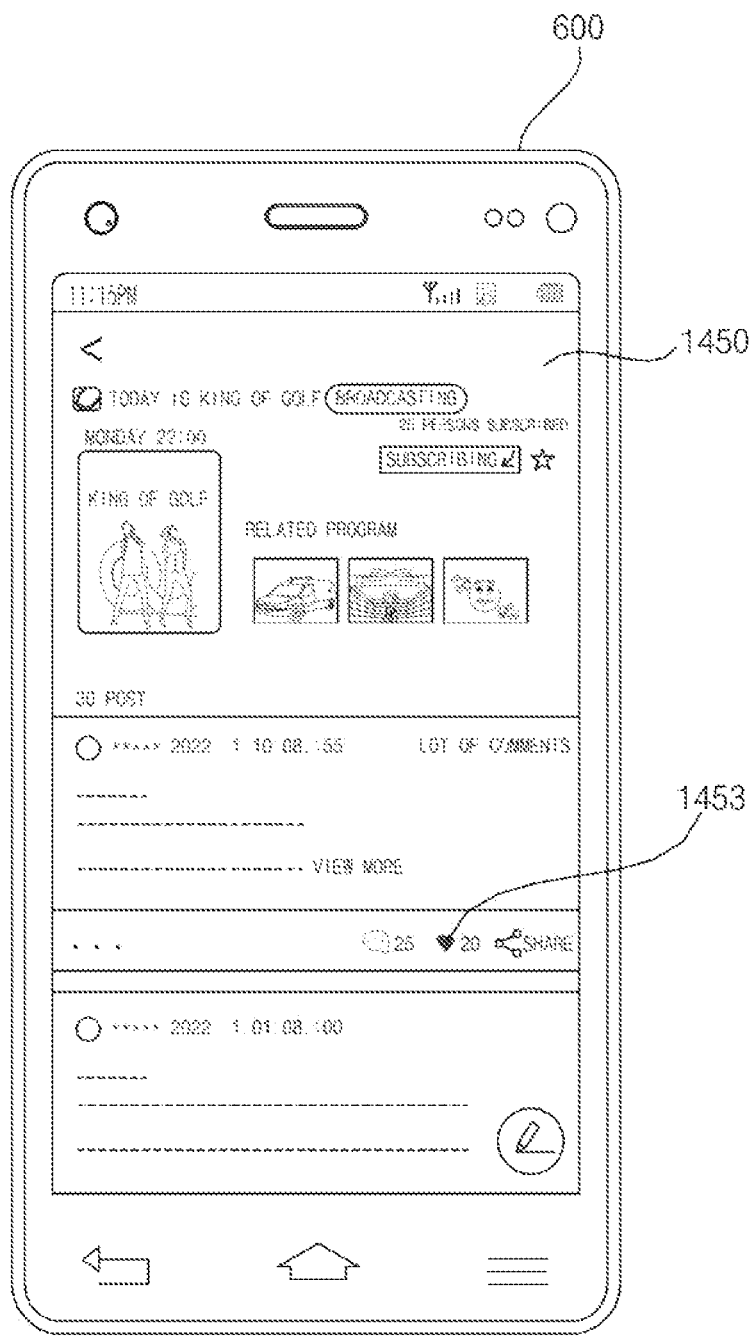

For example, when the recommendation item or preference item 1452 for the first chatting conversation content of FIG. 11D is selected, the controller 670 of the mobile terminal 600 can be configured to transmit the preference or recommendation information for the first chatting conversation content to the server 500, and display the increased number of preferences or recommendations 1453 of the first chatting conversation content as illustrated in FIG. 11E. Accordingly, it is possible to provide an increased number of preferences or recommendations for the first chatting conversation content.

Figure 12A:
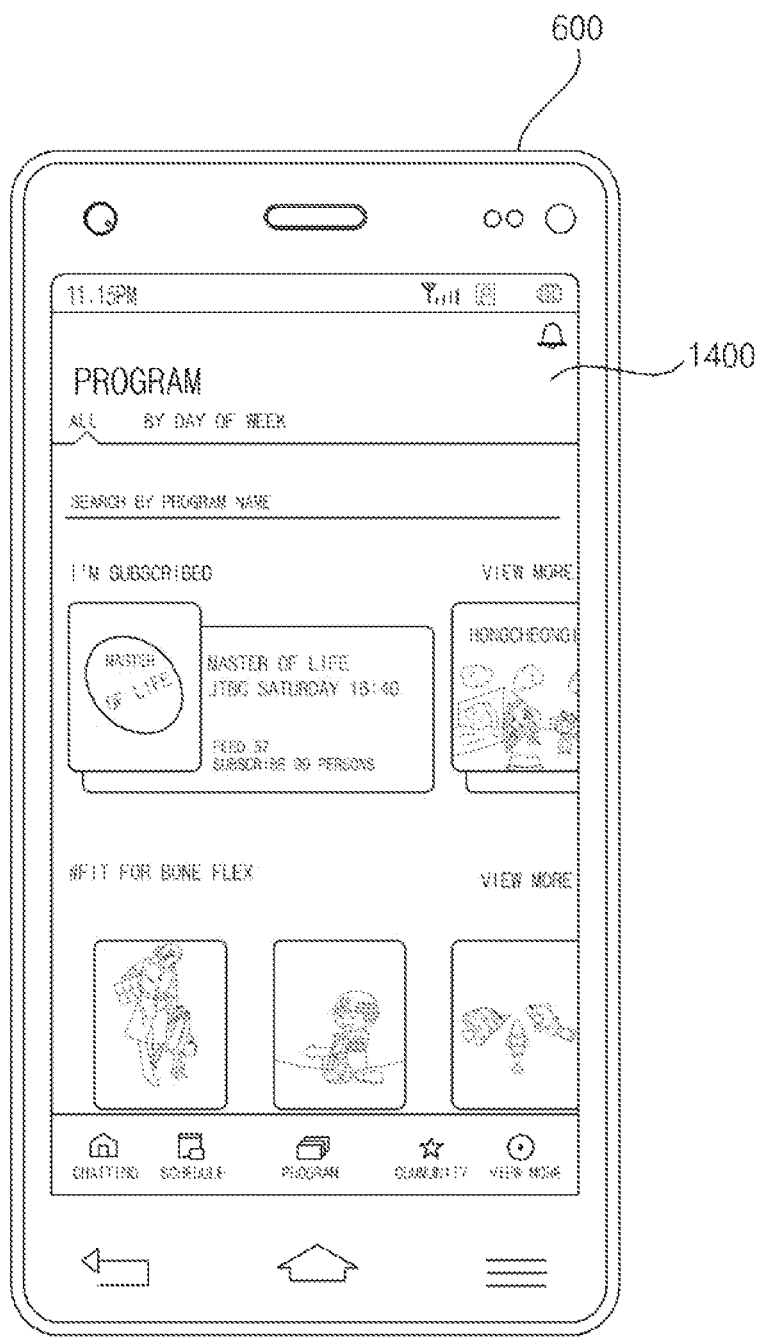

FIG. 12A illustrates that a broadcast program related screen 1400 is displayed.

When the broadcast chatting application 1305 is executed, the controller 670 of the mobile terminal 600 can be configured to display a broadcast program related screen 1400, as illustrated in FIG. 12A.

The broadcast program related screen 1400 can include a program item being subscribed to, a customized program item, a schedule item, a chatting item, and the like.

FIG. 12A illustrates that the broadcast program related screen 1400 is arranged and displayed according to all items.

Figure 12B:
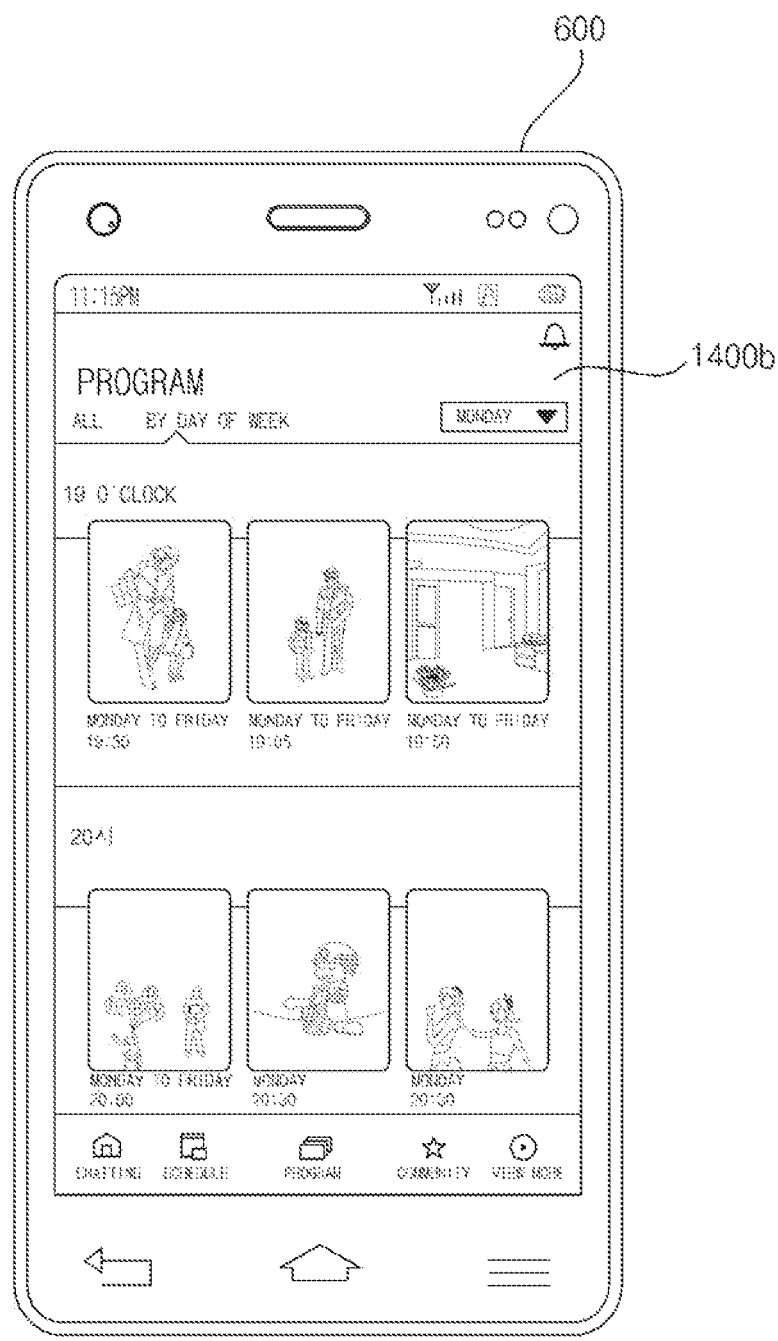

When an item by day is selected instead of all items in the display of the broadcast program related screen 1400, the controller 670 of the mobile terminal 600 can be configured to display a broadcast program related screen 1400b arranged by time as illustrated in FIG. 12B. Alternatively, as illustrated in FIG. 12C, the controller 670 is configured to display the broad program related screen 1400c arranged by day of the week.

FIG. 12B illustrates the broadcast program related screen 1400b in which the plurality of broadcast program items are arranged by time.

Figure 12C:
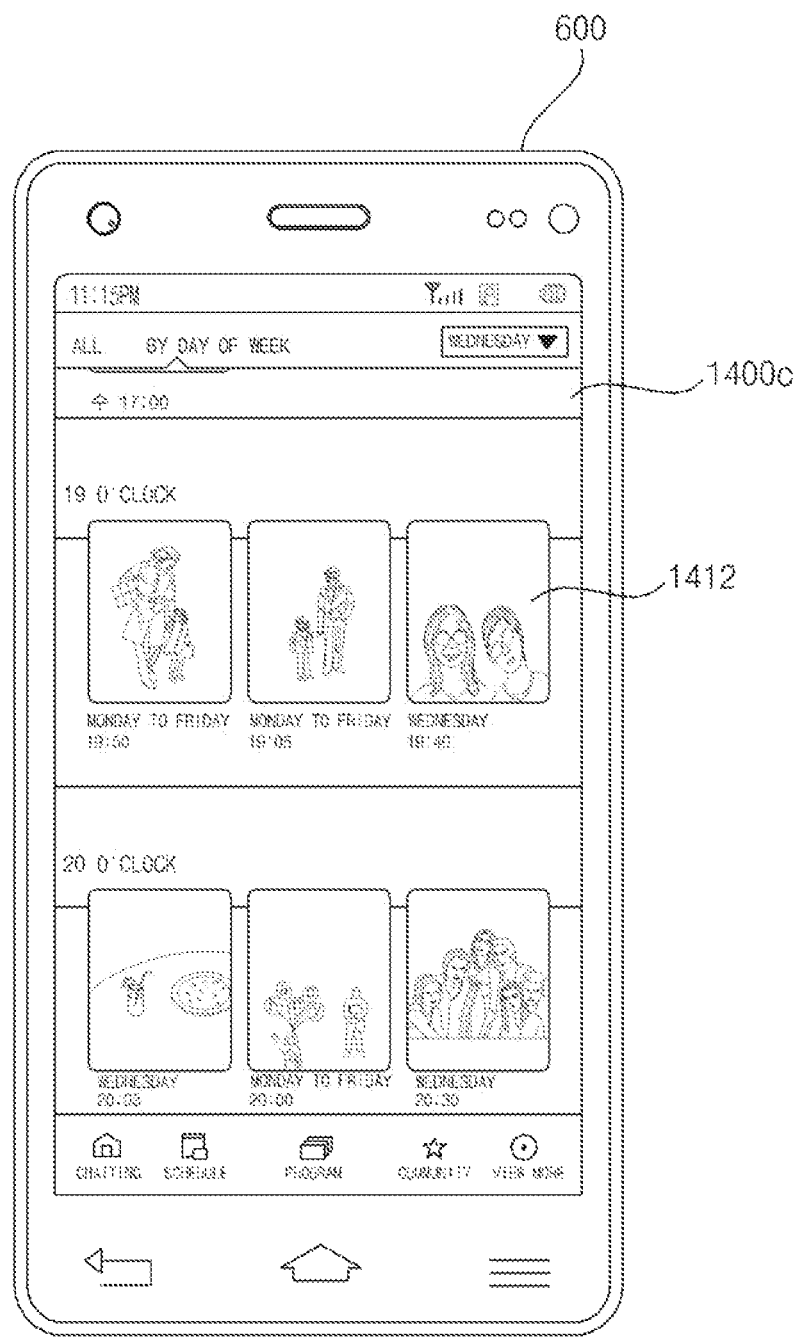

FIG. 12C illustrates a broadcast program related screen 1400c in which the plurality of broadcast program items are arranged according to a specific day of the week.

Figure 12D:
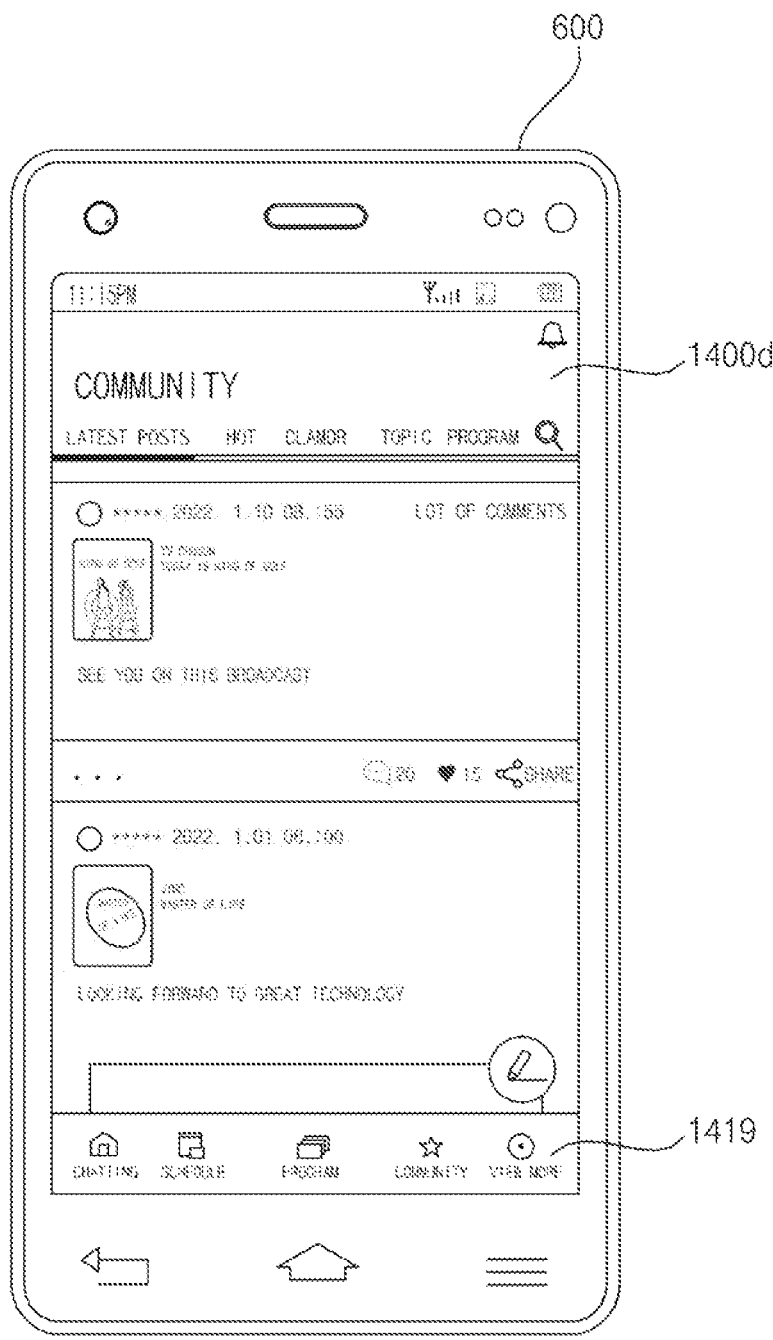

When any one program item 1412 in the broadcast program related screen 1400c of FIG. 12c is selected, as illustrated in FIG. 12D, the controller 670 of the mobile terminal 600 can be configured to receive a broadcast program related community screen 1400d selected from the server 500 and display the community screen. Accordingly, it is possible to provide the selected broadcast program community screen 1400d.

When a view more item 1419 of FIG. 12D is selected, also a setting item can be displayed.

Figure 12E:
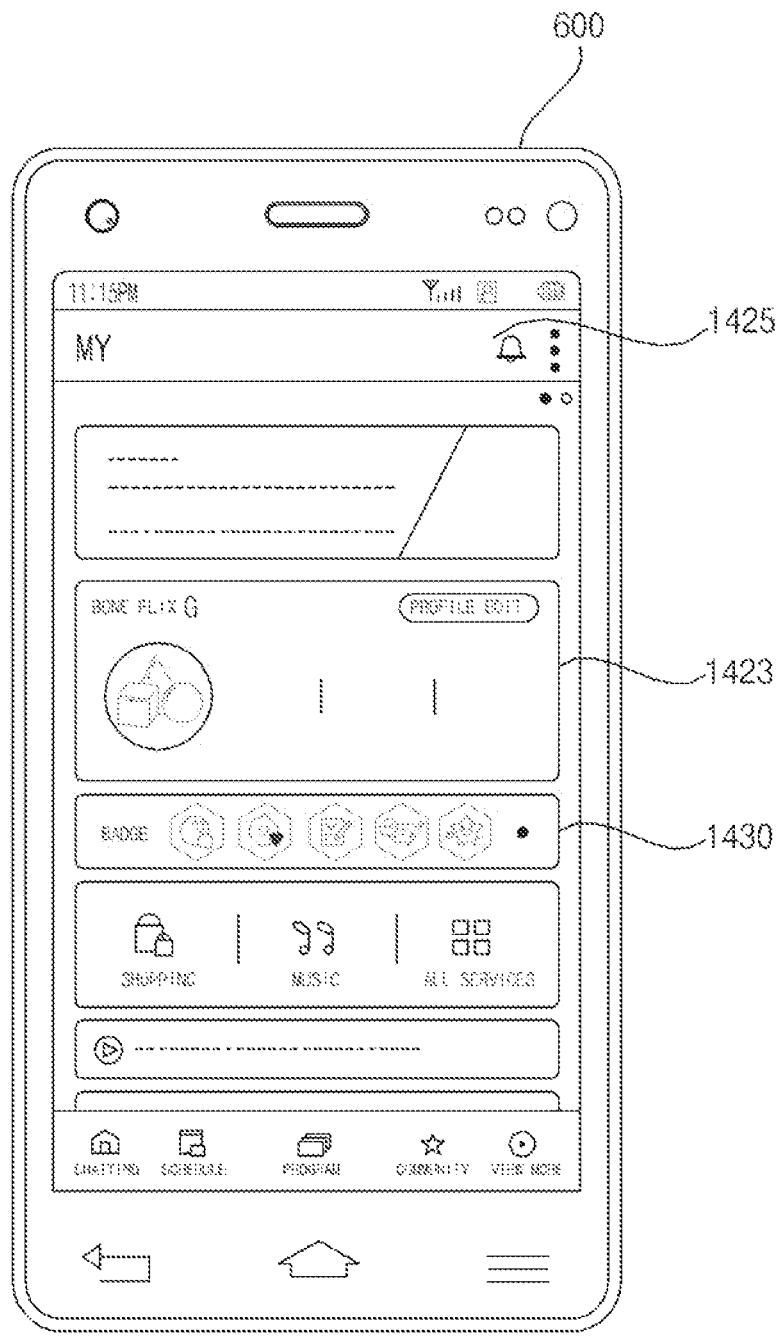

When the setting item is selected in the display of the chatting application screen 1310, the broadcast program related screen 1400, or the broadcast program related community screen 1400d, as illustrated in FIG. 12E, the controller 670 of the mobile terminal 600 receives a setting screen 1425 including a profile item 1423 and a badge item 1430 from the server 500, and is configured to display the setting screen 1425. Accordingly, the setting screen 1425 including the profile item 1423 and the badge item 1430 can be provided.

In FIG. 12E, five badge items 1430 are exemplified, but the number of badge items 1430 can vary based on updated or acquired points.

For example, the controller 670 of the mobile terminal 600 can be configured to change the number of badge items 1430 based on the updated or acquired points. Accordingly, various numbers of badge items 1430 can be provided.

The controller 670 of the mobile terminal 600 can be configured to distinguish an obtainable badge and an unobtainable badge based on the acquired points.

The controller 670 of the mobile terminal 600 can obtain points from the server 500 in proportion to the number of preferences or recommendations of the written and input conversation content.

Figure 12F:
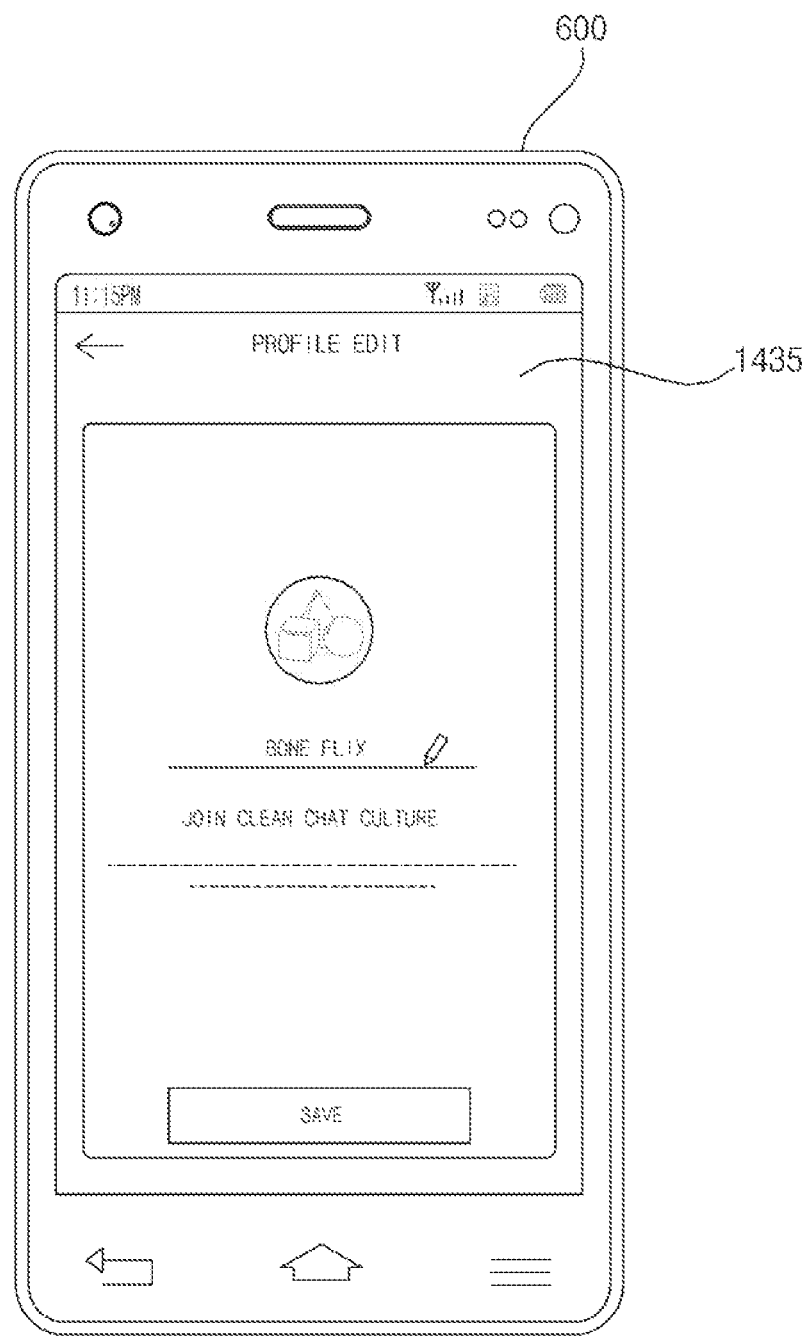

When the profile item 1423 in the setting screen 1425 is selected, the controller 670 of the mobile terminal 600 can be configured to display a profile editing screen 1435 for profile editing, as illustrated in FIG. 12F. Accordingly, it is possible to input an image or text used when editing a profile.

When the setting item in the chatting application screen 1310 is selected, the controller 670 of the mobile terminal 600 can be configured to display a channel editing item and a region setting item on the setting screen 1425.

Figure 12G:
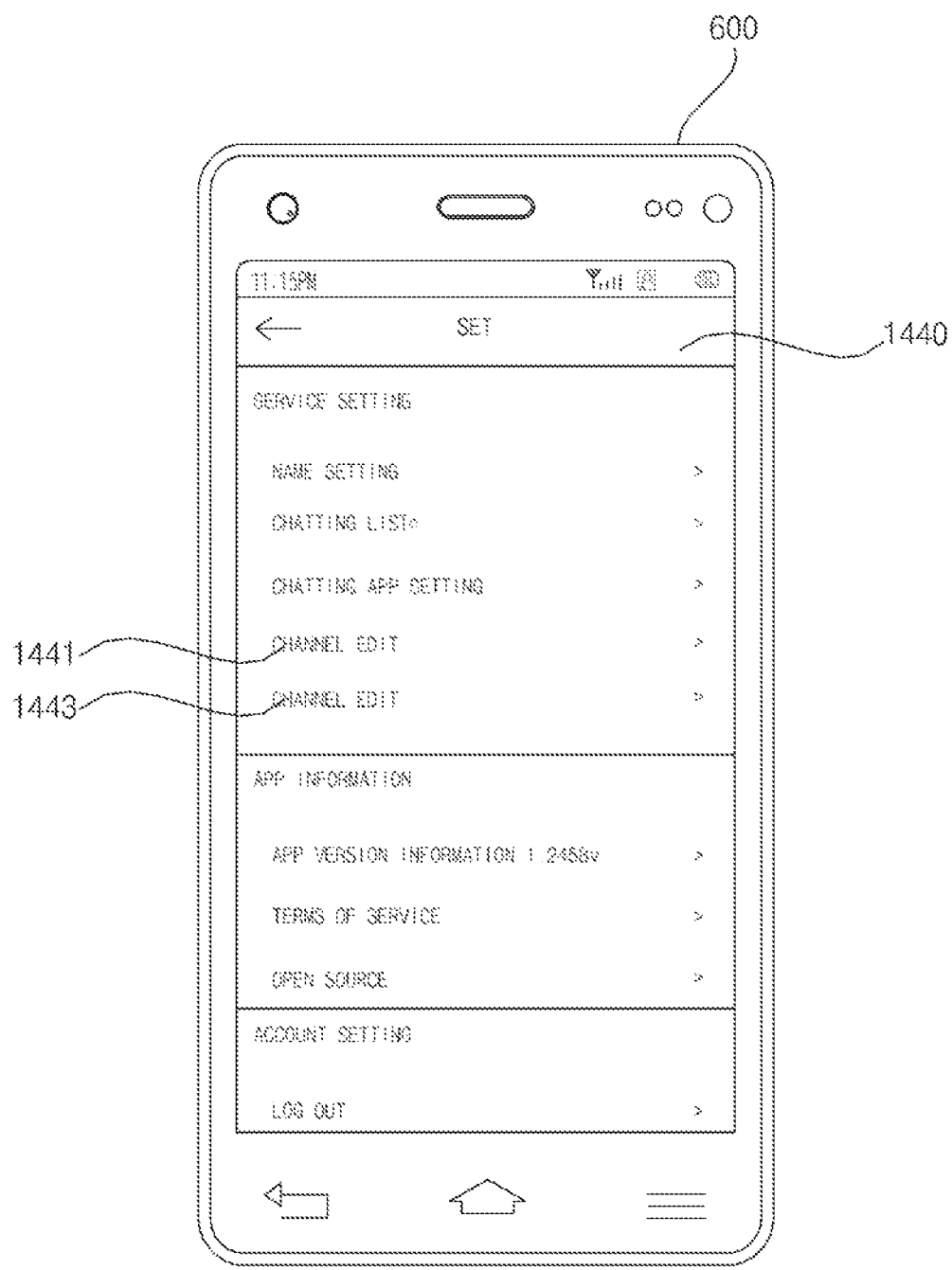

FIG. 12G is a diagram illustrating another example of the setting screen 1440.

Referring to the drawing, a setting screen 1425 can include a chatting list setting item, a chatting application setting item, a channel editing item 1441, a region setting item 1443, an account setting item, a logout item, and the like.

Figure 12H:
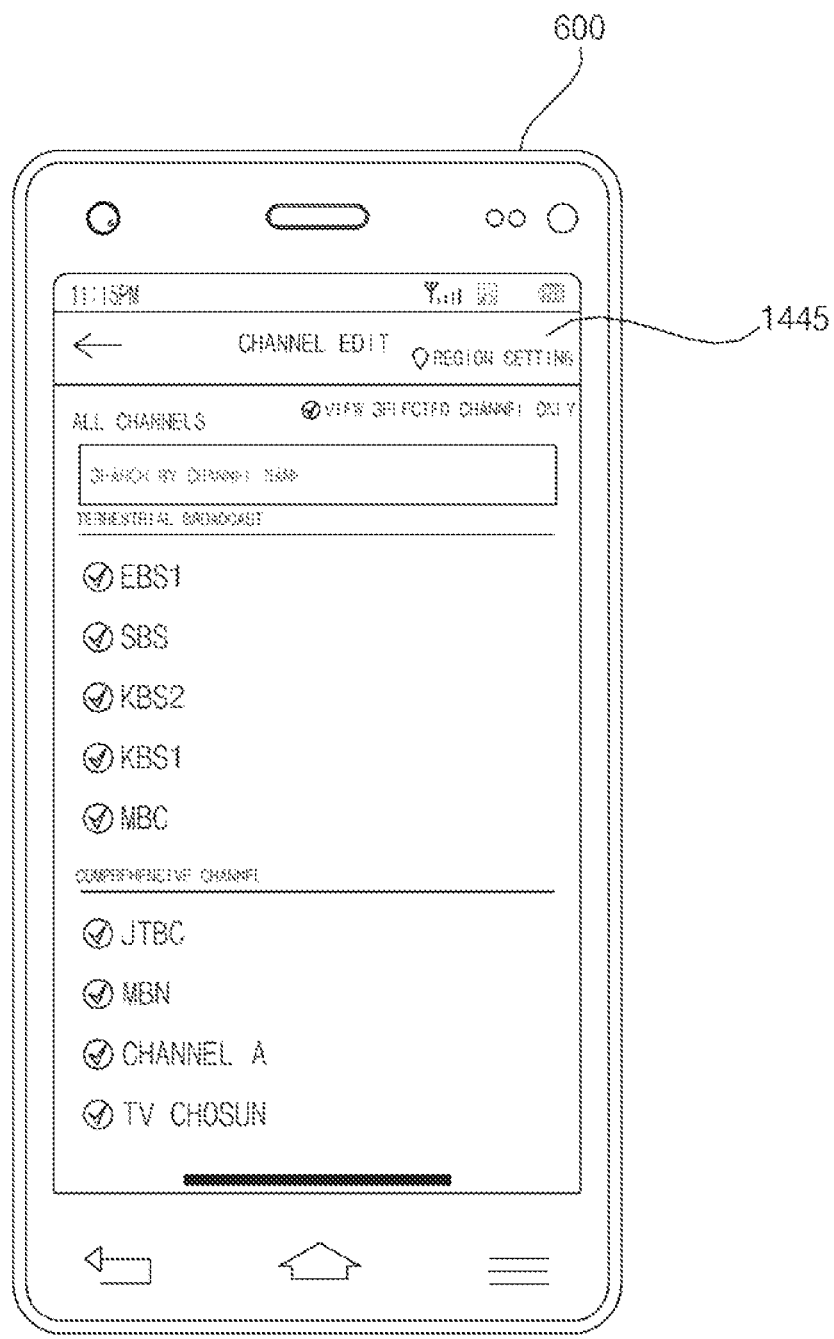

When the channel editing item 1441 in the setting screen 1425 is selected, as illustrated in FIG. 12H, the controller 670 of the mobile terminal 600 can be configured to display a channel list screen 1445 including a terrestrial broadcasting item and a cable broadcasting item.

Unlike the drawings, an Internet stream broadcasting item can also be included in the channel list screen 1445.

Figure 12I:
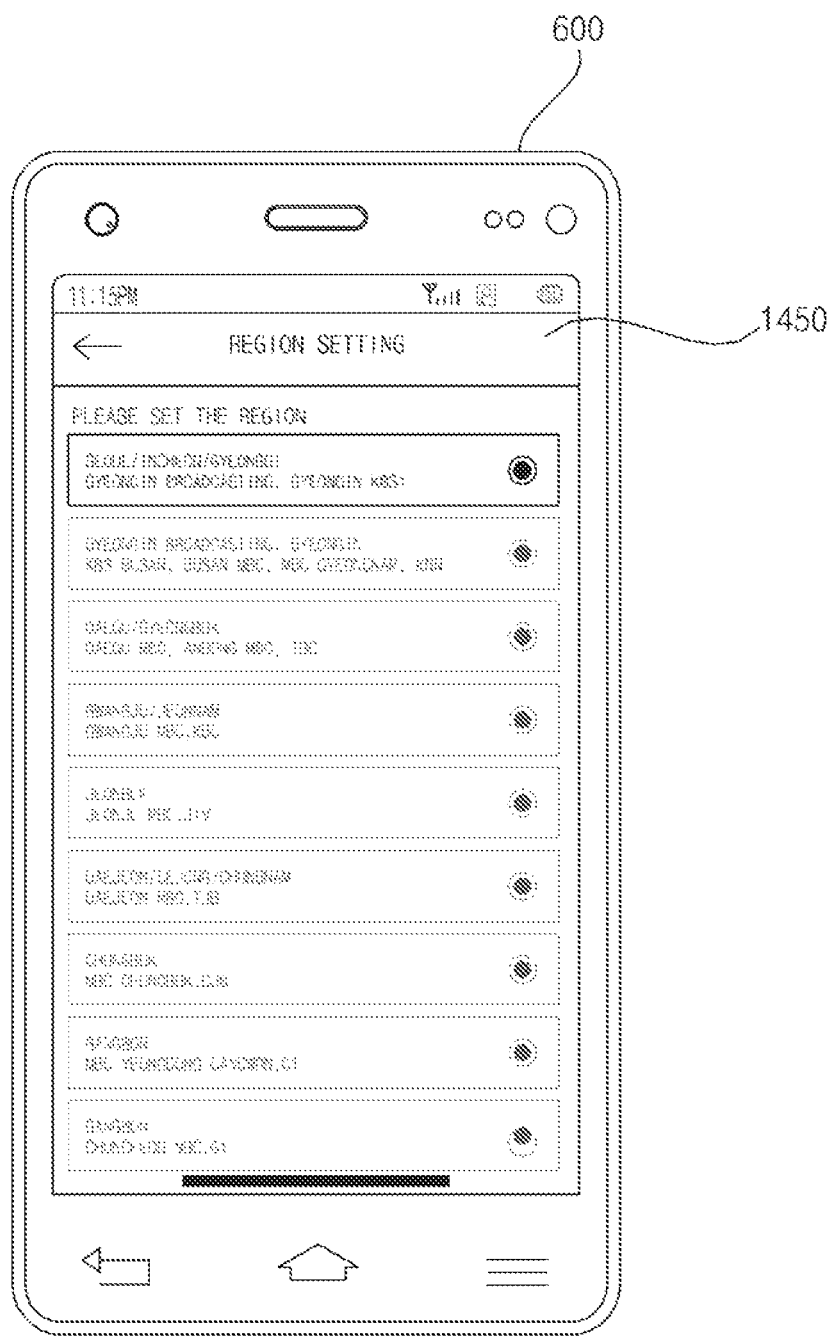

Meanwhile, when the region setting item 1443 in the setting screen 1425 is selected, as illustrated in FIG. 12I, the controller 670 of the mobile terminal 600 can be configured to display a region list screen 1450 including a plurality of region items and broadcast channel information (KB1, TBC, or the like) viewable in each region.

FIGS. 13A to 13H illustrate an example of sharing a broadcast related chatting screen between a plurality of mobile terminals 600a and 600b.

Figure 13A:
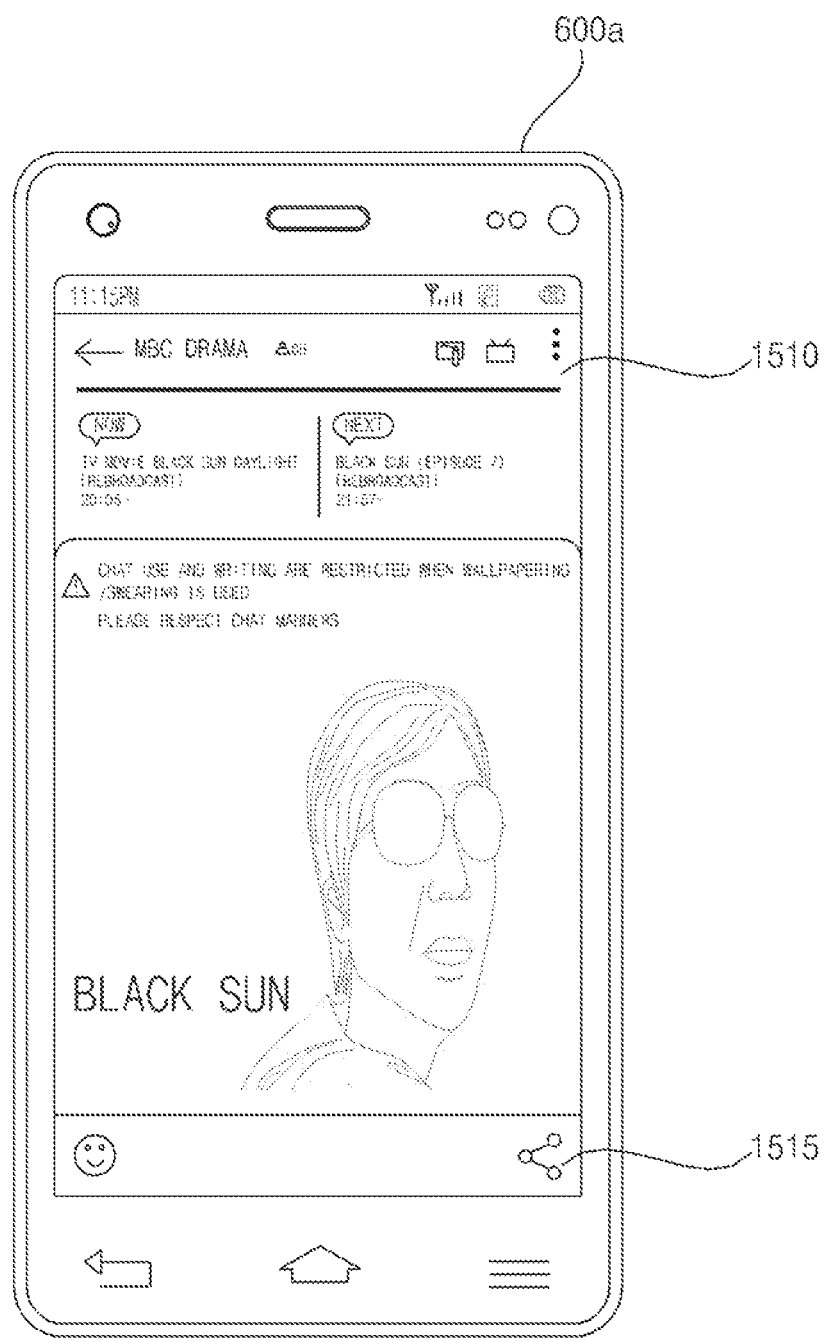

First, FIG. 13A illustrates that a broadcast program related screen 1510 related to a first broadcast program is displayed based on execution of the broadcast chatting application 1305 in the first mobile terminal 600a.

Figure 13B:
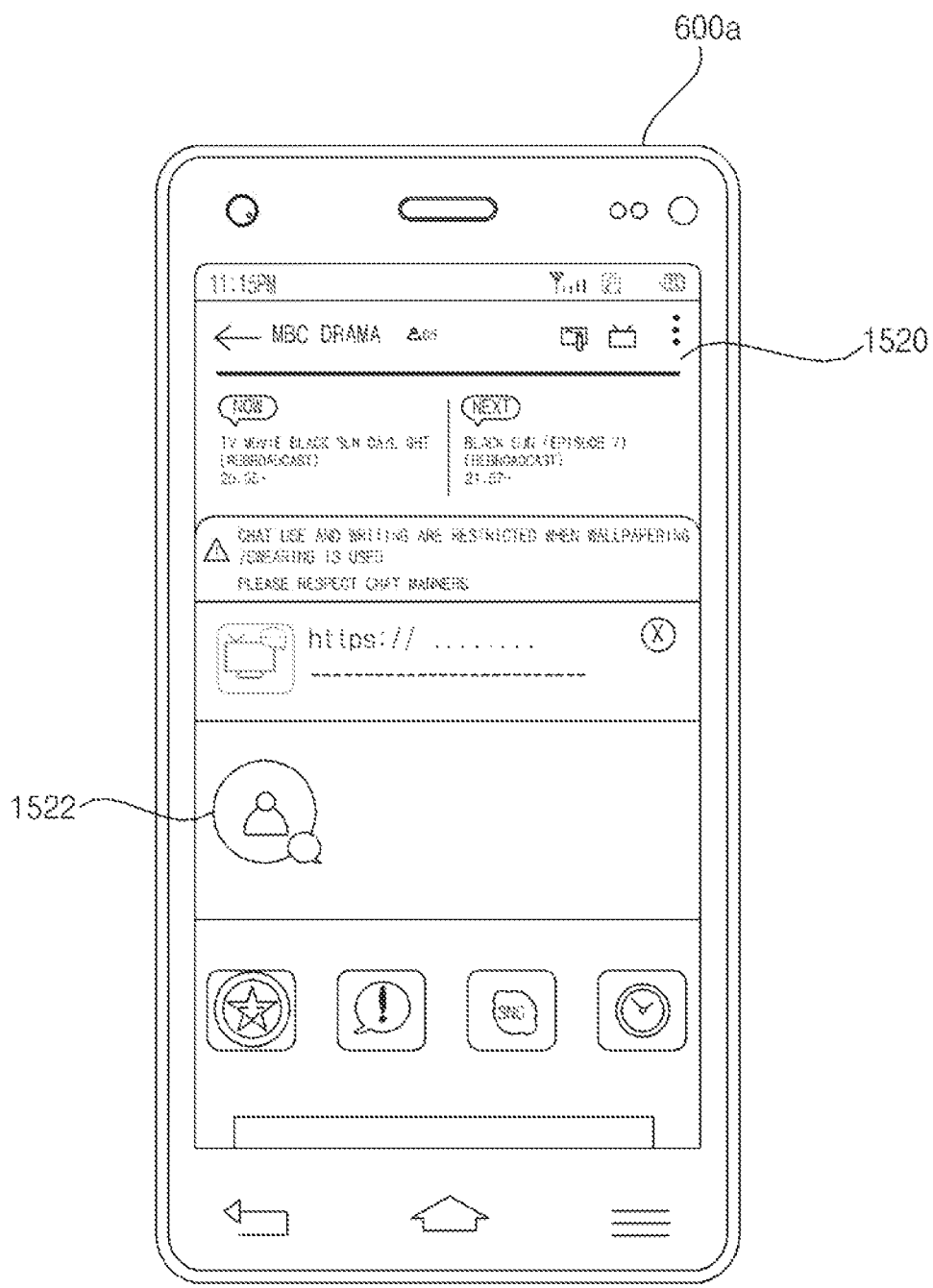

When a sharing item 1515 in the broadcast program related screen 1510 is selected, the controller 670 of the first mobile terminal 600a can be configured to display a sharing screen 1520 for transmitting a sharing, as illustrated in FIG. 13B.

The sharing screen of FIG. 13B illustrates that information related to the first broadcast program and an ID item 1522 to be shared are displayed.

In the drawing, only one ID item 1522 is exemplified, but, unlike this, a plurality of ID items can be displayed, and any one of them can be selected.

Figure 13C:
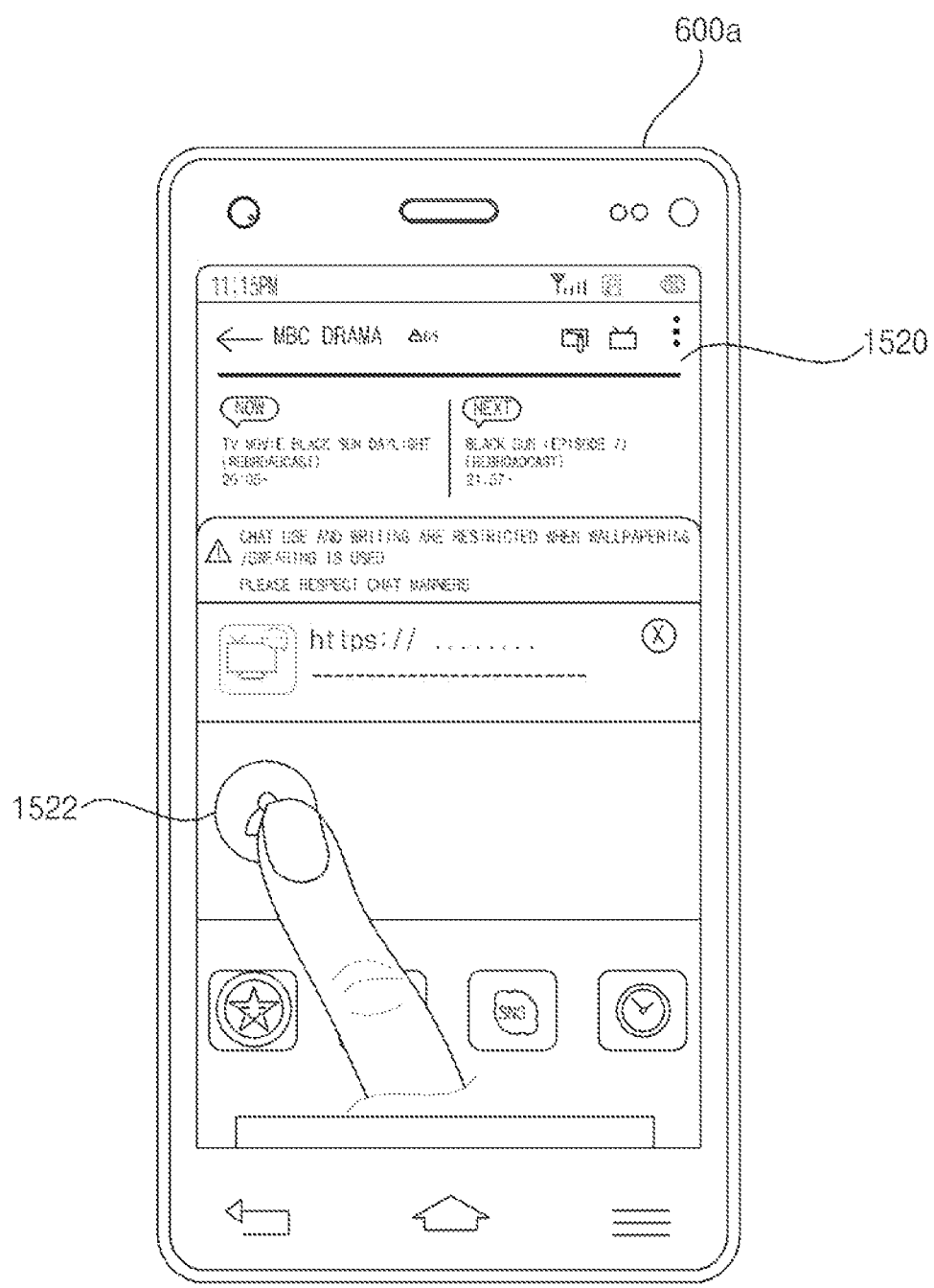
Figure 13D:
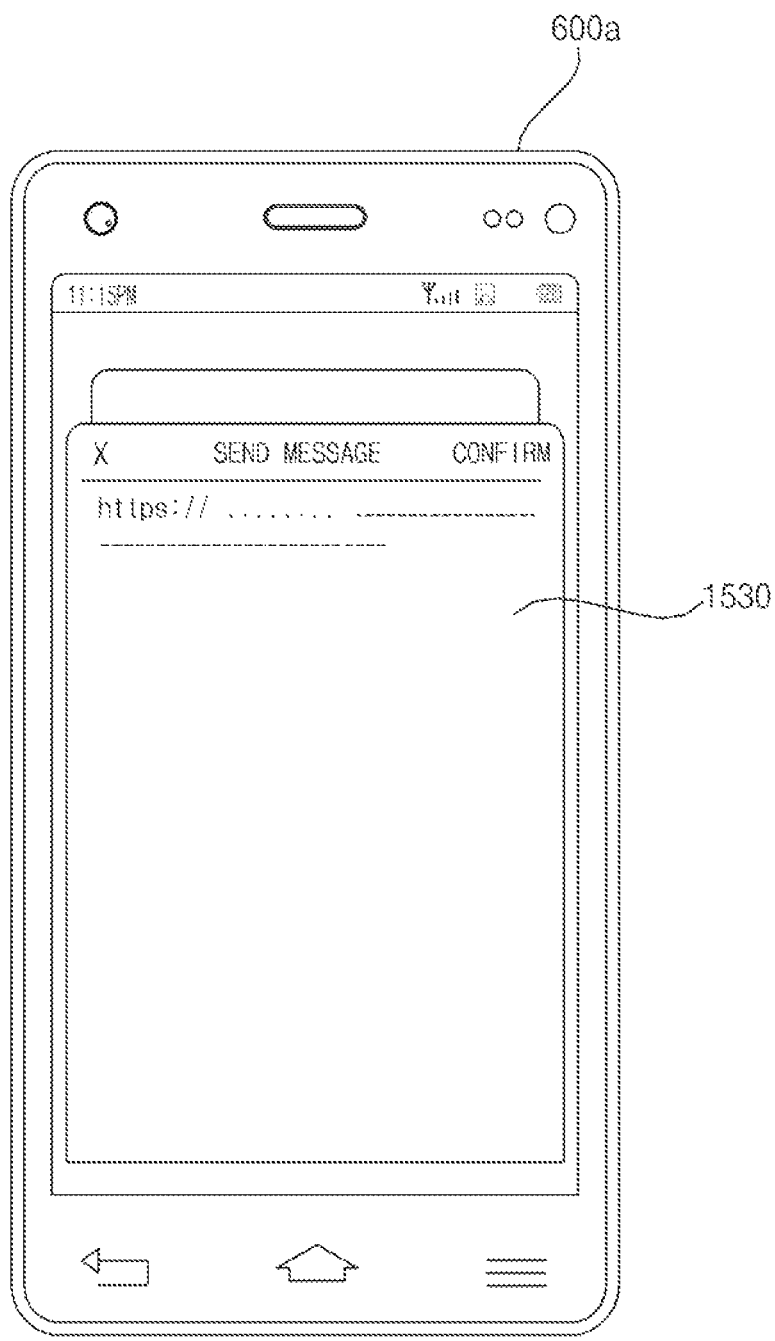

When the ID item 1522 is selected, as illustrated in FIG. 13C, the controller 670 of the first mobile terminal 600a can be configured to display a message transmission screen 1530 as illustrated in FIG. 13D.

Specifically, when the ID item 1522 is selected, the controller 670 of the first mobile terminal 600a can be configured to display the message transmission screen 1530 including a broadcast related message for the first program and a broadcast chatting related message.

Figure 13E:
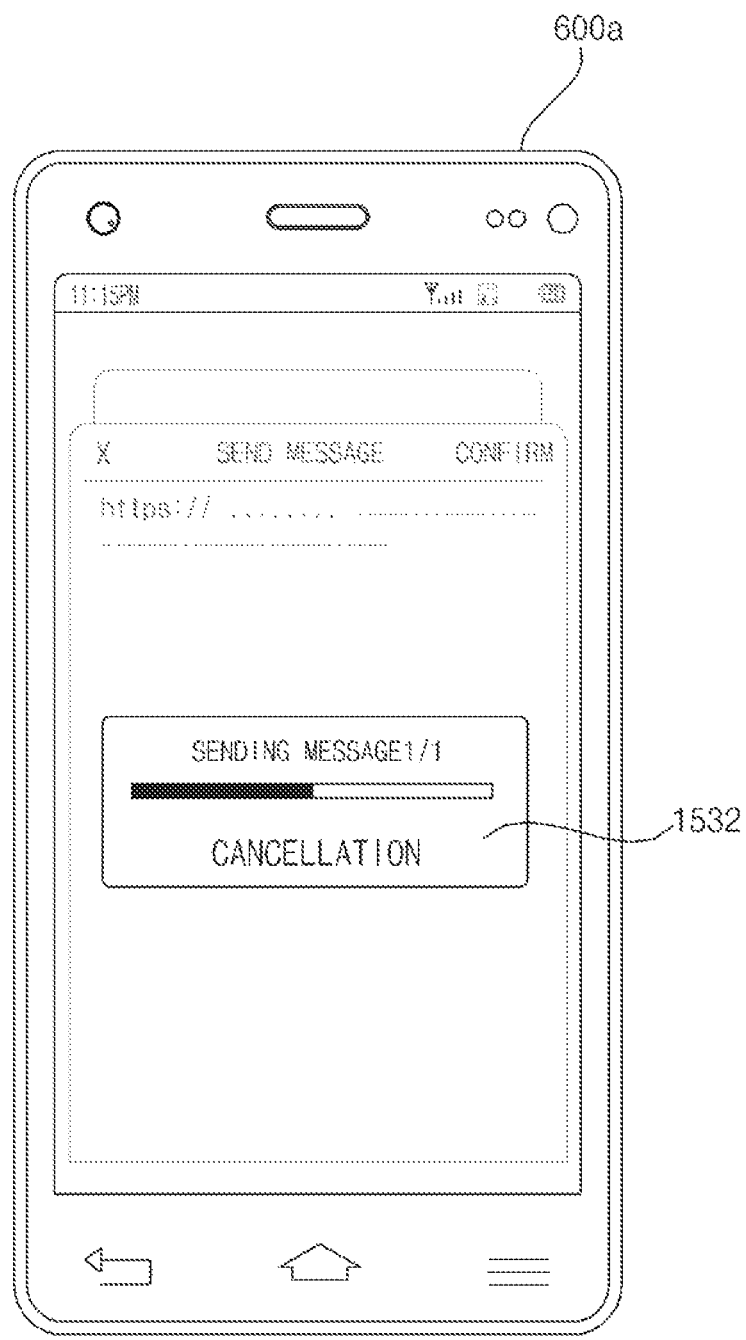

When a confirmation item in the message transmission screen 1530 is selected, the controller 670 of the first mobile terminal 600a can be configured to display an object 1532 indicating that a message is being, as illustrated in FIG. 13E.

The broadcast related message for the first program and the broadcast chatting related message are transmitted to the second mobile terminal 600b corresponding to the selected ID, and the controller 670 of the second mobile terminal 600b can display a broadcast related message 1542 and a broadcast chatting related message 1543 for the received first program on the chatting window or the message window.

The broadcast related message 1542 for the first program can be a URL message for accessing the broadcast program related screen 1510 of FIG. 13A.

The broadcast chatting related message 1543 for the first program can be a message for accessing a chatting window for the first program.

When the broadcast related message 1542 for the first program or the broadcast chatting related message 1543 is selected in a state where the broadcast chatting application is not installed, the controller 670 of the second mobile terminal 600b, since the controller 670 of the second mobile terminal 600b cannot display the broadcast program related screen based on the broadcast chatting application, the controller 670 can be configured to display a web-based broadcast program related screen (e.g., in a web page format or in a web browser).

Figure 13F:
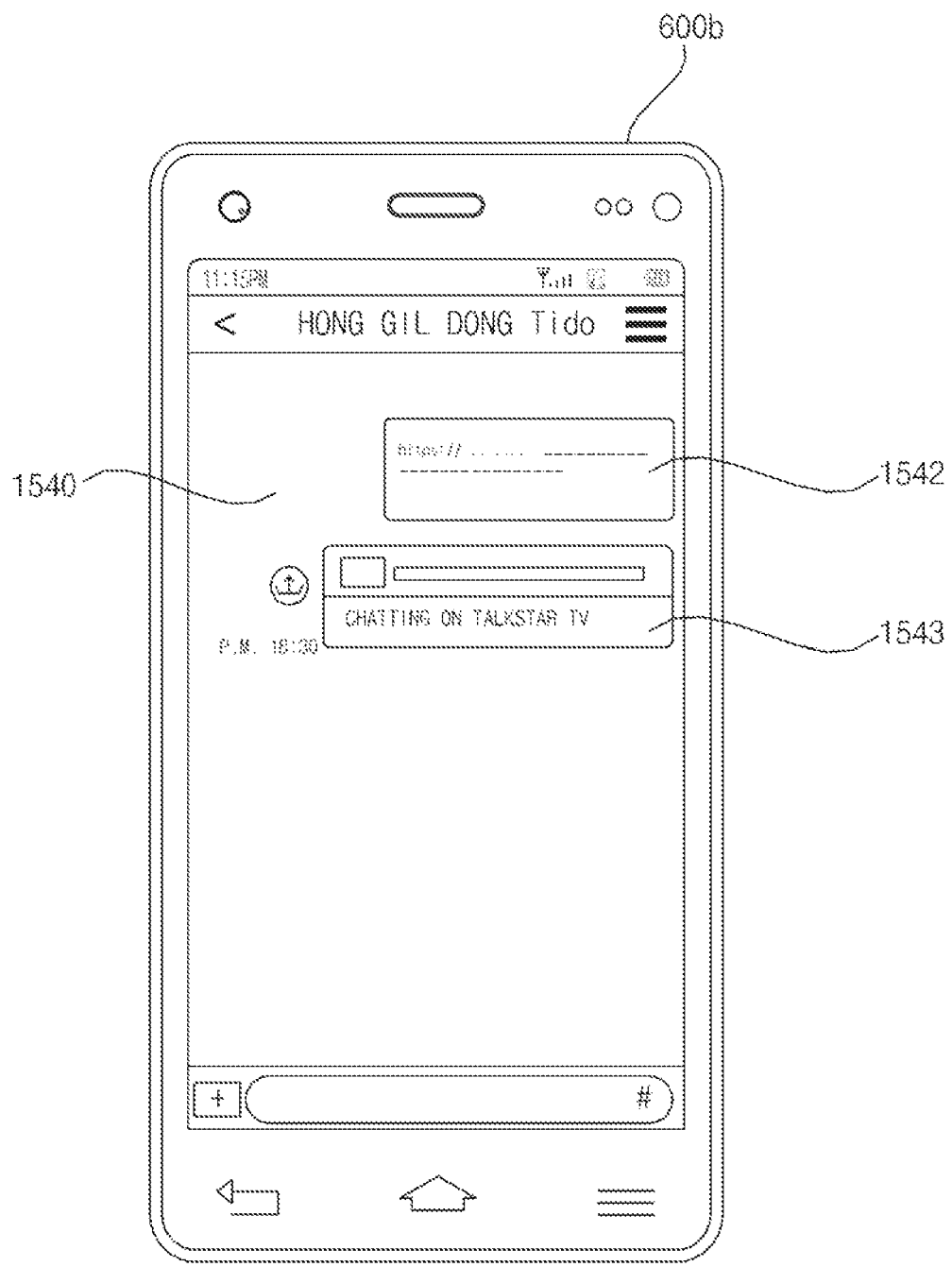
Figure 13G:
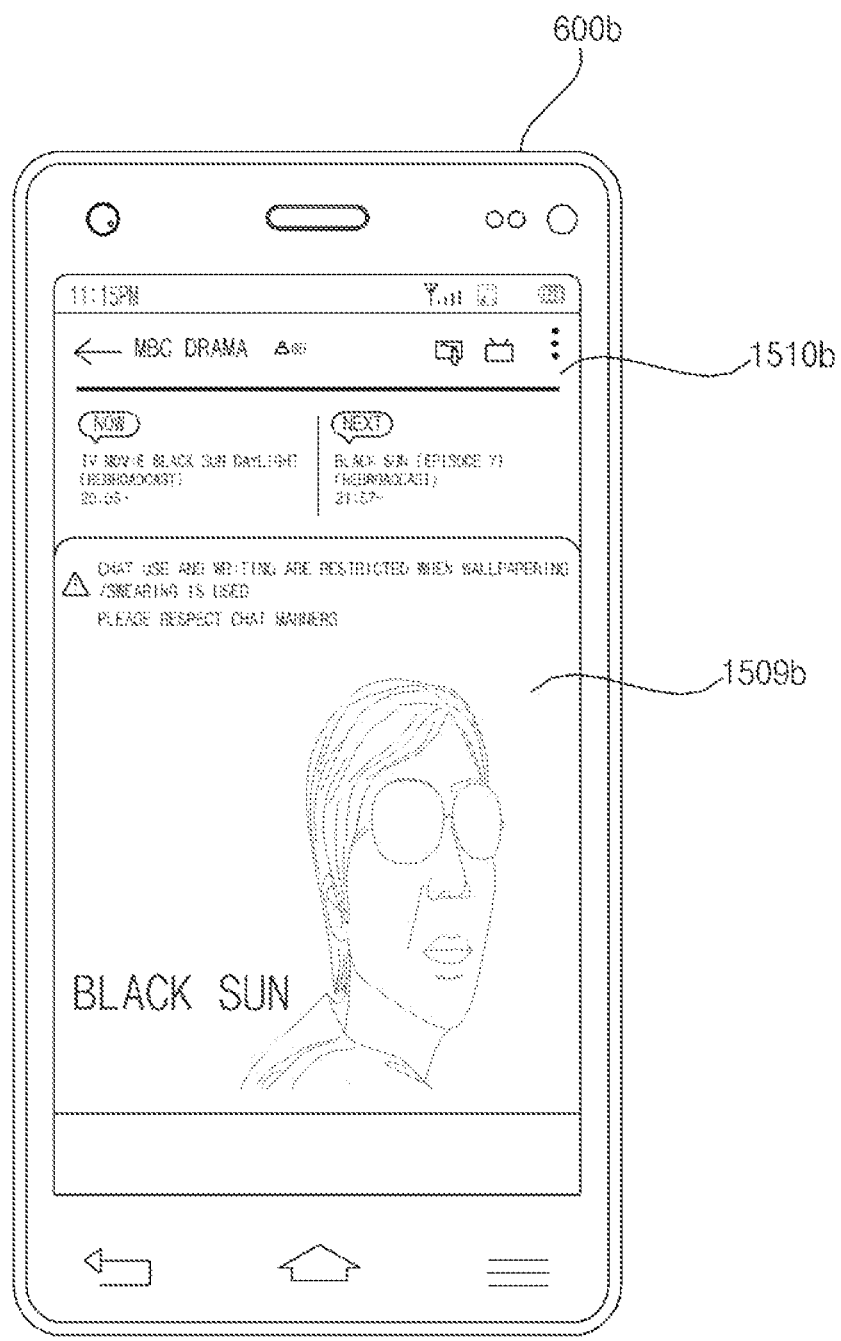

That is, when the broadcast related message 1542 for the first program or the broadcast chatting related message 1543 is selected in a state where the broadcast chatting application is not installed, as illustrated in FIG. 13G, the controller 670 of the second mobile terminal 600b can be configured to display a screen 1510b related to a web-based broadcast program 1510b including a preview image 1509b. For example, the preview image 150 and screen 1510b can be in the form of a webpage or part of a webpage or in a format viewable by a web browser. Accordingly, the broadcast related chatting screen can be shared.

Figure 13H:
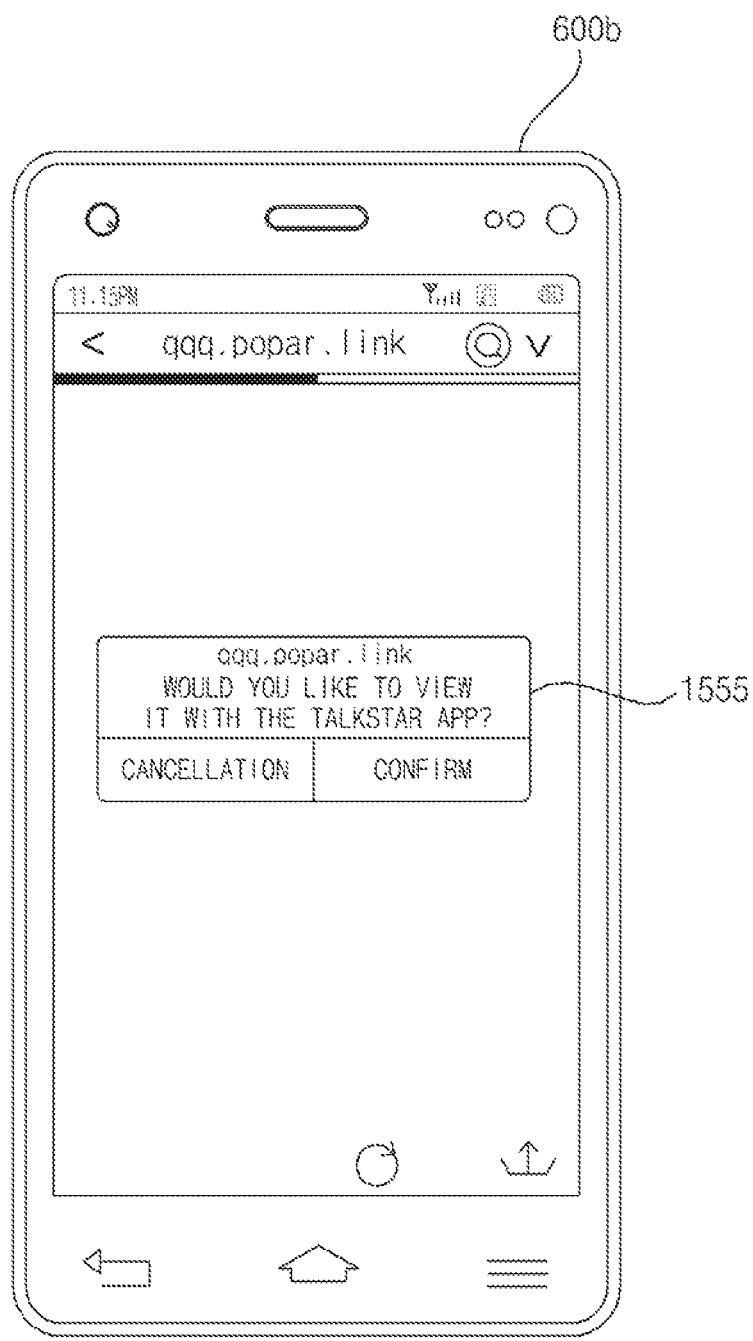

When the broadcast chatting related message 1543 of FIG. 13F is selected or the web screen-based preview image 1509b of FIG. 13G is selected in a state where the broadcast chatting application is not installed. When 1509b is selected, since the controller 670 of the second mobile terminal 600b cannot display the chatting window based on the broadcast chatting application, the controller 670 can be configured to display link information 1555 for installation of the broadcast chatting application, as illustrated in FIG. 13H. Accordingly, the broadcast chatting application 1305 can be easily installed.

For example, when the link information 1555 is selected, the controller 670 of the second mobile terminal 600b can be configured to install the broadcast chatting application 1305, and after the installation is completed, the controller 670 of the second mobile terminal 600b can display a screen related to the application-based broadcast program. Accordingly, the broadcast related chatting screen can be shared.

Figure 14A:
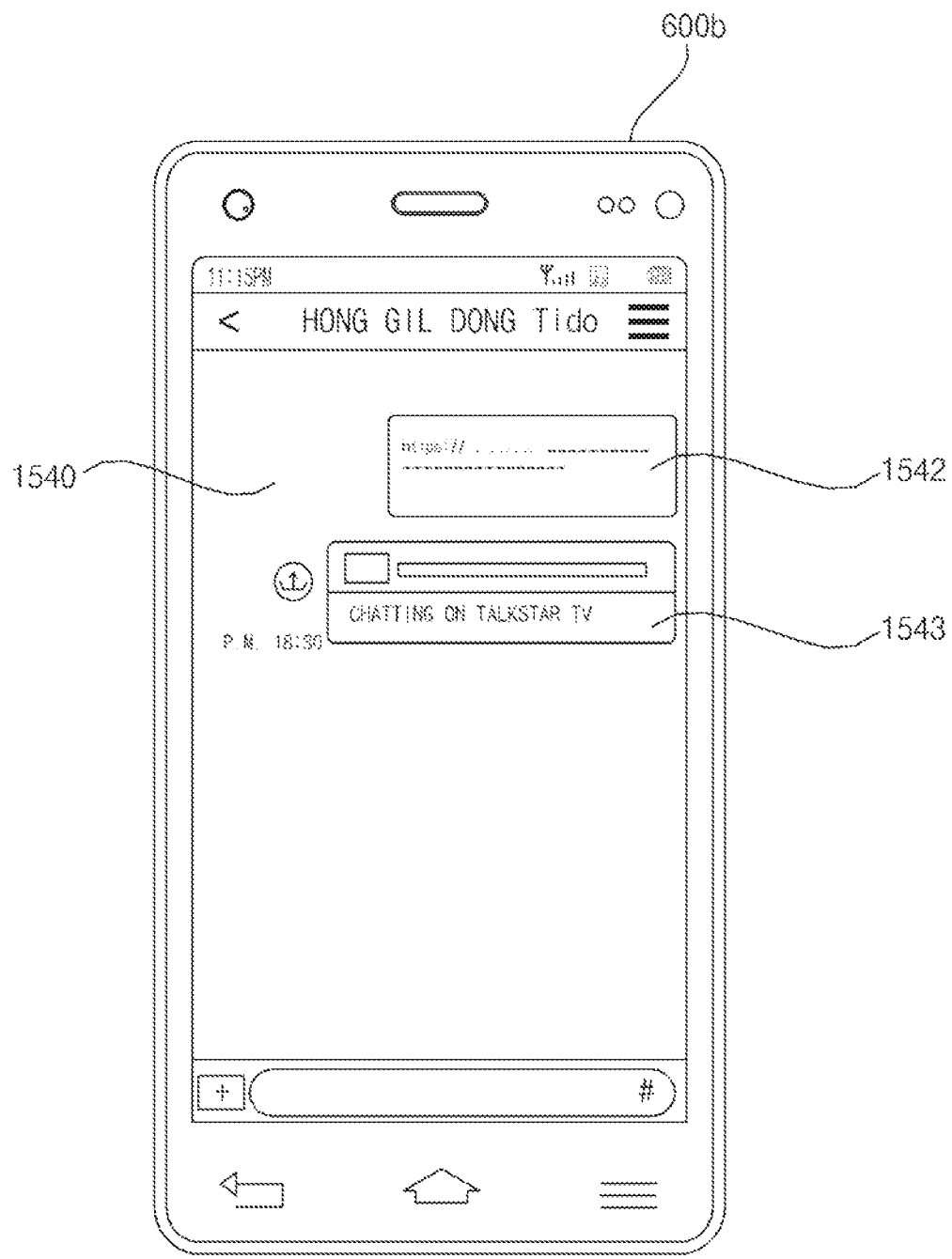

FIG. 14A illustrates that the broadcast related message 1542 for the first program and the broadcast chatting related message 1543 received are displayed in the chatting window or the message window of the second mobile terminal 600b in which the installation of the broadcast chatting application 1305 is completed.

When the broadcast related message 1542 for the first program is selected, since the broadcast chatting application is installed in the controller 670 of the second mobile terminal 600b, the controller 670 can be configured to display a broadcast related chatting screen 1510c including an application-based preview image 1509c and a chatting input window 1537. Accordingly, the broadcast related chatting screen can be shared.

Figure 14B:
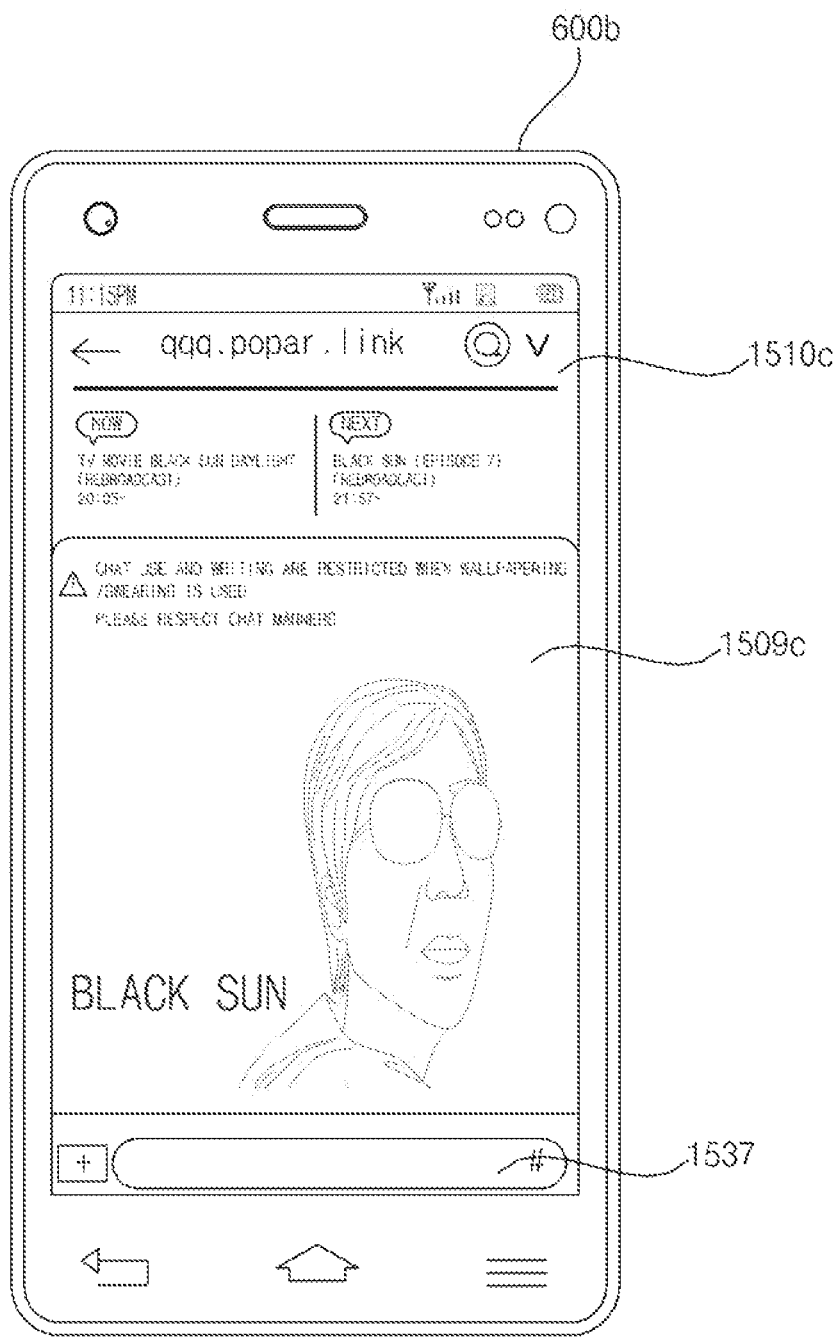
Figure 14C:
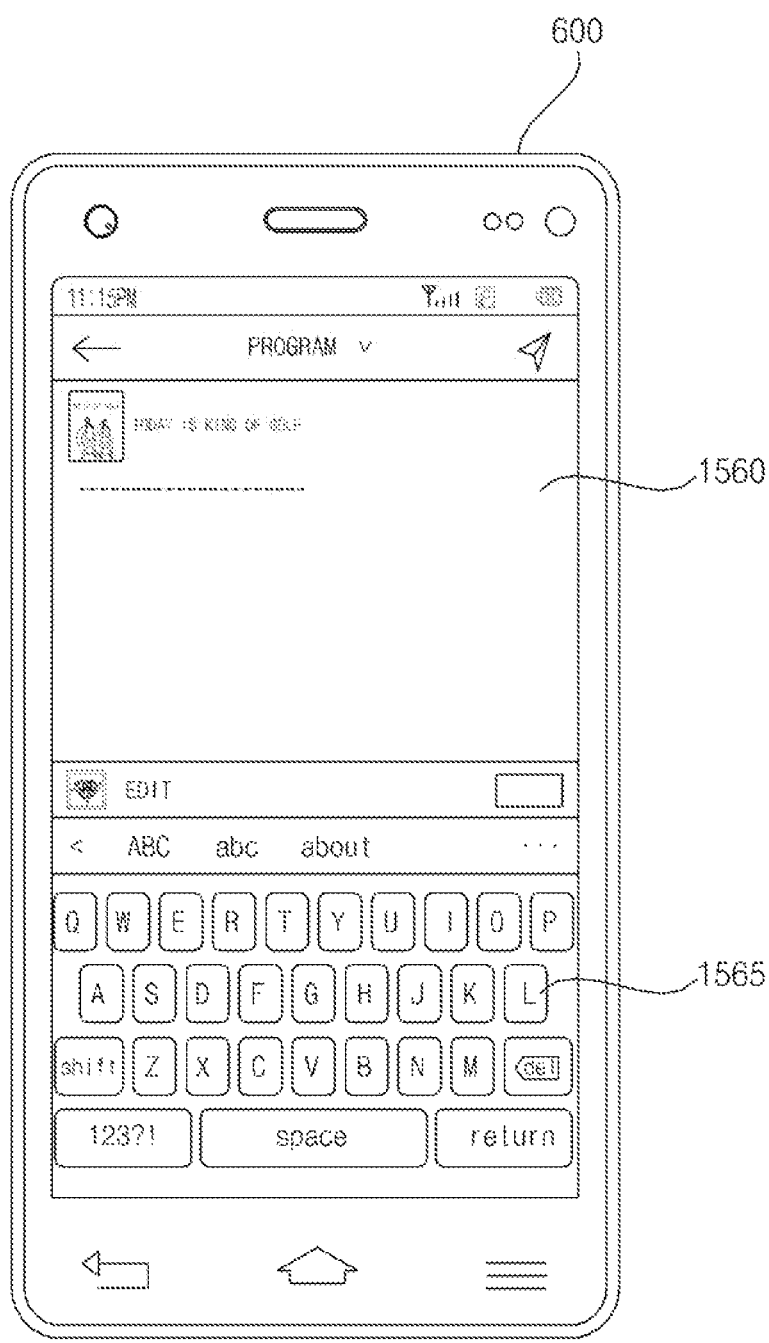

When the chatting input window 1537 is selected, the controller 670 of the second mobile terminal 600b can be configured to display the keyboard display window 1565 and the text input window 1560, as illustrated in FIG. 14C. Moreover, when the conversation content is input to the text input window 1560, the controller 670 can be configured to transmit the input conversation content to the server 500 and display the input conversation content on the broadcast related chatting screen. Accordingly, the broadcast related chatting screen can be shared. Furthermore, it is possible to input and display the chatting conversation content related to the broadcast image.

When the broadcast chatting related message 1543 is selected in FIG. 14A, the controller 670 of the second mobile terminal 600b can be configured to display the broadcast related chatting screen 1510c of FIG. 14B.

Alternatively, when the broadcast chatting related message 1543 is selected in FIG. 14A, the controller 670 of the second mobile terminal 600b omits the display of the broadcast related chatting screen 1510c of FIG. 14B, and as illustrated in FIG. 14C, the controller 670 can be configured to display the keyboard display window 1565 and the text input window 1560.

The controller 670 of the second mobile terminal 600b is configured to display various conversation contents through the broadcast related chatting screen 1510c, and when a preference item or a recommendation item for a first chatting conversation content among the plurality of chatting conversation contents is selected, the controller 670 can be configured to transmit the preference or recommendation information for the first chatting conversation content to the server 500, and display the increased number of preferences or recommendations for the first chatting conversation content. Accordingly, it is possible to provide an increased number of preferences or recommendations for the first chatting conversation content.

Figure 15A:
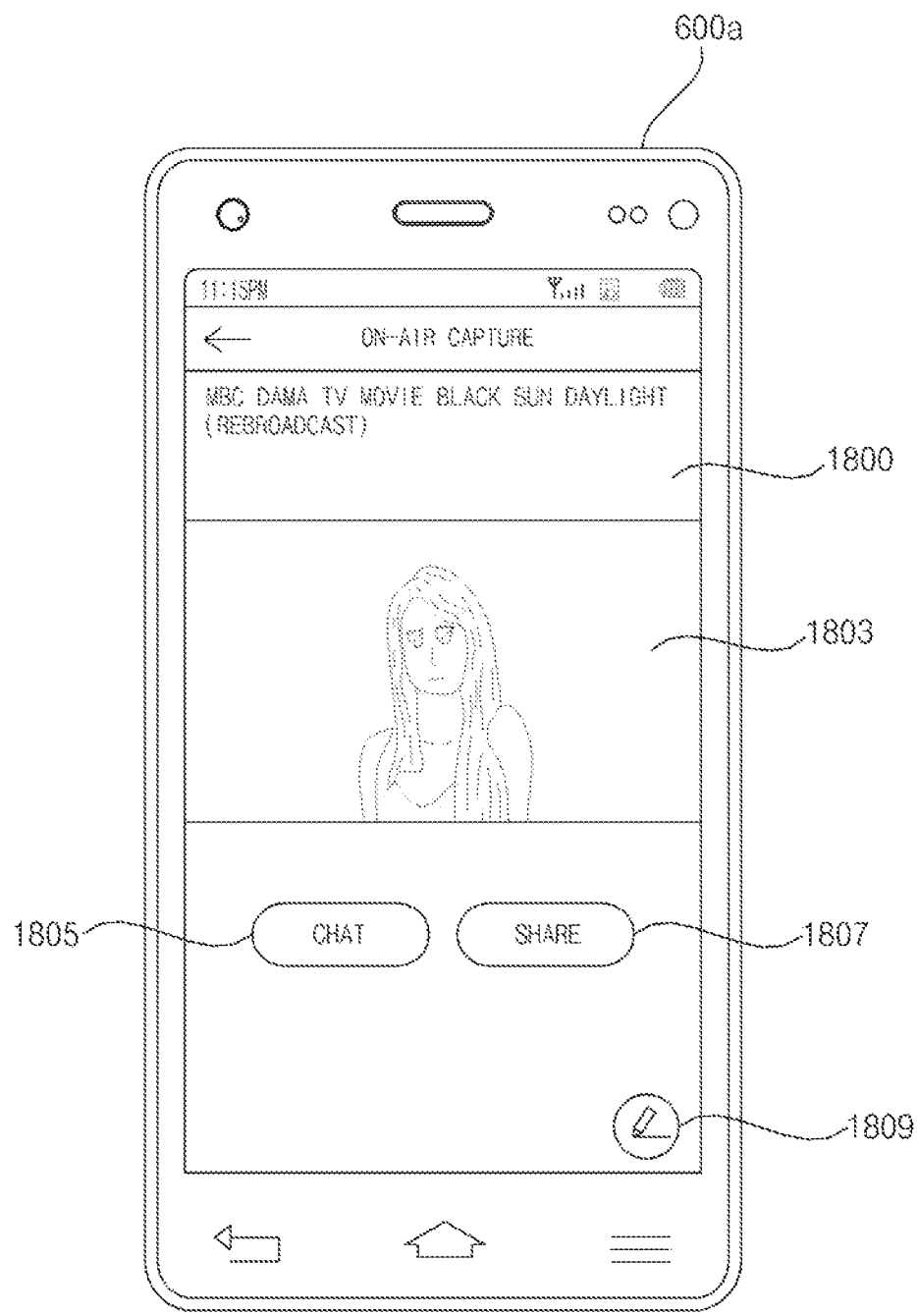

FIG. 15A illustrates an on-air capture screen.

Referring to the drawing, the controller 670 of the first mobile terminal 600a can be configured to display a captured image 1803 of a broadcast image, a chatting item 1805, and a sharing item 1807 together, based on a predetermined input. Accordingly, the captured image 1803 can be shared.

When the chatting item 1805 is selected, the controller 670 of the first mobile terminal 600a can be configured to display the broadcast related chatting screen including the catting input window. Accordingly, the broadcast related chatting screen based on the captured image 1803 can be shared. Furthermore, it is possible to input and display the chatting conversation content related to the broadcast image.

The controller 670 of the first mobile terminal 600a can be configured to transmit the captured image 1803 and the broadcast chatting related message related to the broadcast to a predetermined terminal, based on the selection of the sharing item 1807. In this way, it is possible to input and display the chatting conversation content related to the broadcast image while sharing the captured image 1803.

Figure 15B:
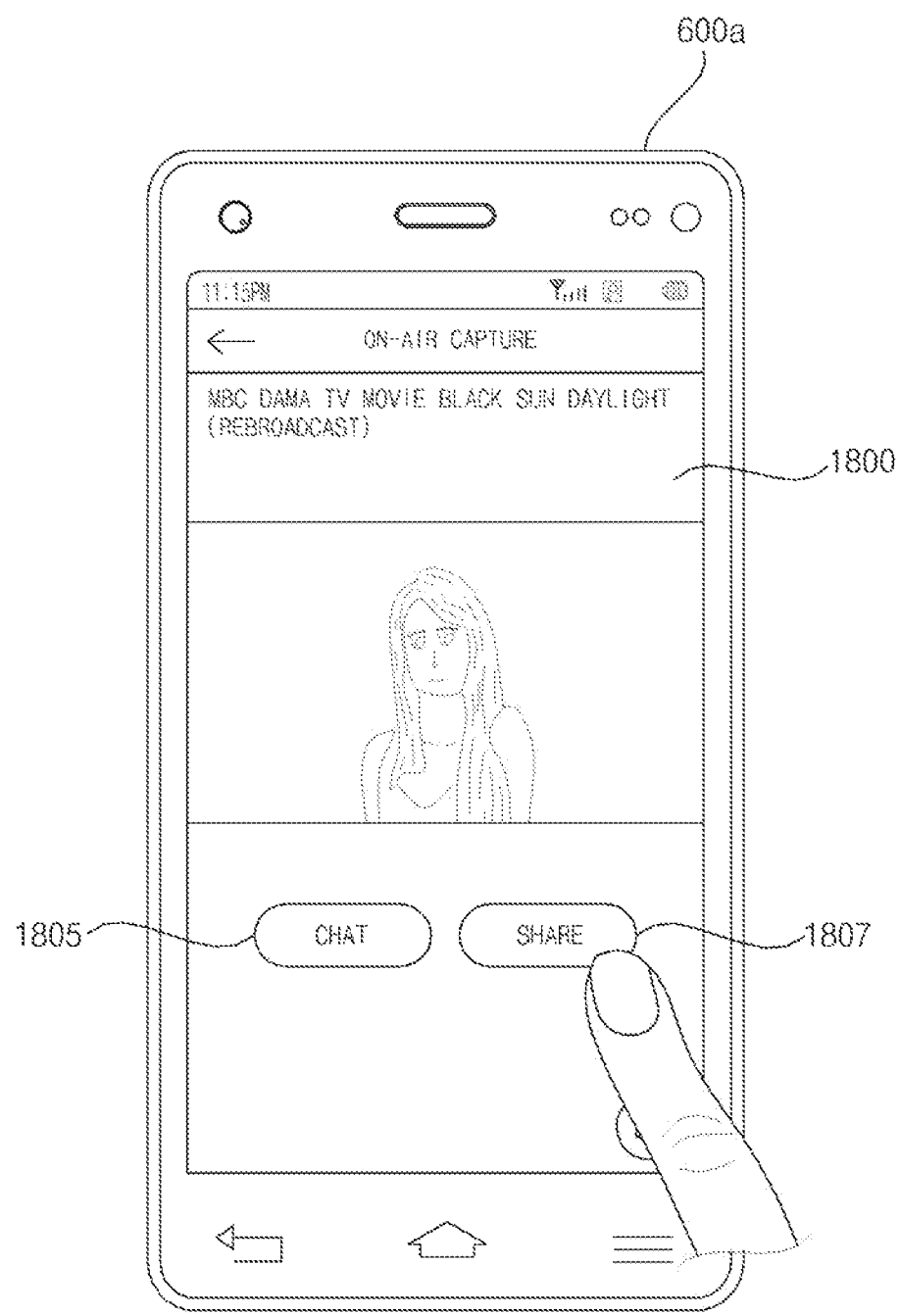
Figure 15C:
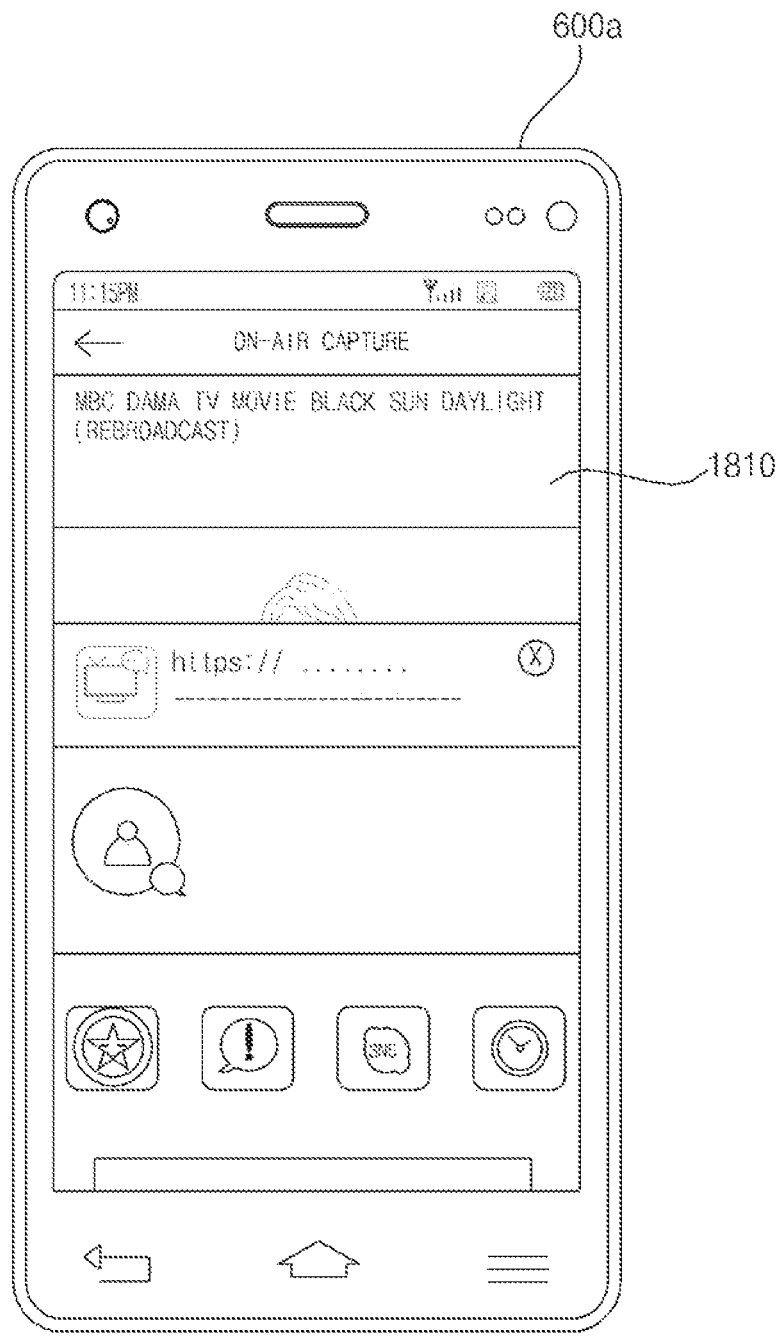

As illustrated in FIG. 15B, when the sharing item 1807 is selected, the controller 670 of the first mobile terminal 600a can be configured to display the sharing screen 1810 for transmitting the shared message, as illustrated in FIG. 15C.

The sharing screen 1810 of FIG. 15C illustrates that the captured image of the broadcast image and the ID item to be shared are displayed.

In the drawing, only one ID item is exemplified, but, unlike this, a plurality of ID items can be displayed, and any one ID item can be selected.

Figure 15D:
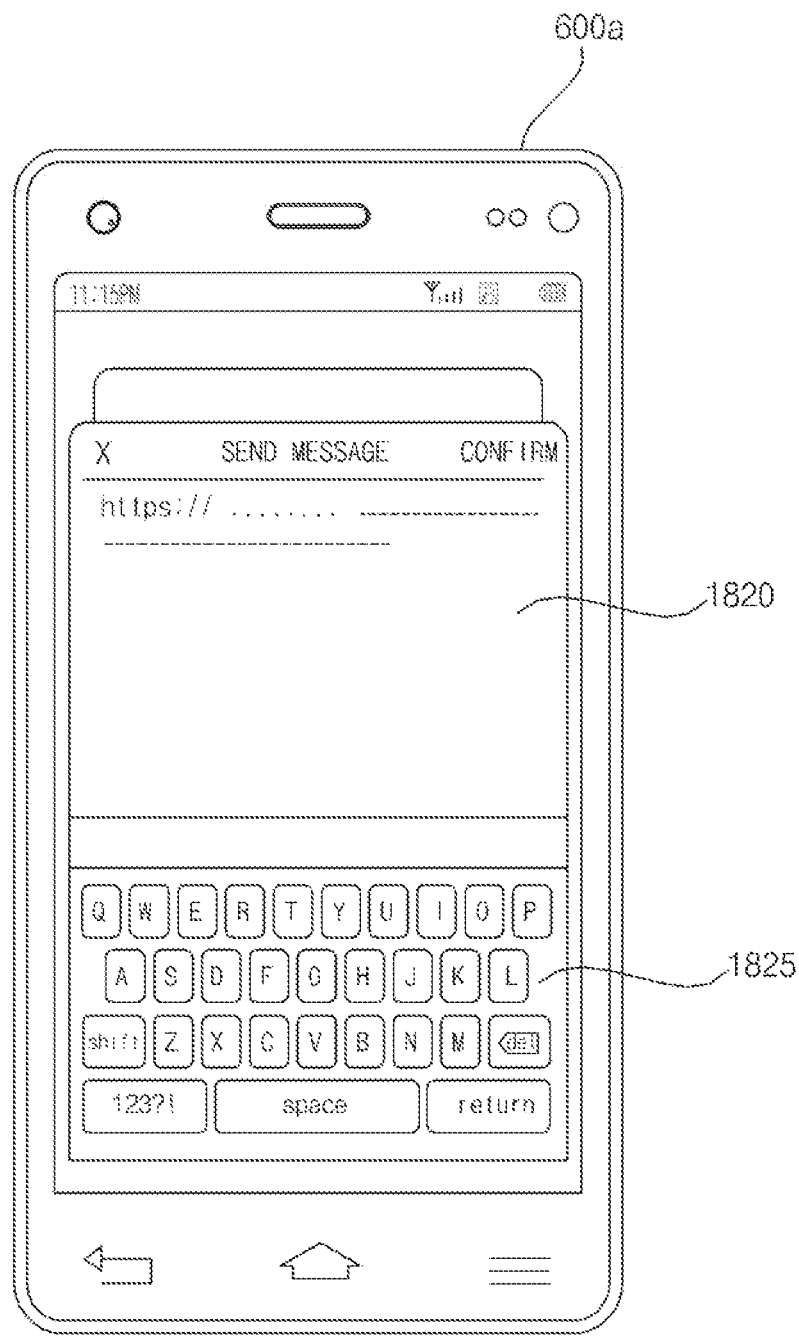
Figure 15E:
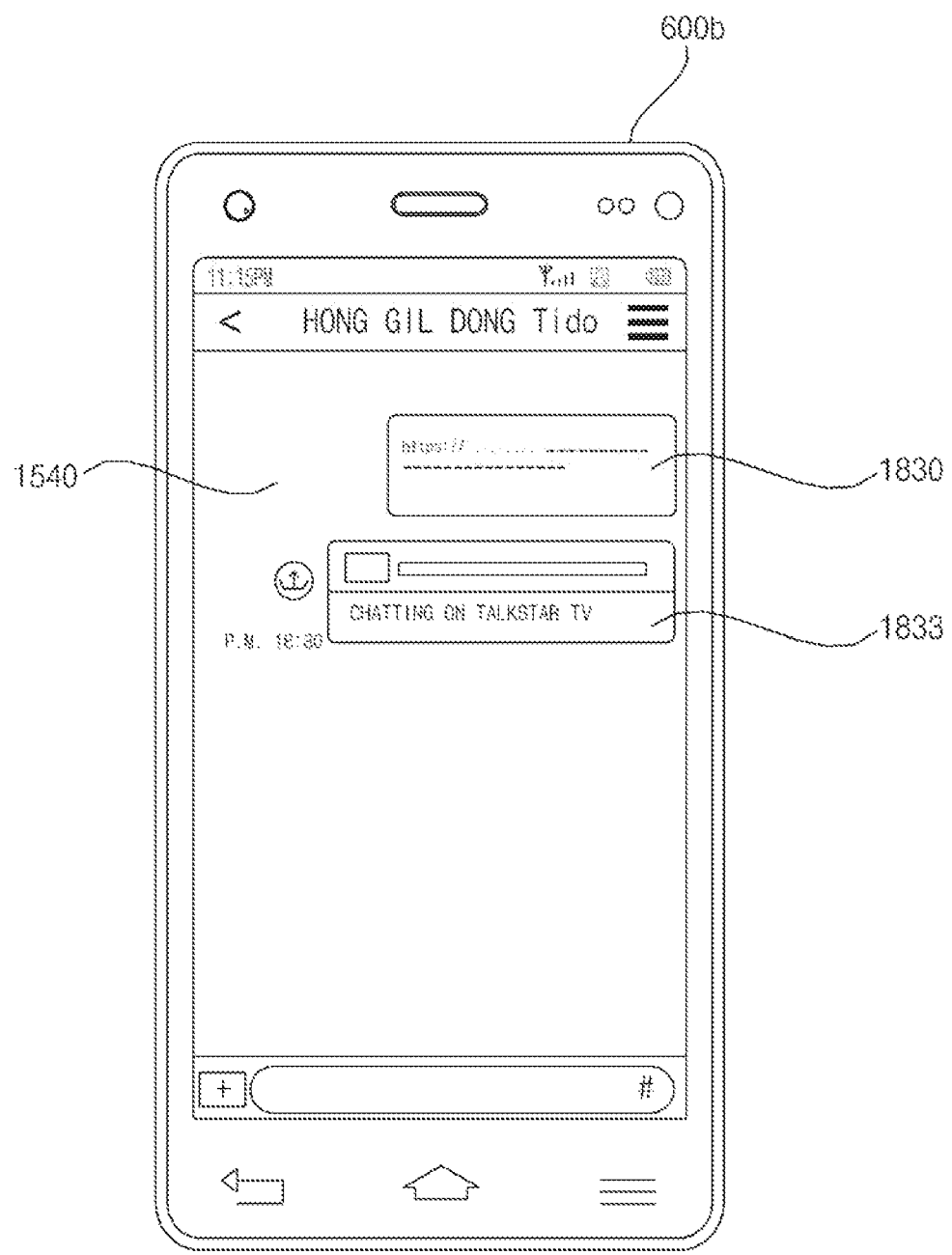

When the ID item in the sharing screen 1810 is selected, the controller 670 of the first mobile terminal 600a can be configured to display the keyboard display window 1825 for message input and the text input window 1820, as illustrated in FIG. 15D.

The message input through the text input window 1820 of FIG. 15D and the captured image of the broadcast image can be transmitted to the second mobile terminal 600b corresponding to the ID item to be shared.

The controller 670 of the second mobile terminal 600b can display the broadcast related message 1830 including the captured image 1830 of the received broadcast image and the broadcast chatting related message 1833 on the chatting window or the message window.

When the broadcast related message 1830 is selected, since the broadcast chatting application is installed, the controller 670 of the second mobile terminal 600b can be configured to display the broadcast related chatting screen 1510c including the application-based preview image 1509c and the chatting input window 1537, as illustrated in FIG. 14B. Accordingly, a broadcast related chatting screen can be shared.

FIGS. 16A to 16D are diagrams illustrating sharing of conversation content between an image display apparatus and a mobile terminal.

Figure 16A:
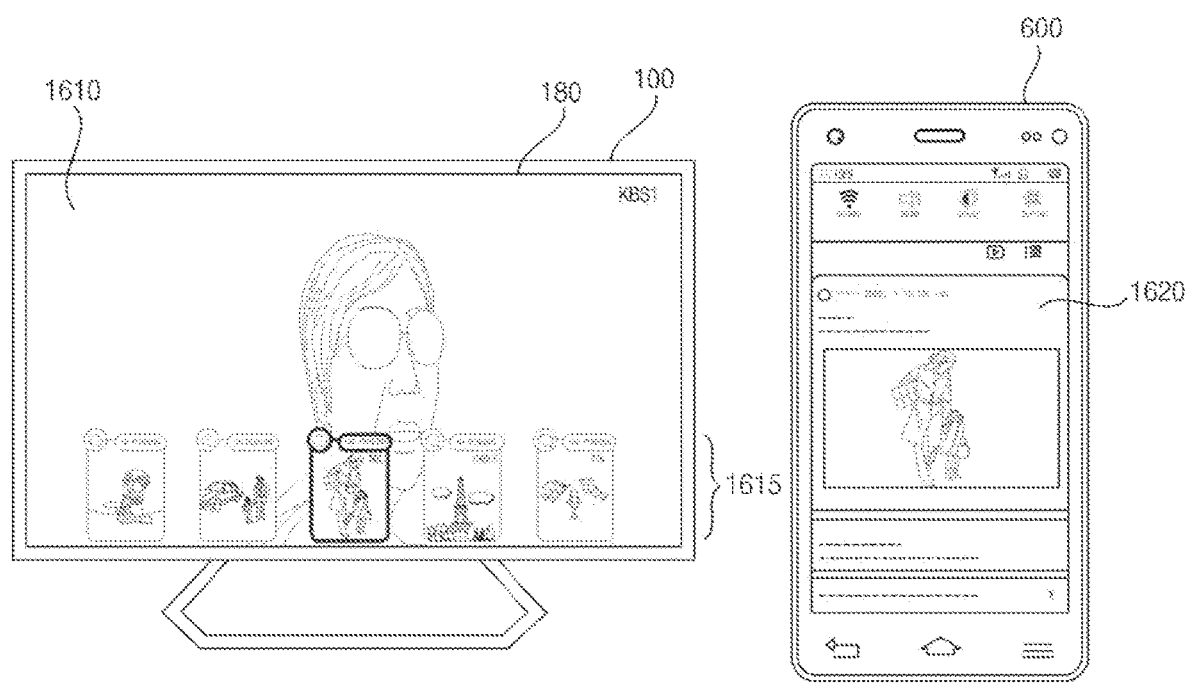

FIG. 16A illustrates that a broadcast image 1610 and a plurality of thumbnail images 1615 corresponding to broadcast channels are displayed on the image display apparatus 100.

Figure 16B:
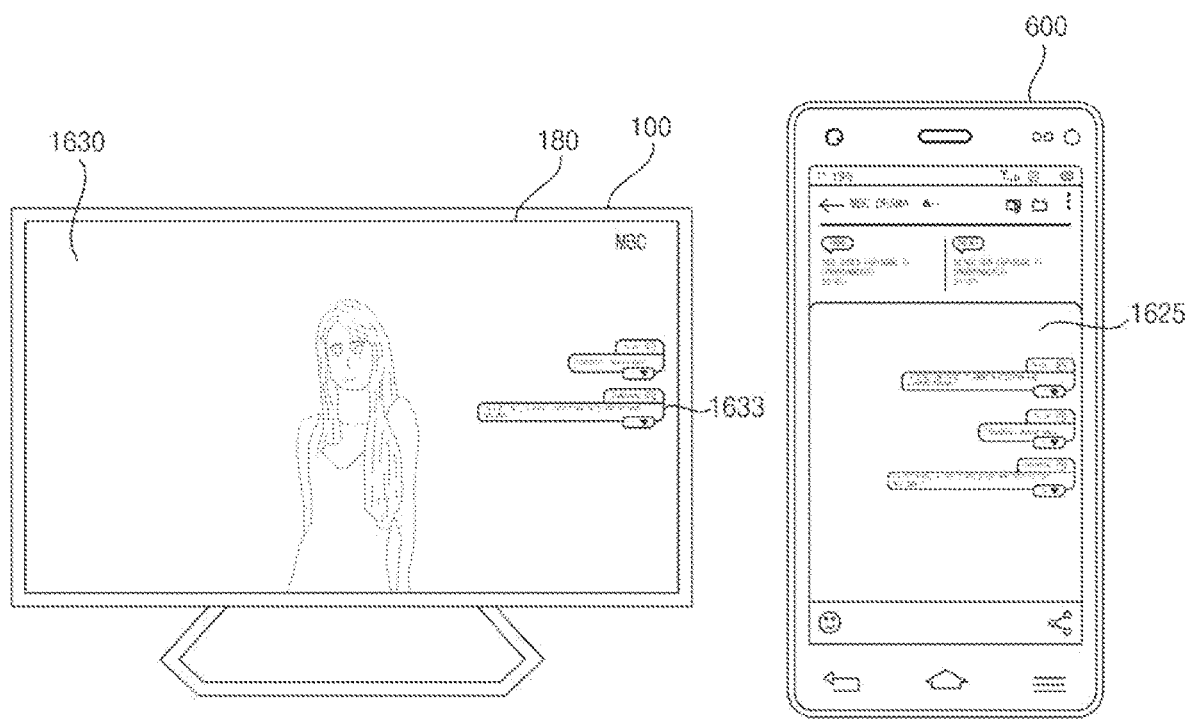

When one of the plurality of thumbnail images 1615 is selected, as illustrated in FIG. 16B, the signal processing device 170 of the image display apparatus 100 can be configured to display a broadcast image of a corresponding channel and broadcast chatting conversation content 1644.

In this case, when the image display apparatus 100 and the mobile terminal 600 use the same ID, the controller 670 of the mobile terminal 600 can be configured to display a broadcast chatting window 1625 of the selected channel. Accordingly, the chatting conversation content for the same broadcast program can be shared between the image display apparatus 100 and the mobile terminal 600.

Figure 16C:
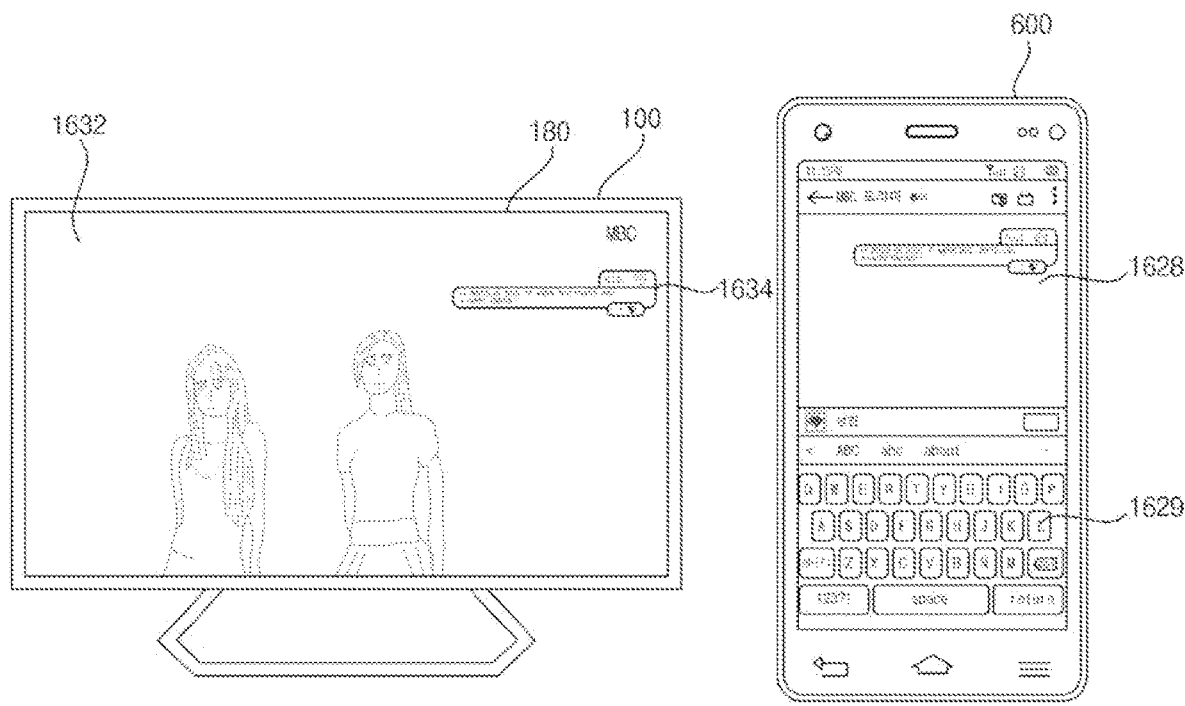

FIG. 16C illustrates that a conversation content 1628 is input through the keyboard display window 1629 and the text input window of the mobile terminal 600.

That is, the controller 670 of the mobile terminal 600 can be configured to transmit the input conversation content 1628 to the server 500 through the keyboard display window 1629 and the text input window, and display the conversation content 1628 on the display 680.

The signal processing device 170 of the image display apparatus 100 can be configured to receive a conversation content input from the mobile terminal 600 from the server 500 and display the conversation content 1634 as illustrated in the drawing.

Figure 16D:
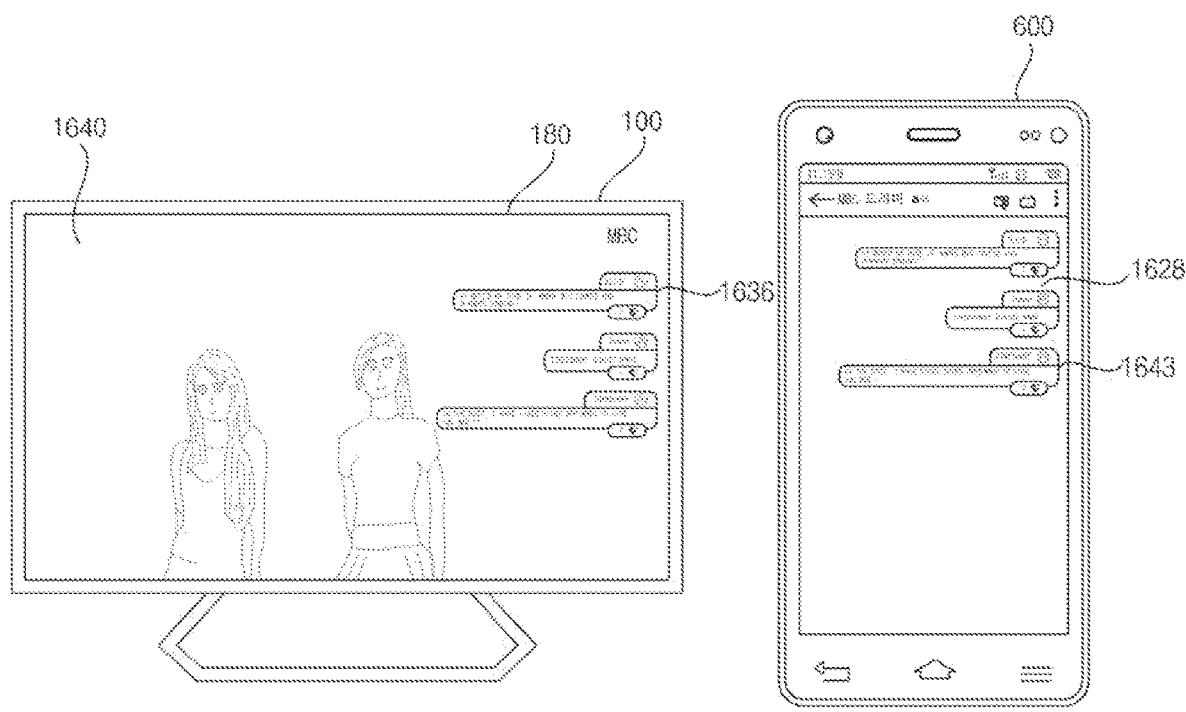

Meanwhile, FIG. 16D illustrates that a plurality of conversation contents are displayed on the image display apparatus 100 and the mobile terminal 600.

In order to improve visibility, the signal processing device 170 of the image display apparatus 100 can be configured to display an updated conversation content or a new conversation content 1636 in the upper right corner.

In contrast, in order to improve visibility, the controller 670 of the mobile terminal 600 can be configured to display the updated conversation content or the new conversation content 1643 in the lower right corner.

Meanwhile, unlike FIGS. 16A to 16D, the image display apparatus 100 and the mobile terminal 600 can display the chatting conversation content or the chatting window based on different IDs.

The server 500 separates the chatting windows according to the number of image display apparatuses 100 or the number of mobile terminals 600 accessing the chatting window related to a predetermined broadcast image, and can be configured to execute a plurality of chatting windows.

Specifically, when the number of image display apparatuses 100 or mobile terminals 600 accessing a chatting window related to a predetermined broadcast image exceeds a reference value, the server 500 can create and provide a new chatting window. Accordingly, it is possible to prevent access overload of a specific chatting window.

For example, when the number of image display apparatuses 100 or mobile terminals 600 accessing a chatting window related to a predetermined broadcast image is 1999 and the reference value is set to 1000, the server 500 can be configured to access 1000 image display apparatuses or 1000 mobile terminals through the first chatting window, and access 999 image display apparatuses or 999 mobile terminals through to a second chatting window.

The reference value can be changed and, for example, can be set to 667 instead of 1000.

For example, when the number of image display apparatuses 100 or mobile terminals 600 accessing the chatting window related to a predetermined broadcast image is 1999 and the reference value is set to 667, the server 500 can be configured to access 667 image display apparatuses or 667 mobile terminals through the first chatting window, and access 665 image display apparatuses or 665 mobile terminals through a third chatting window.

The server 500 can be configured to share the conversation content having a high number of preferences or recommendations in a first chatting window among the plurality of chatting windows with other chatting windows.

For example, while the mobile terminal 600 accesses the first chatting window and receives and displays the chatting conversation content from the server 500, the mobile terminal 600 can receive, from the server 500, a conversation content in which the number of preferences or recommendations in the second chatting window exceeds a reference number, and can be configured to display the conversation content at a specific location in the first chatting window at all times. Accordingly, it is possible to share a conversation content with a large number of preferences or recommendations.

When the number of conversation contents input from the outside is equal to or greater than the reference number, the mobile terminal 600 can change a display speed of the chatting conversation content.

For example, when the number of conversation contents input from the outside is equal to or greater than the reference number, the mobile terminal 600 can be configured to display one chatting conversation content every 3 seconds, and when the number of conversation contents is less than the reference number, the image display apparatus 100 can be configured to display one chatting conversation content every 5 seconds. Accordingly, the visibility of the conversation content can be improved.

The mobile terminal 600 can be configured to set the change in the display speed of chatting conversation content based on an on/off item on the chatting setting screen. Accordingly, it is possible to selectively change the display speed of chatting conversation content.

Although preferred embodiments of the present disclosure have been illustrated and described above, the present disclosure is not limited to the specific embodiments described above, various modifications can be made by those skilled in the art to which the disclosure pertains without departing from the gist of the present disclosure claimed in claims, and these modified embodiments should not be individually understood from the technical idea or perspective of the present disclosure.

What is claimed is:

1. A mobile terminal comprising:
   a display configured to display an image;
   a wireless transceiver configured to perform wireless communication with a server or an external terminal; and
   a controller configured to:
   in response to receiving a broadcast chatting related message from the external terminal or the server, display the broadcast chatting related message,
   in response to receiving a selection of the broadcast chatting related message in a state where a broadcast chatting application is not installed in the mobile terminal, display a preview image, and
   in response to receiving a selection of a setting item in a chatting application screen while the chatting application screen is displayed, display a setting screen including a profile item and a badge item.

2. The mobile terminal of claim 1, wherein the preview image is a web screen-based preview image or in a format viewable by a web browser.

3. The mobile terminal of claim 1, wherein the controller is further configured to:
   in response to receiving a selection of the preview image, display link information for installing the broadcast chatting application.

4. The mobile terminal of claim 1, wherein the controller is further configured to:
   in response to receiving the selection of the broadcast chatting related message in a state where the broadcast chatting application is installed in the mobile terminal, display a broadcast related chatting screen including an application-based preview image and a chatting input window.

5. The mobile terminal of claim 4, wherein the controller is further configured to:
   in response to receiving a selection of the chatting input window, display a keyboard display window and a text input window, and
   in response to receiving a conversation content in the text input window, transmit the conversation content to the server and display the conversation content on the broadcast related chatting screen.

6. The mobile terminal of claim 1, wherein the controller is further configured to:
   in response to executing the broadcast chatting application, display athe chatting application screen including a conversation content ranking icon and a schedule item.

7. The mobile terminal of claim 6, wherein the controller is further configured to:
   in response to receiving a selection of the schedule item in the chatting application screen, display a schedule list screen including a plurality of broadcast program items, and
   in response to receiving a selection of a broadcast program item among the plurality of broadcast program items, display a broadcast related chatting screen including a chatting input window related to the broadcast program item.

8. The mobile terminal of claim 7, wherein the controller is further configured to:
   display the plurality of broadcast program items in the schedule list arranged according to a channel order or a popularity order.

9. The mobile terminal of claim 6, wherein the controller is further configured to:

in response to receiving a selection of a sharing viewing item in the chatting application screen, display a sharing viewing screen including a plurality of broadcast program items, and in response to receiving a selection of a broadcast program item among the plurality of broadcast program items, display a broadcast related chatting screen including a chatting input window related to the broadcasting program item.

10. The mobile terminal of claim 1, wherein the controller is further configured to change a number of badge items based on updated or acquired points.

11. The mobile terminal of claim 6, wherein the controller is further configured to:
in response to receiving a selection of a setting item in the chatting application screen, display a channel editing item and a region setting item on the setting screen,
in response to receiving a selection of the channel editing item, display a channel list screen including a terrestrial broadcasting item and a cable broadcasting item, and
in response to receiving a selection of the region setting item, display a plurality of region items and broadcast channel information viewable in each of the plurality of region items.

12. The mobile terminal of claim 1, wherein the controller is further configured to:
in response to installing of the broadcast chatting application in the mobile terminal, display a broadcast related chatting screen, and
in response to a selection of a preference item or a recommendation item for a first chatting conversation content from among chatting conversation contents in the broadcast related chatting screen, transmit preference information or recommendation information for the first chatting conversation content to the server and display an increased number of preferences or recommendations for the first chatting conversation contents.

13. The mobile terminal of claim 1, wherein the controller is further configured to:
in response to executing the broadcast chatting application, display a broadcast related chatting screen including a chatting input window, and
in response to receiving a selection of a sharing item in the broadcast related chatting screen, transmit a broadcast chatting related message related to a corresponding broadcast to a predetermined terminal.

14. The mobile terminal of claim 13, wherein the controller is further configured to:
in response to selection of a chatting input window in the broadcast related chatting screen, display a keyboard display window and a text input window, and
in response to receiving a conversation content in the text input window, transmit the conversation content to the server and display the conversation content on the broadcast related chatting screen.

15. The mobile terminal of claim 1, wherein the controller is further configured to:
display a captured image of a broadcast image, a chatting item, and a sharing item together on the display of the mobile terminal, based on a predetermined input.

16. The mobile terminal of claim 15, wherein the controller is further configured to:
in response to receiving a selection of the chatting item, display a broadcast related chatting screen corresponding to the captured image and a chatting input window.

17. The mobile terminal of claim 16, wherein the controller is further configured to:
transmit the captured image and a broadcast chatting related message related to the corresponding broadcast to a predetermined terminal, based on the selection of the sharing item.

18. A method of controlling a mobile terminal, the method comprising:
performing, by a controller in the mobile terminal, wireless communication with a server or an external terminal;
in response to receiving, by the controller, a broadcast chatting related message from the external terminal or the server, displaying the broadcast chatting related message on a display of the mobile terminal;
in response to receiving, by the controller, a selection of the broadcast chatting related message in a state where a broadcast chatting application is not installed in the mobile terminal, displaying a preview image; and
in response to receiving a selection of a setting item in a chatting application screen while the chatting application screen is displayed, displaying a setting screen including a profile item and a badge item.

* * * * *